US010405057B2

(12) United States Patent
Kitts et al.

(10) Patent No.: US 10,405,057 B2
(45) Date of Patent: *Sep. 3, 2019

(54) SYSTEMS AND METHODS FOR A TELEVISION SCORING SERVICE THAT LEARNS TO REACH A TARGET AUDIENCE

(71) Applicant: ADAP.TV, INC., Dulles, VA (US)

(72) Inventors: Brendan Kitts, Seattle, WA (US); Dyng Au, Seattle, WA (US); Alfred Lee, Seattle, WA (US)

(73) Assignee: ADAPT.TV, Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/880,118

(22) Filed: Jan. 25, 2018

(65) Prior Publication Data

US 2018/0152766 A1    May 31, 2018

Related U.S. Application Data

(63) Continuation of application No. 15/467,411, filed on Mar. 23, 2017, now Pat. No. 9,918,142, which is a continuation of application No. 14/586,746, filed on Dec. 30, 2014, now Pat. No. 9,641,882.

(Continued)

(51) Int. Cl.
*H04N 21/81* (2011.01)
*H04N 21/2668* (2011.01)
(Continued)

(52) U.S. Cl.
CPC ......... *H04N 21/812* (2013.01); *G06Q 10/067* (2013.01); *G06Q 10/0639* (2013.01);
(Continued)

(58) Field of Classification Search
CPC ............ H04N 21/2407; H04N 21/252; H04N 21/25883; H04N 21/25891; H04N 21/2668; H04N 21/812; H04N 21/84
See application file for complete search history.

(56) References Cited

U.S. PATENT DOCUMENTS 8,060,398 B2   11/2011   Canning et al.
8,255,948 B1    8/2012   Black et al.
(Continued)

FOREIGN PATENT DOCUMENTS

WO    2013192314 A1    12/2013

OTHER PUBLICATIONS

Aaker, J. et al., "Nontarget markets and Viewer Distinctiveness: The Impact of Target Marketing on Advertising Attitudes," Journal of Consumer Psychology, vol. 9, No. 3, pp. 127-140. Lawrence Erlbaum Associates Inc., (2000).
(Continued)

*Primary Examiner* — Chenea Davis
(74) *Attorney, Agent, or Firm* — Bookoff McAndrews, PLLC

(57) ABSTRACT

Television is the largest advertising category in the United States with over 65 billion spent by advertisers per year. A variety of different targeting algorithms are compared, ranging from the traditional age-gender targeting methods employed based on Nielsen ratings, to new approaches that attempt to target high probability buyers using Set Top Box data. The performance of these different algorithms on a real television campaign is shown, and the advantages and limitations of each method are discussed. In contrast to other theoretical work, all methods presented herein are compatible with targeting the existing 115 million Television households in the United States and are implementable on current television delivery systems.

18 Claims, 48 Drawing Sheets

Related U.S. Application Data

(60) Provisional application No. 61/922,007, filed on Dec. 30, 2013.

(51) Int. Cl.
  *H04N 21/24* (2011.01)
  *H04N 21/25* (2011.01)
  *H04N 21/258* (2011.01)
  *G06Q 30/02* (2012.01)
  *H04N 21/84* (2011.01)
  *G06Q 10/06* (2012.01)
  *H04N 21/234* (2011.01)
  *H04N 21/442* (2011.01)

(52) U.S. Cl.
  CPC ..... *G06Q 30/0241* (2013.01); *G06Q 30/0242* (2013.01); *G06Q 30/0246* (2013.01); *H04N 21/23424* (2013.01); *H04N 21/2407* (2013.01); *H04N 21/252* (2013.01); *H04N 21/25883* (2013.01); *H04N 21/25891* (2013.01); *H04N 21/2668* (2013.01); *H04N 21/44204* (2013.01); *H04N 21/84* (2013.01)

(56) References Cited

U.S. PATENT DOCUMENTS

| | | |
|---|---|---|
| 8,365,213 B1 | 1/2013 | Orlowski |
| 2002/0078444 A1 | 6/2002 | Krewin et al. |
| 2007/0157228 A1 | 7/2007 | Bayer et al. |
| 2010/0100419 A1 | 4/2010 | Natoli et al. |
| 2011/0191309 A1 | 8/2011 | Anderson et al. |
| 2012/0023522 A1 | 1/2012 | Anderson et al. |
| 2012/0042338 A1 | 2/2012 | Kitts et al. |
| 2012/0042339 A1 | 2/2012 | Kitts et al. |
| 2012/0054019 A1 | 3/2012 | Kitts et al. |

OTHER PUBLICATIONS

Balakrishnan, S. et al., "Computational Television Advertising," Twelfth IEEE International Conference on Data Mining, pp. 71-80, (2012).

Chang et al., "Consumer micro-behavior and TV viewership patterns: data analytics for the two-way set-top box," Proceedings of the 14th Annual International ACM Conference on Electronic Commerce, pp. 272-273, ACM New York, (2012).

Coleman, T.F. et al., "A Reflective Newton Method for Minimizing a Quadratic Function Subject to Bounds on Some of the Variables," Dec. 7, 1992.

Deshpande, R. et al., "A tale of two cities: Distinctiveness theory and advertising effectiveness," Journal of Marketing Research, vol. 31, pp. 57-64, (1994).

Dietterich, T.G., "Ensemble methods in machine learning," Oregon State University (2000).

Direct Response Academy, "Advanced DRTV Media: Direct Response Television Media Management, Training Course materials on Direct Television media buying," (2008), http://www.directresponseacademy.com.

International Search Report and Written Opinion issued in corresponding International Application No. PCT/US2014/072872, dated Jun. 11, 2015 (15 pages).

Johansson, J.K., "Advertising and the S-Curve: A New Approach," Journal of Marketing Research, vol. 16, No. 3, pp. 346-354, American Marketing Association (1979).

Jones, J. "What Does Effective Frequency Mean in 1997?", Journal of Advertising Research, July, pp. 14-20, (1997).

Kitts, B. et al., "Targeting Television Audiences using Demographic Similarity", 2010 IEEE International Conference on Data Mining Workshops, pp. 1391-1399, 2010.

Nielsen Corporation, "A2/M2 Three Screen Report: Television, Internet and Mobile Usage in the United States", 4th Quarter 2008, (2008).

Nielsen Corporation, "Americans watching more TV than ever", Nielsen Wire, May 20, 2009 http://blog.nielsen.com/nielsenwire/online.sub.--mobile/americans-watchin- g-more-tv-than-ever/.

Schneider, M., "Fox wants answers from Nielsen," http://www.variety.com/article/VR1118003924?refCatId=14, Variety, May 18, 2009.

Segal, A., "Nielsen Ratings: An Inaccurate Truth Out of date television ratings system exposed," http://cornellsun.com/node/23180, The Cornell Daily Sun, Apr. 26, 2007.

Simon, J.L. et al., "The Shape of the Advertising Response Function," Journal of Advertising Research, vol. 20, No. 4, pp. 767 (2002).

Tellis, G. et al., "Modeling the Microeffects of Television Advertising: Which Ad Works, When, Where, for How Long, and Why?", (2005), Marketing Science 24(3), pp. 351-366, Informs http://www-rcf.usc.edu/.about.tellis/AdMicro.pdf.

Vakratsas, D. et al., "Advertising Response Functions Revisited: A Model of Dynamic Probabilistic Thresholds," Marketing Science, 23(1), pp. 109-119, (2004).

| 76219121 | 30 | STY1 | 1 | WKBW | BUFFALO,NY | 2 | 7/2/2008 6:05 | -5 | 8008768156 | -1 | WWW.WEBADDRESS.COM | -1 | 235 | 2 |
| 76219112 | 120 | STY2 | 1 | WKBW | BUFFALO,NY | 2 | 7/2/2008 6:05 | -5 | 8008768156 | -1 | | -1 | 0 | 3 |
| 76509063 | 30 | STY4 | 1 | WSBK | BOSTON,MA | 2 | 7/4/2008 12:00 | -5 | 8005951927 | -1 | WWW.WEBADDRESS.COM | -1 | 0 | 4 |
| 76512444 | 60 | STY4 | 1 | WSBK | BOSTON,MA | 2 | 7/4/2008 12:00 | -5 | 8005951927 | -1 | WWW.WEBADDRESS.COM | -1 | 197.4 | 4 |
| 76547095 | 120 | STY3 | 1 | KRON | SAN FRANCISCO,CA | 2 | 7/4/2008 20:00 | -8 | 8005938224 | -1 | WWW.WEBADDRESS.COM | -1 | 0 | 4 |
| 76506696 | 30 | STY4 | 1 | XHAB | BROWNSVILLE,TX | 2 | 7/5/2008 14:00 | -6 | 8005951927 | -1 | WWW.WEBADDRESS.COM | -1 | 188 | 4 |
| 76509047 | 30 | STY4 | 1 | WNUV | BALTIMORE,MD | 2 | 7/5/2008 15:30 | -5 | 8005952118 | -1 | | -1 | 526.4 | 2 |
| 76509118 | 60 | STY4 | 1 | WTVZ | NORFOLK,VA | 2 | 7/5/2008 16:00 | -5 | 8005953110 | -1 | | -1 | 310.2 | 2 |
| 76482379 | 120 | STY3 | 1 | WCSC | CHARLESTON,SC | 2 | 7/5/2008 17:30 | -5 | 8005938224 | -1 | | -1 | 408.9 | 3 |

SAMPLE MEDIA PLAN DATA

*FIG. 1B*

"ENCODING ID", "MARKET", "RANK", "STATION", "CHANNEL", "AFFILIATE", "START DATE", "START TIME", "STOP DATE", "STOP TIME", "START SECOND", "STOP SECOND", "SECONDS", "PROGRAM", "ISCI-20", "CAMPAIGN", "ADVERTISER", "PRODUCT NAME", "MODULE CODE", "PHONE NUMBER", "LENGTH", "DONOVAN AGENCY ESTIMATE CODE", "DONOVAN AGENCY ADVERTISER CODE", "DONOVAN AGENCY PRODUCT CODE",
"0000708920", "BANGOR", "154", "WFVX", "22", "FOX", "20100714", "14:30:05", "20100714", "14:58:33", "0000000030", "0000001738", "00000", "01835", "PAID PROGRAM", "PMSON001", "SON2010", "POSITEC USA", "SONICRAFTER", "1710", "9999999999", "1710", "XXXX", "XXXX", "XXXX"

SAMPLE VERIFICATION DATA

FIG. 1C

KXLY SPOKANE Q2 ORDER - GRAVEDIGGER2000

| FROM | PORTIA VENETO<br>PROCEED MEDIA GROUP | TO | KXLY SPOKANE | REVISION<br>NOTES: | NO | DATE 6/5/2010 2:58 PM<br>ORDER ID 282 | | ☐ PROCEED<br>MEDIA GROUP |
|---|---|---|---|---|---|---|---|---|
| PHONE: 888-330-6975 x123<br>FAX: 206-682-1097 | | PHONE: 345-456-6789<br>FAX: 345-456-9876 | | | | PAGE 1 OF 1 | | |

CLIENT: VORICK INC.
PRODUCT: GRAVEDIGGER2000            SEPARATION BETWEEN SPOTS: 15            FLIGHT START DATE: 6/28/2010 5:00:00 AM
MARKET: SPOKANE                                                                                       FLIGHT END DATE: 9/26/2010 4:59:00 AM

ESTIMATE COMMENTS: DO NOT RUN ▲1.3.1▶ RELIGIOUS, OR PAID PROGRAMMING. PLEASE OFFER MG WITHIN FLIGHT. FAIR & EQUAL ROTATION REQUIRED.

| ITEM<br>NO. | DAYPART | PROGRAM | STATION<br>GROSS | TFN | ROTA-<br>TION | LENGTH | JULY 2010<br>6/28 7/5 7/12 7/19 7/26 | AUGUST 2010<br>8/2 8/9 8/16 8/23 8/30 | SEPTEMBER 2010<br>9/6 9/13 9/20 | TOTAL<br>SPOTS | TOTAL<br>COSTS |
|---|---|---|---|---|---|---|---|---|---|---|---|
| 3255 | MTU W TH F | 5:00AM-9:00AM | $300.00 | (800) 445-2999 | 100% | 60 | 4 | | | 12 | $3,600.00 |
| 3256 | MTU W TH F SA SU | 6:00AM-6:00PM | $110.00 | (800) 333-4434 | 100% | 120 | 20 | 10 | | 30 | $3,300.00 |
| 3257 | SU | 10:00AM-1:30PM | $280.00 | (800) 445-2999 | 100% | 60 | 1 | | | 1 | $280.00 |
| 3258 | SA SU | 1:00PM-6:00PM | $100.00 | (800) 445-2999 | 100% | 60 | 5 5 5 5 5 | 5 5 5 5 5 | 5 5 5 | 25 | $2,500.00 |
| 3243 | MTU W TH F SA SU | 11:00PM-2:00AM | $1,500.00 | (800) 445-2999 | 50% | 60 | 5 5 5 5 5 | 5 5 5 5 5 | 5 5 5 | 65 | $97,500.00 |
| | | | | (800) 448-7888 | 50% | | | | | | |
| 3245 | SA SU | 11:35P-12:35AM | $650.00 | (800) 445-2999 | 100% | 60 | 5 5 5 5 5 | 5 5 5 5 5 | 15 15 15 | 65 | $42,250.00 |
| | | | | | TOTALS | | 35 10 14 10 10 | 14 10 20 10 15 | 15 15 15 | 142 | |
| | | | | | | | $45,400.00 | $54,950.00 | $43,000.00 | | $143,350.00 |

1.3.1

| PROGRAM | TFN | ISCI | LENGTH |
|---|---|---|---|
| GRAVEDIGGER2000 | (800) 445-2999 | PMSW0002 | 60 |
| GRAVEDIGGER2000 | (800) 446-7888 | PMSW0003 | 60 |
| GRAVEDIGGER2000 | (800) 333-4434 | PMSW0044 | 120 |

PROCEED MEDIA GROUP IS NOT RESPONSIBLE FOR ANY SPOTS THAT DO NOT RUN | PLEASE NOTIFY PROCEED MEDIA GROUP IMMEDIATELY IF ANY
ACCORDING TO THESE INSTRUCTIONS. CREDIT NEEDED IF SPOTS AIR OUTSIDE PMG | PROGRAMMING CHANGES OR PREEMPTIONS OCCUR.
GUIDELINES.

PLEASE SIGN: _____            DATE: _____

SCAN AND EMAIL TO: PVENETO@PROCEEDMEDIAGROUP.COM OR FAX TO 206-682-1097. QUESTIONS OR CONCERNS: CALL PORTIA VENETO AT 888-330-6975 x123.

SAMPLE TRAFFIC INSTRUCTIONS

FIG. 1D

```
15552836|1|07/20/2008 13:30|-5|59535|V.32|635|25|4|8008195404|WAXN|330|STY6|||JOHN SMITH|15155 REDROAD CT||CHARLOTTE|NC|28273|US|||||404|6412622|JSMITH@YAHOO.COM|100.00|2.50|1.50|Y|N
15567168|1|07/20/2008 13:31|-5|60420|V.32|282|25|4|8008195404|WRNN|330|STY6|||||||||||||||
15553396|1|07/20/2008 13:31|-5|52137|V.32|270|25|5|8008195404|WRNN|330|STY6|||||||||||||||
15555953|1|07/20/2008 13:32|-5|66488|V.32|913|25|6|8009874524|HGTVC|330|STYC|||JOE|SAMPLE|1891 FEATHER LIGHT WAY||WINDSOR|ON|N9H2E6|CA|||||519|5641186|JOESAMPLE@HOTMAIL.COM|25|2.5|.5|N|N
15579765|1|07/20/2008 13:34|-5|3104|V.32|553|25|6|8008195404|WAXN|330|STY6|||ERICA|TESTLASTNAME|4814 TEST AVE||CHARLOTTE|NC|28205|US||||||704|5375838|ETESTLASTNAME@AOL.COM|100.00|2.50|1.50|Y|Y
15555913|1|07/20/2008 13:35|-5|62707|V.32|1441|25|6|8008195404|WRNN|330|STY6|||AMANDA|JONES|63 E. BLACKBOX STREET||DOVER|NJ|07801|US|973|4429729|||30.00|2.50|1.50|Y|N
15540393|1|07/20/2008 13:35|-5|76294|V.32|81|25|4|8008195404|WRNN|330|STY6|||||||||||||||
15555919|1|07/20/2008 13:36|-5|67793|V.32|1356|25|2|8008195404|WAXN|330|STY6|||JOHN|DOE|921 TASSO AVE||KANNAPOLIS|NC|28083|US|||931|9381878|||25.00|2.50|.50|N|N
15555943|1|07/20/2008 13:37|-5|68040|V.32|103|25|4|8008195404|WRNN|330|STY6|||JANE|DOE|||||||||||||
15540442|1|07/20/2008 13:38|-
5|50392|V.32|365|300|4|8008195404|WAXN|330|STY6|||||||||||||||
```

SAMPLE CALLCENTER DATA

*FIG. 1E*

```
09032000009MLH9AH-EC | 02/01/2009 00:00 | -7 | WWW.SAMPLEWEBSITE.COM | UNASSIGNED | JANE | DOE | 1234 MAIN ST | BALTIMORE | MD | 21224 | US | JOHN | DOE | 4321 MAIN AVE | BALTIMORE | MD | 21224 | US | 410 | 3827626 | JANEDOE_1234@HOTMAIL.COM | 100.00 | 2.50 | 1.50 | Y | N
09032000141MT2QAH-EC | 02/01/2009 00:01 | -7 | WWW.SAMPLEWEBSITE.COM | CA-1 | JANE | DOE | 1234 MAIN ST | | | | | | | | | | 100.00 | 2.50 | 1.50 | Y | N
09032000146MN95AH-EC | 02/01/2009 00:01 | -7 | WWW.SAMPLEWEBSITE.COM | CA-1 | JANE | DOE | 1234 MAIN ST | STONE MOUNTAIN | GA | 30083 | US | | | | | | 678 | 4997605 | JANEDOE_1234@HOTMAIL.COM | 100.00 | 2.50 | 1.50 | Y | Y
09032000236MLH9AH-EC | 02/01/2009 00:02 | -7 | WWW.SAMPLEWEBSITE.COM | CA-1 | JANE | DOE | 1234 MAIN ST | WEST DES MOINES | IA | 50266 | US | | | | | 515 | 2746587 | JANEDOE_1234@HOTMAIL.COM | 25.00 | 2.50 | .50 | N | N
09032000758MKSRAH-EC | 02/01/2009 00:07 | -7 | WWW.SAMPLEWEBSITE.COM | CA-1 | JANE | DOE | 1234 MAIN ST | BALTIMORE | MD | 21201 | US | | | | MD | 21201 | US | | | | 25 | 0 | 1 | N | N
09032000875383ER-EC | 02/01/2009 00:08 | -7 | WWW.SAMPLEWEBSITE.COM | CA-1 | JANE | DOE | 1234 MAIN ST | BALTIMORE | MD | 21201 | US | | | | | | | 25 | 0 | 1 | Y | Y
09032001051MKSRAH-EC | 02/01/2009 00:10 | -7 | WWW.SAMPLEWEBSITE.COM | UNASSIGNED | JANE | DOE | 1234 MAIN ST | BALTIMORE | MD | 21201 | US | | | | | | | 100.00 | 2.50 | 1.50 | Y | N
09032001213MKSRAH-EC | 02/01/2009 00:12 | -7 | WWW.SAMPLEWEBSITE.COM | UNASSIGNED | JANE | DOE | 1234 MAIN ST | BALTIMORE | MD | 21201 | US | | | | 410 | 3827626 | | 100.00 | 2.50 | 10.50 | Y | N
09032001344S383ER-EC | 02/01/2009 00:13 | -7 | WWW.SAMPLEWEBSITE.COM | UNASSIGNED | JANE | DOE | 1234 MAIN ST | LANCASTER | CA | 93534 | US | | | | 661 | 9405051 | JANEDOE_1234@HOTMAIL.COM | 100.00 | 2.50 | 10.50 | Y | N
09032001719417SERER-EC | 02/01/2009 00:17 | -7 | WWW.SAMPLEWEBSITE.COM | UNASSIGNED | JANE | DOE | 1234 MAIN ST | FRESNO | CA | 93650 | US | | | | 559 | 2928228 | JANEDOE_1234@HOTMAIL.COM | 30.00 | 2.50 | 1.50 | Y | N
```

SAMPLE E-COMMERCE DATA

FIG. 1F

```
00001893 | 02/14/2009 00:00 | 0 | 119.80 | 39.90 | 0.00 | 0.00 | 159.70 | N | N | 830 | 107633251 | 00001893 | JIM | DOE | 260 TRIAL
DR | | BLOOMINGDALE | GA | 31302-4058 | US | 912 | 6755172 | 00001893 | JOHN | DOE | 260 TRIAL
DR | | BLOOMINGDALE | GA | 31302-4058 | US | 912 | 555172 |
00001894 | 02/14/2009 00:00 | 0 | 149.70 | 55.80 | 0.00 | 0.00 | 205.50 | N | N | 830 | 107633256 | 00001894 | JANE | DOE | 114 TEST
DR | | SPRINGFIELD | GA | 31329-4642 | US | 912 | 00001894 | JANE | DOE | 406 BILLINGADDRESS
AVE | | GUYTON | GA | 31312-4538 | US | 912 | 5559332 |
```

SAMPLE ORDER DATA

FIG. 1G

```
85189|JOHN|DOE|111 TEST
WAY|SEATTLE|WA|91045|35|M|D|1|0|0|1|0|323|23|234|1|5|1|1|1|0|1|0|1|1|0|1|1|43|Y|7|0|1|1|1|
0|32|1|1|0|1|1|0|7|X|1|1|0|1|1|1|0|0|1
85189|JANE|SMITH|111 TEST
WAY|SEATTLE|WA|91045|35|M|D|1|0|0|1|0|323|23|234|1|5|1|1|1|0|1|0|1|1|0|1|1|43|Y|7|0|1|1|1|
0|32|1|1|0|1|1|0|7|X|1|1|0|1|1|1|0|0|1
```

SAMPLE CONSUMER DATA ENRICHMENT

*FIG. 1H*

"03072010", "0035", "WABC", "ABC", "FPB", "0060", "SYNDICATED", "LOST", , "LIVE TOGETHER, DIE ALONE", , "DRAMA", "JACK BENDER", , "NAVEEN ANDREWS", "HENRY IAN CUSICK", "EMILIE DE RAVIN", "MICHAEL EMERSON", "MATHEW FOX", "JORGE GARCIA", "JACK AND SAYID DEVISE A PLAN TO CONFRONT THE OTHERS AND GET WALT BACK; EKO AND LOCKE FIGHT OVER THE DECISION ABOUT THE BUTTON AND THE HATCH", , "CLOSED CAPTIONED", "ESP, PART 1 OF 2", , "IN STEREO", , , "14", "V"
"03072010", "0135", "WABC", "ABC", "FPB", "0115", "MOVIE", "SPLICED", , , , , "2002", "HORROR", "GAVIN WILDING", , "CANADA", "RON SILVER", "LIANE BALABAN", "DREW LACHEY", "MELISSA REPKA", "A TEENAGER WATCHES A SCARY MOVIE, THEN REALIZES THE DEFORMED KILLER FROM THE FILM IS STALKING HER", , "R", "ADULT LANGUAGE, ADULT SITUATIONS, VIOLENCE", , ,
"03072010", "0330", "WABC", "ABC", "FPB", "0030", "SYNDICATED", "STORM STORIES", , , , , "WEATHER", , "JIM CANTORE", , , , , , , "TRUE ACCOUNTS OF LIFE-THREATENING, WEATHER-RELATED EVENTS", , "CLOSED CAPTIONED", , , , "IN STEREO", , , "PG",
"03072010", "0400", "WABC", "ABC", "FPB", "0030", "INSTRUCTIONAL", "RON HAZELTON'S HOUSECALLS", , , , , "EDUCATIONAL", , "RON HAZELTON", , , , , , , "REDEFINING AN OVERSIZED LIVING ROOM INTO TWO MORE LIVABLE SPACES USING KNEE WALLS AND COLUMNS; BLENDING A HARDWOOD FLOOR", , "CLOSED CAPTIONED", , , , "IN STEREO", , , "G",
"03072010", "0430", "WABC", "ABC", "FPB", "0030", "SYNDICATED", "STORM STORIES", , , , , "WEATHER", , "JIM CANTORE", , , , , , , "TRUE ACCOUNTS OF LIFE-THREATENING, WEATHER-RELATED EVENTS", , "CLOSED CAPTIONED", , , , "IN STEREO", , , "PG",
"03072010", "0500", "WABC", "ABC", "FPB", "0060", "SPECIAL", "ROAD TO GOLD: AN ACADEMY PREVIEW", , , , , "ENTERTAINMENT", , "SANDY KENYON", , , , , , , "A PREVIEW OF THE OSCARS PRESENTATION", , "CLOSED CAPTIONED", , , , "IN STEREO", , , "PG",

SAMPLE GUIDE DATA

FIG. 1I

| RUNTIME | PROPERTY | PRODUCT PURCHASED KEY | ZIP CODE | NET CUSTOMER VALUE | PANELIST ID | AGE IN TWO YEAR INCREMENTS-1ST INDIVIDUAL ID | BUSINESS OWNERS@ HOME INDICATOR ID | CHARITABLE GIVING SCORE ID | CHILD NEAR HIGH SCHOOL GRADUATION IN HHID |
|---|---|---|---|---|---|---|---|---|---|
| 1899-12-30 14:30:00.000 | CRT5 | 400 | 97152 | $100.00 | 10101 | 18 | NULL | 83 | NULL |
| 1899-12-30 11:00:00.000 | TRUTV | 400 | 87152 | $37.00 | 10102 | 17 | NULL | 43 | NULL |
| 1899-12-30 11:00:00.000 | TRUTV | 400 | 48313 | $321.00 | 10104 | NULL | NULL | 45 | NULL |
| 1899-12-30 06:00:00.000 | WWJ | 400 | 73737 | $12.31 | 10105 | 19 | NULL | 46 | NULL |
| 1899-12-30 16:30:00.000 | LP1 | 400 | 97152 | $19.95 | 10106 | 12 | NULL | 21 | NULL |
| 1899-12-30 11:30:00.000 | REELZ | 400 | 87152 | $119.32 | 10114 | 24 | NULL | 94 | NULL |
| 1899-12-30 06:30:00.000 | FOOD | 400 | 78252 | $37.15 | 10112 | 21 | NULL | 42 | NULL |
| 1899-12-30 09:00:00.000 | KTTV | 400 | 48313 | $231.11 | 10110 | 17 | NULL | 94 | NULL |
| 1899-12-30 08:30:00.000 | WDCA | 400 | 73737 | $901.11 | 10108 | 18 | NULL | 69 | NULL |

*FIG. 1J*

| CLUSTER ID | COLLEGE GRADUATE ID | CONGRESSIONAL DISTRICT ID | DWELLING TYPE ID | EDUCATION -1ST INDIVIDUAL ID |
|---|---|---|---|---|
| 15 | NULL | 6 | 2 | 3 |
| 16 | NULL | NULL | 2 | NULL |
| 41 | NULL | 4 | 2 | NULL |
| 1 | NULL | 10 | 2 | 2 |
| 4 | NULL | 2 | 2 | 2 |
| 29 | NULL | 17 | 2 | 3 |
| 23 | NULL | 7 | 2 | NULL |
| 22 | NULL | 41 | 2 | 1 |
| 7 | NULL | 5 | 2 | 1 |

*FIG. 1J CONTINUED*

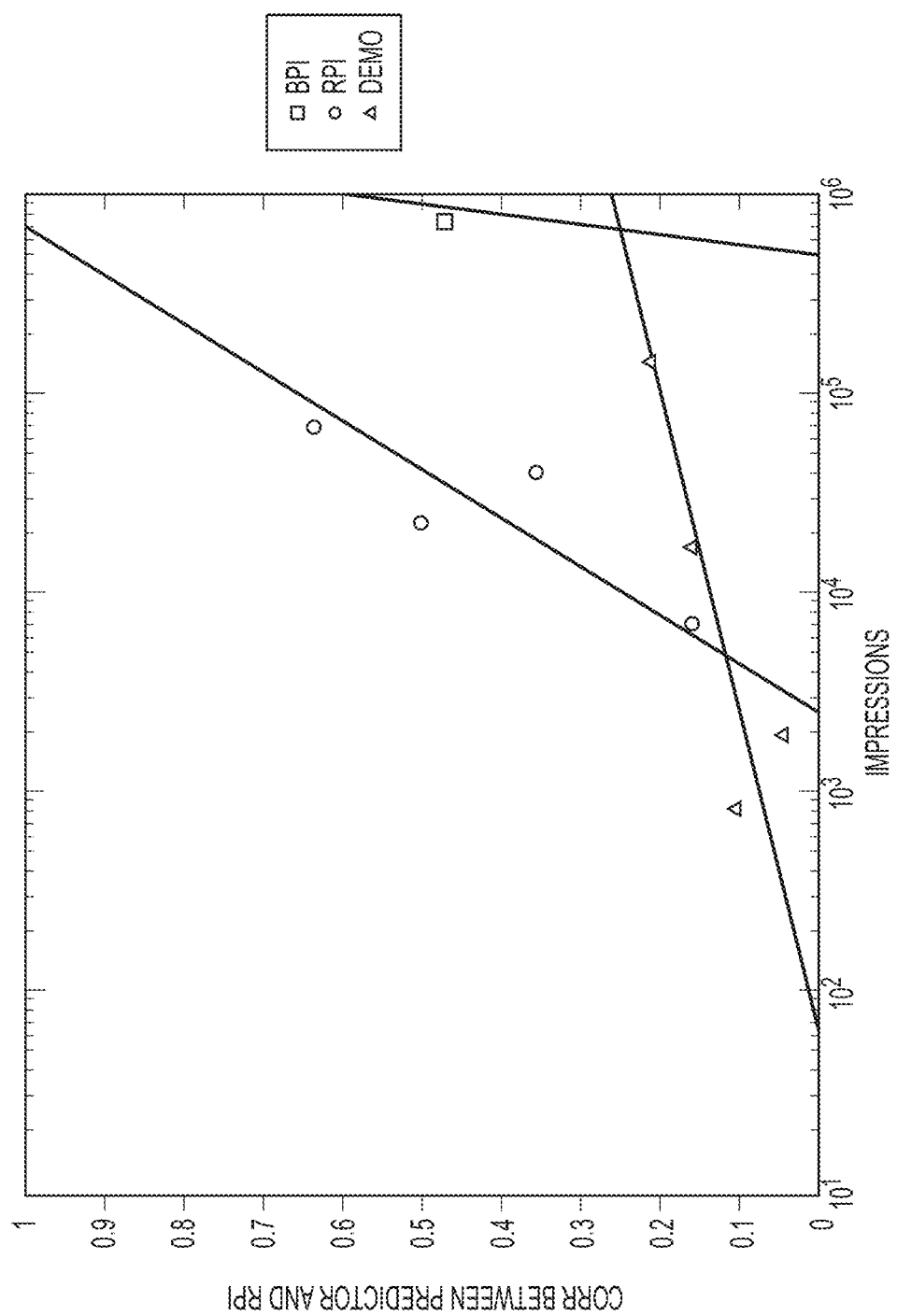

```
select
callletters,
'full week',
--datepart( dw,airdate) did,
DATEPART(hour,airdate) hid,
'full week',
--case datepart(dw,airdate) when 1 then 'Sun' when 2 then 'Mon' when 3 then 'Tues' when 4 then 'Wed' when 5 then 'Thu'
when 6 then 'Fri' when 7 then 'Sat' else 'Und' end dayofweek_name,
case when DATEPART(hour,airdate)> 12 then DATEPART(hour,airdate)- 12 else DATEPART(hour,airdate) end
hour_name,
case when DATEPART(hour,airdate)>=12 then 'pm' else 'am' end ampm
, COUNT(*) airings,
AVG(tratio) tratio, AVG(impressions) impressions, AVG(cpm) cpm, AVG( cost) cost
_' *
from scoring.AiringToBeScored a inner join
ExternalAudienceLandscape.NetworkAuth.StationAuthority b
on a.stationmasterid=b.stationmasterid
where jobid=10
and a.MarketMasterID=169
group by callletters,
--datepart( dw,airdate) ,
DATEPART(hour,airdate),
--case datepart(dw,airdate) when 1 then 'Sun' when 2 then 'Mon' when 3 then 'Tues' when 4 then 'Wed' when 5 then 'Thu'
when 6 then 'Fri' when 7 then 'Sat' else 'Und' end,
case when DATEPART(hour,airdate )> 12 then DATEPART(hour,airdate) - 12 else DATEPART(hour,airdate) end,
case when DATEPART(hour,airdate)>=12 then 'pm' else 'am' end
--DATEPART(hour,airdate)
order by COUNT(*) desc
```

FIG. 7A

```
-- Program historical airing counts
----------------------------------------
select
--
case
when b.channeldetail = 'local broadcast' then c.callletters -- use national
when b.ChannelDetail ='local cable' then c.callletters -- use national
else b.callletters end callletters,
--
programname, COUNT(*) airings,
AVG(tratio) tratio, AVG(impressions) impressions, AVG(cpm) cpm, AVG(cost) cost
from scoring.airingtobescored a
inner join demographics.dim.station b
-- ExternalAudienceLandscape.NetworkAuth.StationAuthority b
on a.StationMasterID=b.stationmasterid
left outer join
ExternalAudienceLandscape.NetworkAuth.StationAuthority c
--(select * from demographics.dim.station where not nationalstationmasterid is null) c
on b.nationalstationmasterid = c.stationmasterid
where jobid=10
and a.marketmasterid= 169
and not ProgramName ='[[[Unknown Programming]]]'
and not ProgramName is null
group by
case
when b.channeldetail = 'local broadcast' then c.callletters -- use national
when b.ChannelDetail = 'local cable' then c.callletters -- use national
else b.callletters end,
programname
order by
case
when b.channeldetail = 'local broadcast' then c.callletters -- use national
when b.ChannelDetail = 'local cable' then c.callletters -- use national
else b.callletters end, count(*) desc
-- SH historical airing counts
----------------------------------------
select
--
case
when b.channeldetail ='local broadcast' then c.callletters -- use national
when b.ChannelDetail = 'local cable' then c.callletters -- use national
else b.callletters end callletters,
--
```

*FIG. 7B*

```
'full week',
--datepart(dw,airdate) did,
DATEPART(hour,airdate) hid,
'full week',
--case datepart(dw,airdate) when 1 then 'Sun' when 2 then 'Mon' when 3 then 'Tues' when 4 then 'Wed' when 5 then 'Thu'
when 6 then 'Fri' when 7 then 'Sat' else 'Und' end dayofweek name,
case when DATEPART(hour,airdate)>12 then DATEPART(hour,airdate)- 12 else DATEPART(hour,airdate) end
hour_name,
case when DATEPART(hour,airdate)>=12 then 'pm' else 'am' end ampm
, COUNT(*) airings,
AVG(tratio) tratio, AVG(impressions) impressions, AVG(cpm) cpm, AVG(cost) cost
--' *
from scoring.AiringToBeScored a
inner join demographics.dim.station b
-- ExternalAudienceLandscape.NetworkAuth.StationAuthority b
on a.StationMaster ID=b .stationmasterid
left outer join
ExternalAudienceLandscape.NetworkAuth.StationAuthority c
--(select * from demographics.dim.station where not nationalstationmasterid is null) c
on b.nationalstationmasterid = c.stationmasterid
--inner join
-- ExternalAudienceLandscape.NetworkAuth.StationAuthority b
-- on a.stationmasterid=b.stationmasterid
where jobid=10
and a.MarketMasterID= 169
group by
case
when b.channeldetail = 'local broadcast' then c.callletters -- use national
when b.ChannelDetail ='local cable' then c.callletters -- use national
else b.callletters end,
--callletters,
--datepart(dw,airdate) ,
DATEPART(hour,airdate),
--case datepart(dw,airdate) when 1 then 'Sun' when 2 then 'Mon' when 3 then 'Tues' when 4 then 'Wed' when 5 then 'Thu'
when 6 then 'Fri' when 7 then 'Sat' else 'Und' end,
case when DATEPART(hour,airdate )> 12 then DATEPART(hour,airdate) - 12 else DATEPART(hour,airdate) end,
case when DATEPART(hour,airdate)>=12 then 'pm' else 'am' end
--DATEPART(hour,airdate)
order by COUNT(*) desc
```

*FIG. 7B cont.*

| variable | inputid | w | cadaine | wexpert | wadaine | present |
|---|---|---|---|---|---|---|
| 106-AgeGender2 Syndication Overall Station - Program Authority | 3 | 0.265049 | 0.738696 | 0.22935 | 0.482252 | 36% |
| 83-AgeGender2 Station - Program Authority | 11 | 0.513495 | 0.754156 | 0.228535 | 0.527781 | 34% |
| 76-AgeGender Program Authority - Quarter | 10 | 0.658508 | 0.721902 | 0.168441 | 0.598707 | 63% |
| 75-STBHead Program Authority - Quarter | 9 | 0.805406 | 0.119173 | 0.166059 | 0.117104 | 22% |
| TRP59 | 14 | 0.255535 | 0.613164 | 0.080331 | 0.394316 | 93% |
| 54-AgeGender Syndication Program | 2 | 0.562321 | 0.526005 | 0.066854 | 0.448314 | 93% |
| TRP | 12 | 0.382555 | 0.190885 | 0.030505 | 0.19696 | 93% |
| 105-AgeGender2 Syndication Overall Station - Day - Hour | 4 | 0.46389 | 0 | 0.02465 | 0 | 93% |
| TRP51 | 13 | 0.411829 | NaN | 0.005274 | 0 | 93% |
| 25-STBDevice-STB Program Name | 7 | 0.072989 | 0 | 0.000001 | 0 | 26% |
| 51-AgeGender Station - Day - Hour | 8 | -0.13606 | NaN | 0 | 0 | 93% |

FIG. 9J

| Var | Pres | weight |
|---|---|---|
| 177 - STBHead Weekpart - Daypart - Station - Program Authority - High Value | 2% | 22.124% |
| 174 - STBHead Station - Day - Hour - Quarter | 100% | 20.999% |
| 178 - AgeGender Weekpart - Daypart - Station - Program Authority - High Value | 15% | 16.872% |
| 175 - STBHead Program Authority – Quarter | 100% | 11.155% |
| 199 - STBHead Actual Airings Prior Station - Program – Hour | 89% | 9.382% |
| 198 – AgeGender2 Current Station - Program – Hour | 60% | 8.682% |
| 165 - AgeGender Station - Program Authority - High Value | 37% | 6.234% |
| 182 – AgeGender2 Station - Day – Hour | 100% | 2.829% |
| 186 - STBHead Current Quarter Station - Program Authority | 100% | 1.325% |
| 160 - STBHead Station - Program Authority | 89% | 0.304% |
| 166 - STBHead Station - Program Authority - High Value | 3% | 0.044% |
| 151 - AgeGender Station - Day – Hour | 100% | 0.037% |
| 132 - STBHead Station - Day – Hour | 100% | 0.009% |
| 128 - STBHead Program | 78% | 0.003% |
| 187 - STBHead Current Quarter Station - Day – Hour | 100% | 0.003% |

FIG. 9L

| Var | Present | weight |
|---|---|---|
| 194 - STBHead Actual Airings Minus 7 Days | 24% | 18.1204% |
| 197 - STBHead Actual Airings Minus 28 Days | 23% | 17.4635% |
| 151 - AgeGender Station - Day - Hour | 77% | 16.9081% |
| 187 - STBHead Current Quarter Station - Day - Hour | 89% | 12.7661% |
| 195 - STBHead Actual Airings Minus 14 Days | 23% | 12.3543% |
| 174 - STBHead Station - Day - Hour - Quarter | 89% | 11.0287% |
| 132 - STBHead Station - Day - Hour | 87% | 3.8501% |
| 199 - STBHead Actual Airings Prior Station - Program - Hour | 40% | 2.6417% |
| 82 - AgeGender2 Station - Day - Hour | 79% | 1.7760% |
| 177 - STBHead Weekpart - Daypart - Station - Program Authority - High Value | 0% | 1.3571% |
| 196 - STBHead Actual Airings Minus 21 Days | 23% | 1.3080% |
| 198 - AgeGender2 Current Station - Program - Hour | 31% | 0.4654% |
| 61 - AgeGender Local Station - Day - Hour | 77% | 0.0095% |

FIG. 9N

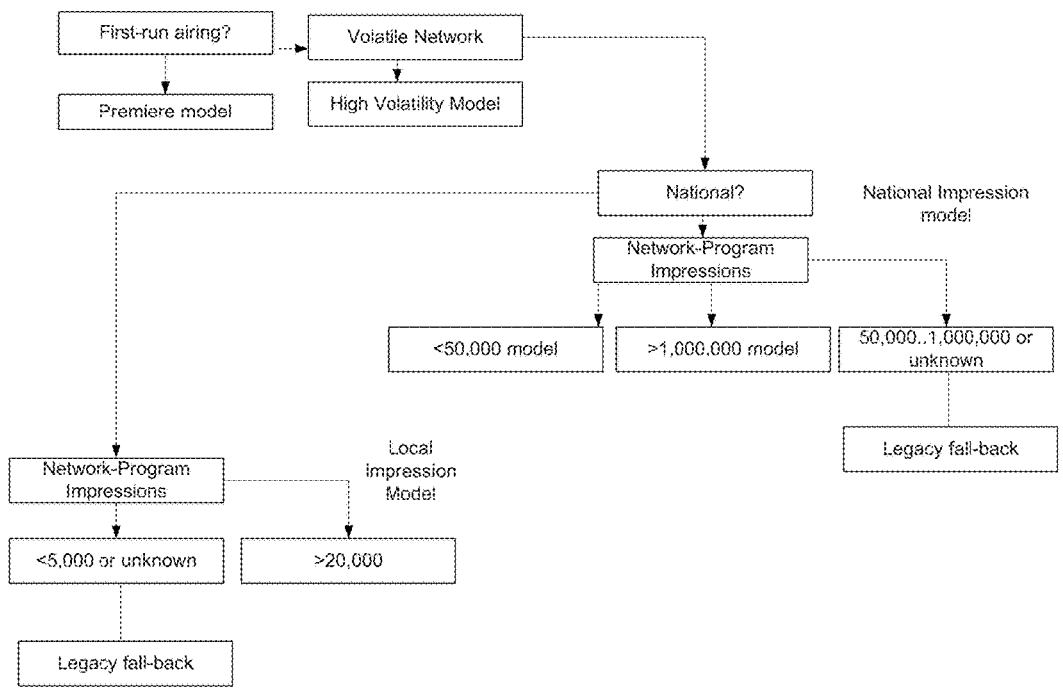

```
{
    "Id": 401537,
    "NId": 7,
    "PId": 87812,
    "Start": 635321016000000000,
    "WkN": 1,
    "DoW": 3,
    "Dayp": 0,
    "Dur": 30,
    "Imps": 161033,
    "Price": 5.9,
    "TR": 0.353,
    "C1TR": 0.211,
    "C2TR": 0.444,
    "C3TR": 0.283
},
{
    "Id": 401538,
    "NId": 7,
    "PId": 2095,
    "Start": 635321034000000000,
    "WkN": 1,
    "DoW": 3,
    "Dayp": 0,
    "Dur": 30,
    "Imps": 161033,
    "Price": 5.9,
    "TR": 0.307,
    "C1TR": 0.06,
    "C2TR": 0.412,
    "C3TR": 0.291
},
```

FIG. 15

```
{
  "Instance": {
    "Key": "10115-2014q2",
    "Version": 4,
    "Name": "Zero Day Campaign Q2 2014",
    "ProductCode": 10115,
    "ProductName": "Cyberdyne Systems",
    "MarketName": "National",
    "TargetKey": "110421",
    "TargetName": "Unsuspecting Humans",
    "WeightId": 20,
    "Quarter": 2,
    "Year": 2014,
    "CanReview": true,
    "DistributionChannels": [
      {
        "Id": 2,
        "Name": "National Cable"
      },
      {
        "Id": 5,
        "Name": "Syndication"
      },
      {
        "Id": 7,
        "Name": "National Broadcast"
      }
    ],
    "State": "Published",
    "RequestedDateTime": "2014-02-27T18:35:17",
    "LastPublishedDateTime": "2014-03-07T18:30:00",
    "DueDate": "2014-03-06T00:00:00"
  },
  "Clock": "Broadcast",
  "AiringCount": 388789,
  "ProgramCount": 16427,
  "Dayparts": [
    "Morning",
    "Daytime",
    "Early Fringe",
    "Primetime",
    "Overnight"
  ],
```

FIG. 16

SYSTEMS AND METHODS FOR A TELEVISION SCORING SERVICE THAT LEARNS TO REACH A TARGET AUDIENCE

CROSS-REFERENCE TO RELATED APPLICATIONS

This application is a continuation of U.S. patent application Ser. No. 15/467,411, filed on Mar. 23, 2017, which is a continuation of U.S. patent application Ser. No. 14/586,746, filed Dec. 30, 2014, now U.S. Pat. No. 9,641,882, issued May 2, 2017, which claims the benefit of priority to U.S. Provisional Patent Application No. 61/922,007, entitled "Television Advertisement Targeting that Balances Targeting Against Previous Airings," filed on Dec. 30, 2013, each of which is incorporated herein by reference in its entirety.

TECHNICAL FIELD

The present disclosure relates to systems and methods for evaluating television media instances for advertisement spots based on various factors for reaching television viewers who are desired product buyers.

BACKGROUND

Television is the largest advertising medium in the United States, with over 65 billion dollars in advertising revenue in 2011. According to Nielsen, approximately 20 times more hours are spent viewing TV as compared to viewings on either the Internet or mobile video. In 2013, there were about twice as many original programs on TV as compared to 2005, and over 60% of viewers were using High Definition ("HD") TVs.

If there is an area for improvement in TV, it is around how advertising can be effective and targeted to viewers. TV advertising is unlike online advertising because it has traditionally been a broadcast medium, i.e., a one way transmission of TV programs to the viewer with no direct feedback. In online advertising, it is possible to deliver ads to individual persons, via cookies and IP addresses, and to then track the behavior of those persons, including whether they convert after seeing the advertisement by observing their clicks on advertisements and conversions on web sites.

In TV, advertisements may be embedded in a single high definition video stream, and broadcast using over-the-air terrestrial transmission towers, satellite, and/or cable. The single signal transmission enables high bandwidth and very high quality TV signal. However, this introduces significant limitations. Apart from small experimental TV systems, there are currently no available technologies for delivering advertisements one-to-one to households at a scale equivalent to TV broadcasting.

A second major limitation is determining whether a purchase was influenced by the TV advertisement. Standard TV systems do not allow advertisers to know if individuals saw the advertisements. Further, standard TV systems cannot determine if an individual who is purchasing a product or service, saw the advertisement.

Because of these and other limitations, since the 1950s, this medium has been tracked using a 25,000 person, Nielsen "panel" with "diaries." The individuals on Nielsen's panel could report on what they saw on TV, and then this data could be extrapolated across the United States (115,000,000 households). This panel is both small and yet expensive to maintain. However, in the United States, set top boxes ("STBs") are now present in over 91.5% of US homes. Further, since 2009, STBs with return path capabilities have proliferated in the United States, comprising over 30% of STBs in households. The number of households with STBs is greater in size than the Nielsen panel, and the scale and richness of detail of STB data allows for new capabilities in TV advertisement targeting.

In order to utilize new capabilities, the present disclosure relates to systems and methods that use current U.S. data collection and U.S. TV broadcasting capabilities. As will be discussed in further detail below, the systems and methods discussed herein provide a framework for understanding certain TV targeting problems and approaches for solving them. Benefits of the present disclosure may include providing detailed descriptions of data formats available for television targeting; formalizing TV advertisement targeting problems into one or more objective functions; identifying variables available for advertisement targeting that can be used for targeting practical TV advertisement campaigns; providing a plurality of algorithms for TV data; and combining the plurality of algorithms to provide desired results.

SUMMARY OF THE DISCLOSURE

According to certain embodiments, methods are disclosed for teaching a television targeting system to reach product buyers. One method includes receiving, at a server, one or more heterogeneous sources of media data, the media data including television viewing events; generating, by the server, a plurality of media asset patterns from the one or more heterogeneous sources of media data, the plurality of media asset patterns being possible media placements which are represented as conjunctive expressions; calculating, by the server, one or more heterogeneous advertisement effectiveness measures for each media asset pattern; calculating, by the server for a plurality of pairs of an advertisement and a media instance, a number of previously placed airings of the advertisement in the media instance; and generating, by the server, a model to predict advertisement effectiveness for each pair of an advertisement and a media instance based on a combination of the ad effectiveness measures and the number of previously placed airings of the advertisement in the media instance.

According to certain embodiments, systems are disclosed for teaching a television targeting system to reach product buyers. One system includes a data storage device storing instructions; and a processor configured to execute the instructions to perform a method including: receiving, at a server, one or more heterogeneous sources of media data, the media data including television viewing events; generating, by the server, a plurality of media asset patterns from the one or more heterogeneous sources of media data, the plurality of media asset patterns being possible media placements which are represented as conjunctive expressions; calculating, by the server, one or more heterogeneous advertisement effectiveness measures for each media asset pattern; calculating, by the server for a plurality of pairs of an advertisement and a media instance, a number of previously placed airings of the advertisement in the media instance; and generating, by the server, a model to predict advertisement effectiveness for each pairing of an advertisement and a media instance based on a combination of the ad effectiveness measures and the number of previously placed airings of the advertisement in the media instance.

Additional objects and advantages of the disclosed embodiments will be set forth in part in the description that follows, and in part will be apparent from the description, or may be learned by practice of the disclosed embodiments.

The objects and advantages of the disclosed embodiments will be realized and attained by means of the elements and combinations particularly pointed out in the appended claims. As will be apparent from the embodiments below, an advantage to the disclosed systems and methods is that multiple parties may fully utilize their data without allowing others to have direct access to raw data. The disclosed systems and methods discussed below may allow advertisers to understand users' online behaviors through the indirect use of raw data and may maintain privacy of the users and the data.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 1B depicts exemplary data feeds of one or more media agencies of media plan data, according to exemplary embodiments of the present disclosure;

FIG. 1C depicts exemplary data feeds of one or more media agencies of media verification data, according to exemplary embodiments of the present disclosure;

FIG. 1D depicts exemplary data feeds of one or more media agencies of trafficking/distribution data, according to exemplary embodiments of the present disclosure;

FIG. 1E depicts exemplary data feeds of call center data of one or more call centers, according to exemplary embodiments of the present disclosure;

FIG. 1F depicts exemplary data feeds of e-commerce data of one or more e-commerce data vendors, according to exemplary embodiments of the present disclosure;

FIG. 1G depicts exemplary data feeds of order data of one or more data order processing/fulfillment providers, according to exemplary embodiments of the present disclosure;

FIG. 1H depicts exemplary data feeds of consumer data enrichment of one or more audience data enrichment providers from one or more data bureaus, according to exemplary embodiments of the present disclosure;

FIG. 1I depicts exemplary data feeds of guide data of one or more guide services, according to exemplary embodiments of the present disclosure;

FIG. 1J depicts exemplary data feeds of panel data of one or more panel data enrichment providers, according to exemplary embodiments of the present disclosure;

FIG. 3A depicts a graph of three major classes of an ad effectiveness metric including demographic match, phone response per impression ("RPI"), and buyers per impression ("BPI") versus the size of media being scored, according to exemplary embodiments of the present disclosure;

FIG. 7A depicts exemplary pseudo code in which queries count historical airings by station-day-hour, and count a number of airings in a program, according to exemplary embodiments of the present disclosure;

FIG. 7B depicts another exemplary pseudo code in which queries count historical airings by station-day-hour, and count a number of airings in a program, according to exemplary embodiments of the present disclosure;

FIG. 10 depicts an example of a branched model, according to exemplary embodiments of the present disclosure;

FIG. 14 depicts an example of a sample scored output text file, according to exemplary embodiments of the present disclosure;

FIG. 15 depicts another example of a sample scored output text file, including sample scored output, according to exemplary embodiments of the present disclosure;

FIG. 16 depicts another example JSON output from the scoring service showing a media instance being scored, according to exemplary embodiments of the present disclosure;

DETAIL DESCRIPTION OF EMBODIMENTS

Figure 1A:
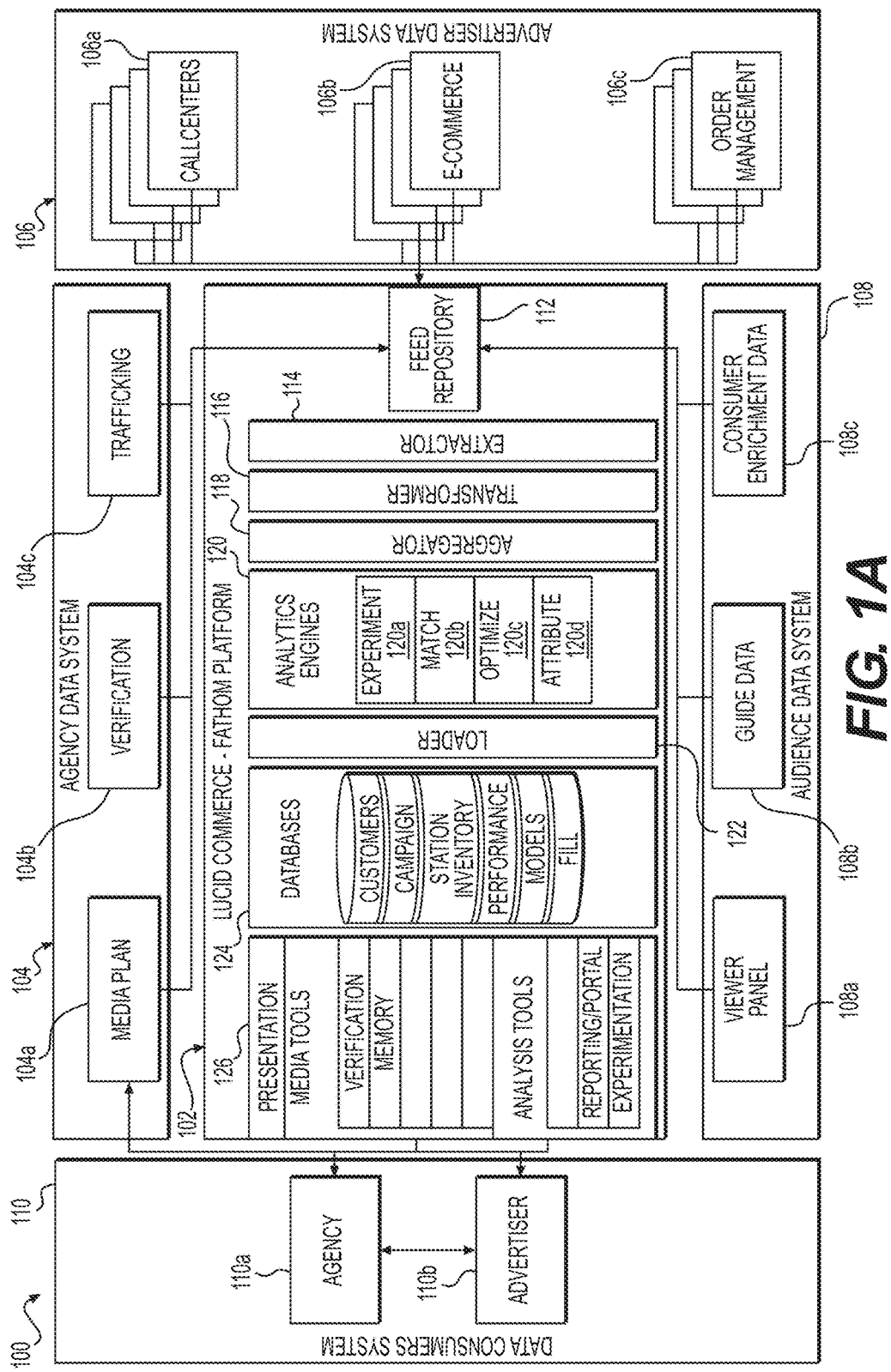
FIG. 1A depicts an exemplary analytics environment and an exemplary system infrastructure for modeling and detailed targeting of television media, according to exemplary embodiments of the present disclosure.

Aspects of the present disclosure, as described herein, relate to determining what television programs to place advertisements on for certain products, by evaluating aspects of the viewers of those television programs. Aspects of the present disclosure involve recognizing that media may be represented and evaluated by the demographics of the people who watch that media. The system may perform a match against media by looking for the television program whose viewers are the closest match to the customers that buy the product to be advertised. After the system finds a close match, it may recommend buying that media (i.e., placing the product ad within that television program). Aspects of the present disclosure may use targeting capabilities, tracking, and delivery, and may add in individualized information to its demographic segment information in order to improve the matching quality.

In one embodiment, the method used by a media buyer may include using Nielsen aggregated data to determine which program to purchase. Furthermore, while a Nielsen panel may be a useful data source and use of this data is described in this disclosure, the Nielsen viewer panel may be somewhat limited by its relatively small size, and limitations in covering certain geographic areas. Accordingly, a variety of enhancements are discussed for making the techniques described below compatible with multiple other data sources (including census data, set top box data, and linked buyer data) so as to create a highly complete and rich profile based on millions of viewers, over 400 variables, and buyers rather than viewers.

Various examples of the present disclosure will now be described. The following description provides specific details for a thorough understanding and enabling description of these examples. One skilled in the relevant art will understand, however, that the present disclosure may be practiced without many of these details. Likewise, one skilled in the relevant art will also understand that the present disclosure may include many other related features not described in detail herein. Additionally, some understood structures or functions may not be shown or described in detail below, so as to avoid unnecessarily obscuring the relevant description.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

The systems and method of the present disclosure allow for the receiving and processing of TV (media) related data and consumer related data from a plurality of different data sources and of a variety of different data types and formats. Based on the received data, the systems and methods may build a model that may be used to estimate a probability of reaching a particular set of persons. The estimated probability may then be used to determine a value associated with buying an advertisement spot within a television program for the advertisement.

System Architecture

Any suitable system infrastructure may be put into place to receive media related data to develop a model for targeted advertising for television media. FIG. 1A and the following discussion provide a brief, general description of a suitable computing environment in which the present disclosure may be implemented. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. In a distributed computing environment, program modules may be located in both local and remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Use of the system of FIG. 1A may involve multiple initial steps of setting up data feeds that can be used to receive data for building one or more models as described herein for evaluating television programs, estimating ad effectiveness, and estimating ad response.

One step may be to setup data feeds with one or more media agencies, which may ensure the collection of all the data about what media is being purchased, running, and trafficked to stations. This may also ensure that there is an accurate representation of the available television media. This step may include setting up data feeds for one or more of: media plan data (e.g., as shown in FIG. 1B), which may include data that is produced by media buyers purchasing media to run in the future; media verification data (e.g., as shown in FIG. 1C), which may include data that is generated by third-party verification services; and/or trafficking/distribution data (e.g., as shown in FIG. 1D), which may include sample trafficking instructions and/or order confirmations sent to TV stations; media response data which is the response of viewers to the TV ad, captured either through web activity, phone activity or other responses; TV schedule guide data which comprises data on upcoming program airings, TV set top box data which comprises a record of viewing activity from set top box subscribers; TV panel data which comprises a record of viewing activity from television viewers.

Media plan data may include a station a commercial will run on, an advertiser, topic information, a media cost associated with the purchase, a phone number, and/or a web address that is associated with the commercial for tracking purposes.

Third-party verification services may watermark commercials and monitor when the media was run across all TV stations. The data generated by third-party verification services may be used to verify that a media instance that was purchased for an advertisement spot was actually displayed on TV.

The sample trafficking instructions and/or order confirmation may include a product that was purchased, and instructions that a station is to use when displaying a commercial.

Another step may be to setup data feeds with one or more call centers, which may ensure there is accurate data about callers that called into specific phone numbers. This step may include receiving a call center data feed (e.g., as shown in FIG. 1E). Call center data may include any data associated with phone responses to phone numbers displayed in a commercial.

Yet another step may be to setup one or more data e-commerce vendor data feeds. E-commerce data feeds may be setup to receive recurring data feeds with a vendor and/or internal system of an advertiser that records orders that come in from an advertiser's website (e.g., as shown in FIG. 1F). E-commerce data may include orders that came in on an advertiser's website, customer information, and/or a time, volume, and/or substance of the orders. Another step may be to set up one or more web activity feeds with a vendor and/or internal system of an advertiser that records web activity corresponding to TV broadcasts.

Another step may be to setup one or more data order processing/fulfillment data feeds. Data order processing/fulfillment data feeds may be setup to receive recurring data feeds with order vendor and/or internal system that physically handles the logistics of billing and/or fulfillment. This step may ensure an accounting of subsequent purchases, such as subscriptions and for returns/bad debt, etc., and may ensure accurate accounting for revenue. This step may also include receiving data from a series of retail Point of Sale ("PoS") systems (e.g., as shown in FIG. 1G). Order data may include a purchase record, subsequent purchases, debt collection information, and return information.

Another step may be to setup one or more audience data enrichment data feeds with one or more data bureaus. This step may ensure that callers, web-converters, and/or ultimate purchasers have their data attributes appended to their record in terms of demographics, psychographics, behavior, etc. (e.g., as shown in FIG. 1H). Examples of data bureaus may include Experian, Acxiom, Claritas, etc. This data may include attributes about consumers from the various data bureaus, such as demographics, psychographics, behavioral information, household information, etc.

Yet another step may be to setup one or more data feeds with one or more guide services. This step may ensure that forward looking guide service data is ingested into the system. This data may be programming based on what is going to run on television for the weeks ahead (e.g., as shown in FIG. 1I). This upcoming media may be scored to determine which of this media should be purchased. Program guide data may include data related to a future run of programming, such as a station, time, program name, program type, stars, and general text description.

Another step may be to setup one or more data feeds for panel data enrichment. Data related to purchasers of products on television, set top box viewer records, and/or existing panels may be received as a data feed and appended to an advertiser's purchaser data mentioned above (FIG. 1J). Panel data enrichment may include viewer/responder data, such as demographic, psychographic, and/or behavioral data.

In another step, all of the underlying data may be put into production. For example, all of the data feeds setup from steps one through seven may be loaded into an intermediate format for cleansing, adding identifiers, etc. Personally Identifiable Information ("PII") may also be split and routed to a separate pipeline for secure storage. As shown in FIG. 1A, an analytics environment 100 may include a media processing system 102, an agency data system 104, an advertiser data system 106, an audience data system 108, and a processed media consumer system 110.

At the next step, media plan data 104a, verification data 104b, and/or trafficking data 104c of the agency data system 104 may be received at a data feed repository 112 of the media processing system 102. Further, call center data 106a, e-commerce data 106b, and/or order management data 106c of advertiser data system 106 may be received at the data feed repository 112. Additionally, viewer panel data 108a, guide data 108b, and/or consumer enrichment data 108c of the audience data system 108 may be received at the data feed repository 112. After one or more of data feeds are received by the feed repository 112, data may be extracted from the data feeds by extractor 114 of media processing system 102.

At another step, business logic/models may be run for matching responses and orders to media ("attribution"). In this step, the data extracted from the data feeds has been ingested into the system at the most granular form. Here, the phone responses may be matched up to media that generated it. The e-commerce orders may be matched using statistical models to the media that likely generated them. As shown in FIG. 1A, transformer 116, aggregator 118, and analytics engine 120 of the media processing system 102 may process the aggregated data of the data feeds. Analytics engine 120 may include various sub-engines, such as experiment engine 120a, match engine 120b, optimize engine 120c, and/or attribute engine 120d, to perform various analytical functions.

At yet another step, the analyzed data may be loaded into databases. For example, the data may have already been aggregated and/or final validation of the results may have been completed. After this, the data may be loaded by loader 122 into one or more databases 124 for use with any of the upstream media systems, such as data consumers system 110. These include the ability to support media planning through purchase suggestions, revenue predictions, pricing suggestions, performance results, etc. One or more databases 124 may include customers database 124, campaign database 124, station inventory database 124, performance database 124, models database 124, and/or PII database 124.

At another step, the analyzed data may be used by presentation module 126. In this step, all of the data may be accessible to the operators of various roles in the media lifecycle. This may include graphical tools for media planning (where the targeting in this application primarily fits), optimization, billing, trafficking, reporting, etc.

The above-described system may be used to gather, process, and analyze TV related data. This data may then be used to identify certain available media instances, or advertisement spots, that an advertiser may purchase to display an advertisement. As will be described in further detail below, advertisement spots, also referred to as media instances, may be evaluated and scored to assist an advertiser in choosing which media instance to purchase.

Media Instances

As described above, a TV media instance, Mi, may be any segment of time on TV that may be purchased for advertising. The media instance, Mi, as an element of the Cartesian product, may be defined as follows:

$$M_i \in S \times P \times D \times H \times T \times G \times POD \times POS \times L$$

where S is station, P is program, D is day-of-week, H is hour-of-day, T is calendar-time, G is geography, POD is the ad-pod, POS is the pod-position, and L is media-length.

Stations may include broadcast and/or cable stations, and may be identified by their respective call letters, such as KIRO and CNN. Geography may include national (nationwide), one or more direct market association areas, such as Miami, Fla., and/or cable zones, such as Comcast Miami Beach.

An ad-pod may be a set of advertisements that run contiguously in time during a commercial break for a TV program. Pod-position may be the sequential order of the advertisement within its pod. Media length may be the duration of the time segment in seconds. Media length, for example, may include 15, 30, 45, and/or 60 second spots.

The present disclosure allows the advertiser to select a set of media instances, $M_i$, to purchase for advertisement targeting for an ideal audience. The present disclosure also allows the advertiser to provide a bid, CPI ($M_i$) cost per impression, such that the expected advertisement response per dollar is maximized, as follows:

$$M_i : \max \Sigma_i rpi_\Omega(M_i) \cdot I(M_i)$$

subject to $\Sigma_i CPI(M_i) \cdot I(M_i) \leq B$ and $V(\{M_i\}) = \text{true}$ where $rpi_\Omega(M_i)$ is the response (also referred to as a conversion, a sale, and/or revenue) per impression or target-audience-concentration per impression or probability-of-target-audience per impression for the given media instance, $M_i$; $I(M_i)$ are the impressions for media instance, $M_i$; B is the TV campaign budget; and V determines if the set of media instances, $M_i$, violates advertiser-defined rotation rules. Rotation rules may be, for example, running an advertisement no more than once per 60 minutes, having no greater than 5% of budget on any one network or day-part, etc. Rotation rules may be defined by TV advertisement buyers and/or broadcast networks.

One embodiment of the present disclosure is to iteratively select media instances in order of value per dollar, as follows:

$$M_i : \max \frac{rpi_\Omega(M_i)}{CPI(M_i)}$$

subject to rotation rule constraints V until the budget is filled. $CPI(M_i)$ and $rpi_\Omega(M_i)$ are both estimates using historical clearing prices and media observations.

Methods will next be described for estimating the response per impression or target-audience-concentration per impression "$rpi_\Omega(M_i)$" part of the formula above.

Media Asset Patterns

A media asset pattern may be any set of variable value instantiations of a media instance. Formally, media asset pattern, may be a subset of instantiated features from the media instance $M_i$ $m_{i,t} \subseteq M_i$, for example, a future media instance that is under consideration to buy may be $M_i$ = (CNN, 8 pm, "Piers Morgan", Tuesday, Dec. 12, 2012, Pod1, Pos2, 60s). The following media asset patterns may be used to predict its performance: Station $m_{i1}$=(CNN); Station-Hour-Pod $m_{i2}$=(CNN, 8 pm, Pod1); Geography-Station $m_{i3}$=(National-CNN); and others.

Table 1, below, shows a list of Media Asset Patterns used in one embodiment of the present disclosure.

TABLE 1

Media Asset Pattern types, and RPI functions used in one embodiment

| MapType NameSanitized | MAPType | Response per impression calculation | Description |
| --- | --- | --- | --- |
| 1-MBDemo-Station | Station | TRatio | Match between Panel viewer demographics for a station and product buyers |
| 2-MBDemo-Program | Program | TRatio | Match between Panel viewer demographics for a program and product buyers |
| 3-Genre | NULL | TRatio | Match between Panel viewer demographics for a program's genre classification and product buyers |
| 4-MBDemo-Station-Rotation | Station-Rotation | TRatio | Match between Panel viewer demographics for a Station-Daypart and product buyers |

TABLE 1-continued

Media Asset Pattern types, and RPI functions used in one embodiment

| MapType NameSanitized | MAPType | Response per impression calculation | Description |
|---|---|---|---|
| 5-MBDemo-Day of Week-Hour of Day | Day of Week-Hour of Day | TRatio | |
| 6-MBDemo-Day of Week | Day of Week | TRatio | |
| 7-MBDemo-Hour of Day | Hour of Day | TRatio | |
| 8-MediaMarket | MediaMarket | TRatio | |
| 9-State | State | TRatio | |
| 10-State per capita | State | TRatio | Number of buyers per capita in a state |
| 11-DMA per capita | DMA | TRatio | Number of buyers per capita in a DMA area |
| 12-Zone | Zone | TRatio | Number of buyers per capita in a cable zone area |
| 13-Zone per capita | Zone | TRatio | Number of buyers per capita in a cable zone area |
| 14-MBDemo-Station-Day-Hour | Station-Day-Hour | TRatio | |
| 15-Advertising Patch Area per capita | Patch | TRatio | Number of buyers per capita in an advertising patch area |
| 16-STBDevice-Station | Station | TRatio | Match between STB Device level demographics for Station and product buyers |
| 17-STBDevice-Station-Rotation | Station-Rotation | TRatio | |
| 18-STBDevice-Station-Day-Hour | Station-Day-Hour | TRatio | |
| 19-STBDevice-Station-Day | Station-Day | TRatio | |
| 20-STBDevice-Station | Station | TRatio | |
| 21-STBDevice-Station-Rotation | Station-Rotation | TRatio | |
| 22-STBDevice-Station-Day-Hour | Station-Day-Hour | TRatio | |
| 23-STBDevice-Day of Week | Day of Week | TRatio | |
| 24-STBDevice-Station-Program Authority | Station-Program Authority | TRatio | |
| 25-STBDevice-Program | Program | TRatio | |
| 26-Zip Code per capita | Zipcode | TRatio | Number of buyers per capita in Zipcode |
| 27-STBHead-Station | Station | TRatio | Match between STB Head-End level Station viewing demographics and buyers |
| 28-STBHead-Program | Program | TRatio | |
| 29-STBHead-Day of Week | Day of Week | TRatio | |
| 30-STBHead-Hour of Day | Hour of Day | TRatio | |
| 31-STBHead-Station-Rotation | Station-Rotation | TRatio | |
| 32-STBHead-Station-Day-Hour | Station-Day-Hour | TRatio | |
| 33-USCensus-DMA | DMA | TRatio | Match between US Census demographics for DMA and product buyers |
| 34-USCensus-Zip Code | Zip Code | TRatio | Match between US Census demographics for zip and product buyers |
| 35-STBDevice-Station-Day-Hour-Program | Station-Day-Hour-Program | TRatio | |
| 36-STBHead-DMA-Station-Day-Hour | DMA-Station-Day-Hour | TRatio | |
| 37-Telesale-Station | Station | RPI | Phone responses per impression historically recorded when running on this national station (e.g., ABC) |

TABLE 1-continued

Media Asset Pattern types, and RPI functions used in one embodiment

| MapType NameSanitized | MAPType | Response per impression calculation | Description |
|---|---|---|---|
| 38-Telesale-Station-Day-Hour | Station-Day-Hour | RPI | Phone responses per impression historically recorded when running on this station-day-hour |
| 39-Telesale-Station-Local | Station | RPI | Phone responses per impression historically recorded when running on this local area station (e.g., KIRO) |
| 40-Telesale-Station-Day-Hour-Local | Station-Day-Hour | RPI | |
| 41-STBHead-Actual Airings | Airing | Impressions | |
| 42-STBHead-DMA-Station-Day-Hour-Local | DMA-Station-Day-Hour | Impressions | |
| 43-Telesale-Phone Response Actual Airings | Phone Response Actual Airings | RPI | |
| 44-STBSale-Source Viewers Actual | Airing | SourceViewPct | |
| 45-STBSale-Station-Day-Hour | Station-Day-Hour | SourceViewPct | Buyers per impression measured in the audience of this station-day-hour |
| 46-STBSale-Station | Station | SourceViewPct | |
| 47-STBSale-Station-Program | Station-Program | SourceViewPct | |
| 48-AgeGender-CompetitiveData Source Actual Airings | Airing | Impressions | |
| 49-AgeGender-DMA-Station | DMA-Station | Impressions | |
| 50-AgeGender-DMA-Station-Day-Hour | DMA-Station-Day-Hour | Impressions | |
| 51-AgeGender-Station-Day-Hour | Station-Day-Hour | TRatio | |
| 52-AgeGender-Station | Station | TRatio | Match between age-gender demographics of panel viewers on this station versus buyers |
| 53-AgeGender-Station-Program | Station-Program | TRatio | |
| 54-AgeGender-Syndication Station-Program Authority | Station-Program Authority | TRatio | Match between age-gender demographics of panel viewers on this Syndication station versus buyers |
| 55-AgeGender-Program Authority | Program Authority | TRatio | |
| 56-STBDevice-ActualAiring | Airing | TRatio | |
| 57-Telesale-Station | Station | RPI | |
| 58-Telesale-Station-Day-Hour | Station-Day-Hour | RPI | |
| 59-AgeGender-Station-Program Authority | Station-Program Authority | TRatio | |
| 60-STBHead-Station-Program Authority | Station-Program Authority | TRatio | |
| 61-AgeGender-DMA-Station-Day-Hour-Local | DMA-Station-Day-Hour | Cost | |
| 62-AgeGender-DMA-Station-Local | DMA-Station | Cost | |
| 63-AgeGender-DMA Station-Program Authority-Local | DMA Station-Program Authority | Cost | |
| 64-AgeGender-CompetitiveData Actual Airings-Local | Airing | Cost | |

TABLE 1-continued

Media Asset Pattern types, and RPI functions used in one embodiment

| MapType NameSanitized | MAPType | Response per impression calculation | Description |
|---|---|---|---|
| 65-AgeGender-SpecialEvent-Station-Program Authority | Station-Program Authority | Impressions | |
| 66-STBHead-SpecialEvent-Station-Program Authority | Station-Program Authority | Impressions | |
| 67-STBHead-Station-Day-Hour-Local/Airing | Station-Day-Hour | Impressions | |
| 68-5 minute Attributed Web Spike Station-Program Authority | Station-Program Authority | WPI | |
| 69-5 minute Attributed Web Spike Station-Day-Hour | Station-Day-Hour | WPI | |
| 70-5 minute Attributed Web Spike Station | Station | WPI | |
| 71-Day Hour Subtracted Web Response Verified Airing-Station-Program Authority | Station-Program Authority | WPI | |
| 72-Day Hour Subtracted Web Response Verified Airing Station-Day-Hour | Station-Day-Hour | WPI | |
| 73-Day Hour Baseline Subtracted Web Response Verified Airing Station-Day-Hour | Station-Day-Hour | WPI | |
| 74-STBHead-Station-Day-Hour-Quarter | Station-Day-Hour-Quarter | TRatio | |
| 75-STBHead-Program-Quarter | Program Authority-Quarter | TRatio | |
| 76-AgeGender-Program-Quarter | Program Authority-Quarter | TRatio | |
| 77-STBHead-Weekpart-Daypart-SpecialEvent-Station-Program Authority | Weekpart-Daypart-Station-Program Authority | TRatio | |
| 78-AgeGender-Weekpart-Daypart-SpecialEvent-Station-Program Authority | Weekpart-Daypart-Station-Program Authority | TRatio | |
| 79-N-Magazine | Magazine | TRatio | |
| 80-STBHead-LocalDMA-Station-Program | DMA Station-Program Authority | TRatio | |
| 81-STBHead-STBHead-Currrent Quarter-Station-Program Authority | Station-Program Authority | TRatio | |
| 82-AgeGender-Station-Day-Hour | Station-Day-Hour | TRatio | |
| 83-AgeGender-Station-Program | Station-Program Authority | TRatio | |
| 84-STBSale-Station-Program | Station-Program Authority | SourceView MinutesPct | |
| 84-STBSale-Station-Day-Hour | Station-Day-Hour | SourceView MinutesPct | |
| 86-Station-Program Authority | Station-Program Authority-Quarter | Impressions | |

TABLE 1-continued

Media Asset Pattern types, and RPI functions used in one embodiment

| MapType NameSanitized | MAPType | Response per impression calculation | Description |
|---|---|---|---|
| 87-Station-Day-Hour | Station-Day-Hour-Quarter | Impressions | |
| 89-AgeGender-Station-Day-Hour-Week | Station-Day-Hour-Week | Impressions | |
| 90-STBHead-FirstAiring-Station-Program | Station-Program Authority-First Airing | Impressions | |
| 91-AgeGender-DMA-Station-Day-Hour | DMA-Station-Day-Hour | TRatio | |
| 92-AttribuedWebSpike-Station-Day-Hour | Station-Day-Hour | WPI | |
| 93-AgeGender-Station-Program-PodA | Station-Program Authority-Pod | Impressions | |
| 94-STBHead-Actual Airings Minus 7 Days | Same time minus 7 days | Impressions | |
| 95-STBHead-Actual Airings Minus 14 Days | Same time minus 14 days | Impressions | |
| 96-STBHead-Actual Airings Minus 21 Days | Same time minus 21 days | TRatio | |
| 97-STBHead-Actual Airings Minus 28 Days | Same time minus 28 days | Impressions | |
| 98-STBHead-Station-Program-Hour | Station-Program-Hour | Impressions | |
| 99-STBHead-Actual Airings-Station-Program-Hour | Most recent known airing of same program | Impressions | |
| 100-STBHead-Actual Airings-Minus 29 to 42 Days | Same time 29-42 days prior to present | Impressions | |
| 101-STBHead-Actual Airings-Minus 43 to 56 Days | Same time 43-56 days prior to present | Impressions | |
| 102-STBHead-Actual Airings-Minus 57 to 70 Days | Same time 57-70 days prior to present | Impressions | |
| 103-AdapTV Video Publisher Sites | Digital video publisher site | NULL | |
| 104-AdapTV Segments | Digital Segment | NULL | |
| 105-AgeGender-Syndication-Station-Day-Hour | Station-Day-Hour | TRatio | |
| 105-AgeGender-Syndication-Station-Program Authority | Station-Program Authority | TRatio | |

Examples of various media asset pattern types will now be described in more detail.

Media Asset Pattern Example 1A: Station-Program

TV programs are intuitively what people tune into when watching television. Different programs appeal to different people. For example, viewers of TLC's "I Didn't Know I Was Pregnant" may be different from viewers of SYFY's "Continuum."

There are over 450,000 weekpart-daypart-programs available to be purchased on TV. The programs may be good predictors of advertisement performance. An example of media asset patterns and their calculated ad effectiveness scores is shown in table 2, below.

TABLE 2

Media Asset Pattern 60 (STBHead-Station-Program) and ad effectiveness scores

| MediaAssetPatternKey | sourcesegmentkey | MediaAssetPatternTypeID | Correlation |
|---|---|---|---|
| ABC-Insanity Workout! | 110356 | 60 | 0.05977 |
| ABC-Inside Edition | 110356 | 60 | 0.043434 |
| ABC-Inside Story | 110356 | 60 | 0.194032 |
| ABC-Inside the Big East | 110356 | 60 | 0.122061 |
| ABC-Inside Washington | 110356 | 60 | −0.06444 |

Media Asset Pattern Example 1B: High-Value Station-Program

In addition to using programs in general, it is also possible to demarcate a special class of programs which may be referred to as "high impact programs." These programs have high observed impressions per expected impressions for their station-timeslot, $$\frac{I(m_P)}{I(m_{SDH})}.$$

Impactful programs may include event programs, such as "The Academy Awards," football games, and very popular reality programs, e.g., "Dancing with the Stars." Impactful programs may also include "cultural phenomena," such as "Honey Badgers!" Table 3 below depicts programs and their respective impressions performance relative to their expected performance in their timeslot. A media asset pattern of High-Impact-Program can then be established and used by the system.

TABLE 3

| Station-Program | RE |
|---|---|
| NFLN-NFL Football | 20.49714 |
| NBC-Super Bowl XLVI | 18.06963 |
| NFLN-Postgame | 15.35507 |
| CBS-Super Bowl XLIV | 15.2775 |
| ESPN-NFL Football | 12.66412 |
| NBCSN-2012 NHL All-Star Game | 10.47042 |
| SPD-NASCAR Sprint Cup | 10.39651 |
| FOX-Super Bowl XLV | 9.862597 |
| E!-Live from the Red Carpet: The 2012 Grammy Awards | 4.467404 |
| NBC-Macy's Thanksgiving Day Parade | 4.434626 |
| ABC-Oscars Red Carpet Live | 4.288276 |
| BBCA-William & Kate: The First Year | 4.135 |
| ABC-Dancing With the Stars | 4.126531 |
| VH1-2010 MTV Video Music Awards | 3.863292 |
| ABC-CMA Awards 2011 | 3.831977 |
| FUSE-Whitney Houston: A Tribute | 3.770582 |
| VH1-2011 Video Music Awards | 3.423895 |
| E!-Live from the Red Carpet: The Academy Awards | 3.30741 |
| NBC-Voice | 3.305157 |
| CNN-Arizona Republican Presidential Debate | 3.086414 |
| CNN-New Hampshire GOP Debate | 3.009244 |
| E!-Live from the Red Carpet: Grammys | 2.987157 |
| WILD-Honey Badgers | 2.939016 |

Media Asset Pattern Example 2: Station-Day-Hour

Stations often run similar programming in the same station-day-hour timeslots. This information may add value as a predictor, as some demographics may have a propensity to watch TV on certain times of day. For example, high income people tend to watch in prime-time, but not daytime. Weekday, daytime programming may be highly skewed toward older and/or lower income households.

TABLE 4

Media Asset Patterns for MAPType 32-STBHead-Station-Day-Hour

| MediaAssetPatternKey | sourcesegmentkey | MediaAssetPatternTypeID | Correlation |
|---|---|---|---|
| ABC-Su-4 pm | 110356 | 32 | −0.49971 |
| ABC-Su-5 am | 110356 | 32 | 0.114984 |
| ABC-Su-5 pm | 110356 | 32 | −0.26138 |
| ABC-Su-6 am | 110356 | 32 | 0.279073 |
| ABC-Su-6 pm | 110356 | 32 | 0.005131 |
| ABC-Su-7 am | 110356 | 32 | 0.115856 |
| ABC-Su-7 pm | 110356 | 32 | −0.04855 |
| ABC-Su-8 am | 110356 | 32 | 0.07703 |
| ABC-Su-8 pm | 110356 | 32 | −0.32483 |
| ABC-Su-9 am | 110356 | 32 | −0.19655 |
| ABC-Su-9 pm | 110356 | 32 | −0.43123 |

Media Asset Pattern Example 3: Program Master and Other Mastered Taxonomies

Program names are often recorded in television panel data and schedules in a variety of inconsistent ways, often because television program data is hand-entered. Thus when a buyer is attempting to buy "Cold Case," the present disclosure may fail to find a match for "Cold Case" because the panel data might have recorded this as "Cold Case Sat." In order to address this, the presently disclosed methods may use a series of mapping tables to map native panel strings to "mastered" versions of those strings, which may facilitate matching. The present disclosure also allows editors to inspect the native strings, and uses edit distance to identify similar mastered strings that each native string may be mapped to. These "mastered" program names are then used in media asset patterns. Examples of program master mappings are shown in Tables 5A-5C, below.

Table 5A: Program Master table showing entries for "Cold Case". "Cold Case" appears in various panel sources described using a variety of strings. These are mapped to a consistent string (ProgramMaster).

TABLE 5A

| ExternalProgramMappingID | NielsenShowTitle | Title |
|---|---|---|
| 137564 | COLD CASE | Cold Case |
| 137567 | COLD CASE FRI | Cold Case |
| 137568 | COLD CASE FRI 2 | Cold Case |
| 137569 | COLD CASE FRI 3 | Cold Case |
| 137570 | COLD CASE FRI 4 | Cold Case |
| 137571 | COLD CASE FRI 5 | Cold Case |
| 137572 | COLD CASE FRI 6 | Cold Case |
| 137573 | COLD CASE FRI 7 | Cold Case |
| 137574 | COLD CASE FRI 8 | Cold Case |
| 239948 | COLD CASE FRI 9 | Cold Case |
| 137575 | COLD CASE MON | Cold Case |
| 137576 | COLD CASE MON 2 | Cold Case |
| 137577 | COLD CASE MON 3 | Cold Case |

TABLE 5A-continued

| ExternalProgramMappingID | NielsenShowTitle | Title |
|---|---|---|
| 225605 | COLD CASE MON 4 | Cold Case |
| 225606 | COLD CASE MON 5 | Cold Case |
| 225607 | COLD CASE MON 6 | Cold Case |
| 137578 | COLD CASE SPEC | Cold Case |
| 137579 | COLD CASE SUS 2 | Cold Case |
| 137580 | COLD CASE SYN AT | Cold Case |
| 137581 | COLD CASE SYN MYNET AT | Cold Case |
| 137582 | COLD CASE THURS | Cold Case |
| 137583 | COLD CASE THURS 2 | Cold Case |
| 137584 | COLD CASE THURS 3 | Cold Case |
| 137585 | COLD CASE WED | Cold Case |
| 137586 | COLD CASE WED 2 | Cold Case |
| 137587 | COLD CASE WED 3 | Cold Case |
| 197923 | COLD CASE WED 4 | Cold Case |
| 197924 | COLD CASE WED 5 | Cold Case |
| 197925 | COLD CASE WED 6 | Cold Case |
| 197926 | COLD CASE WED 7 | Cold Case |
| 137565 | COLD CASE FILES | Cold Case Files |
| 137566 | COLD CASE FILES M-F | Cold Case Files |

Table 5B: Program Master table showing entries for "Countdown to the Grammys."

TABLE 5B

| ExternalProgramMappingID | NielsenShowTitle | Title |
|---|---|---|
| 138687 | COUNTDOWN 2010 GRAMMYS | Countdown to the Grammys |
| 138691 | COUNTDOWN 2011 GRAMMYS | Countdown to the Grammys |
| 138713 | COUNTDOWN TO THE GRAMMYS | Countdown to the Grammys |
| 143909 | GRAMMY FASHION WRAP | Grammy Awards Fashion Wrap |
| 138733 | COUNTDOWN: 2012 GRAMMYS | Grammy Awards Red Carpet Countdown |
| 143908 | GRAMMY AWARDS RED CARPET | Grammy Awards Red Carpet Countdown |
| 143912 | GRAMMY RED CARPET CNTDWN | Grammy Awards Red Carpet Countdown |
| 132317 | 2012 GRAMMY TAKEOVER | Grammy Takeover |
| 147822 | LRC: 2011 GRAMMYS | Live from the Red Carpet: The Grammy Awards |
| 147826 | LRC: 2012 GRAMMYS | Live from the Red Carpet: The Grammy Awards |
| 143907 | GRAMMY AWARDS | The Grammy Awards |
| 147405 | LIVE AT THE GRAMMYS | The Grammy Awards |
| 143911 | GRAMMY NOMINATIN CNCRT SP | The Grammy Nominations Concert Live!!: Countdown to Music's Biggest Night |

Table 5C: Program Master table showing entries for "Academy Awards Red Carpet."

TABLE 5C

| ExternalProgramMappingID | NielsenShowTitle | Title |
|---|---|---|
| 132829 | ACADEMY AWARDS PREVIEW | Academy Awards Preview |
| 132586 | 84TH OSCAR RED CARPET | Academy Awards Red Carpet |
| 151411 | OSCARS RED CARPET 2010 | Academy Awards Red Carpet |
| 151412 | OSCARS RED CARPET LIVE 1 | Academy Awards Red Carpet |
| 151413 | OSCARS RED CARPET LIVE 2 | Academy Awards Red Carpet |

TABLE 5C-continued

| ExternalProgramMappingID | NielsenShowTitle | Title |
|---|---|---|
| 151414 | OSCARS RED CARPET LIVE 3 | Academy Awards Red Carpet |
| 138685 | COUNTDOWN ACADEMY AWARDS | Academy Awards Red Carpet Countdown |
| 132634 | AA FSHIN WRAP-CARRIE ANN | Academy Awards Red Carpet Fashion Wrap |
| 132827 | ACADEMY AWARD FSHIN WRAP | Academy Awards Red Carpet Fashion Wrap |
| 132635 | AA ICON STARS LEGEND FASH | Academy Awards: Iconic Stars, Legendary Fashions |
| 225452 | ACAD AWRDS ICONIC STRS LF | Academy Awards: Iconic Stars, Legendary Fashions |

Table 6, below, depicts an exemplary MediaAssetPattern-Type 53-AgeGender-Station-Program showing entries like "Academy Award". Note that these programs are all actually the same program. "LRC" stands for "Live from the Red Carpet."

TABLE 6

| MediaAssetPatternKey | Source segmentkey | MediaAsset PatternTypeID | Correlation |
|---|---|---|---|
| E! - LRC: 12 ACADEMY AWARD PT1 | 110356 | 53 | 0.330511 |
| E! - LRC: 12 ACADEMY AWARD PT2 | 110356 | 53 | 0.249202 |
| E! - LRC: 2010 ACADEMY AWARDS | 110356 | 53 | 0.288986 |
| E! - LRC: 2011 ACADEMY AWARDS | 110356 | 53 | 0.252108 |

Table 7, below, depicts an exemplary MAPType 59-Age-Gender-Station-ProgramMaster showing programs like "Academy Awards". The various program strings have been remapped to a single canonical program called "Live from the Red Carpet: The Academy Award."

TABLE 7

| MediaAssetPatternKey | Sourcesegment Key | Media Asset Pattern TypeID | Correlation |
|---|---|---|---|
| E! - Live from the Red Carpet: The Academy Awards | 110356 | 59 | 0.285531 |

Media Asset Pattern Example 4: Auto-Regressive Airing: Same Program, Same Time, Prior Week Human viewing behavior is periodic and so viewers of a program this week are likely to have also viewed the same program in the previous week. TV Program episodes are often sequential in that the story builds from one week to the next, or sports games follow events from the previous week, and in the same way, human viewing tends to track the episodes from week to week. During some seasons, viewership increases from episode to episode (e.g., see FIG. 9D, Walking Dead increased in viewership each week). Programs such as American Idol may languish and then their ratings may increase dramatically because of an event. Predicting the next broadcast of Walking Dead or American Idol can use the previous week's (or episode 2 weeks prior or 3 weeks prior) as an estimate. This turns out to be a very effective strategy for predicting the demographics of the next airing for the program.

Figure 9A:
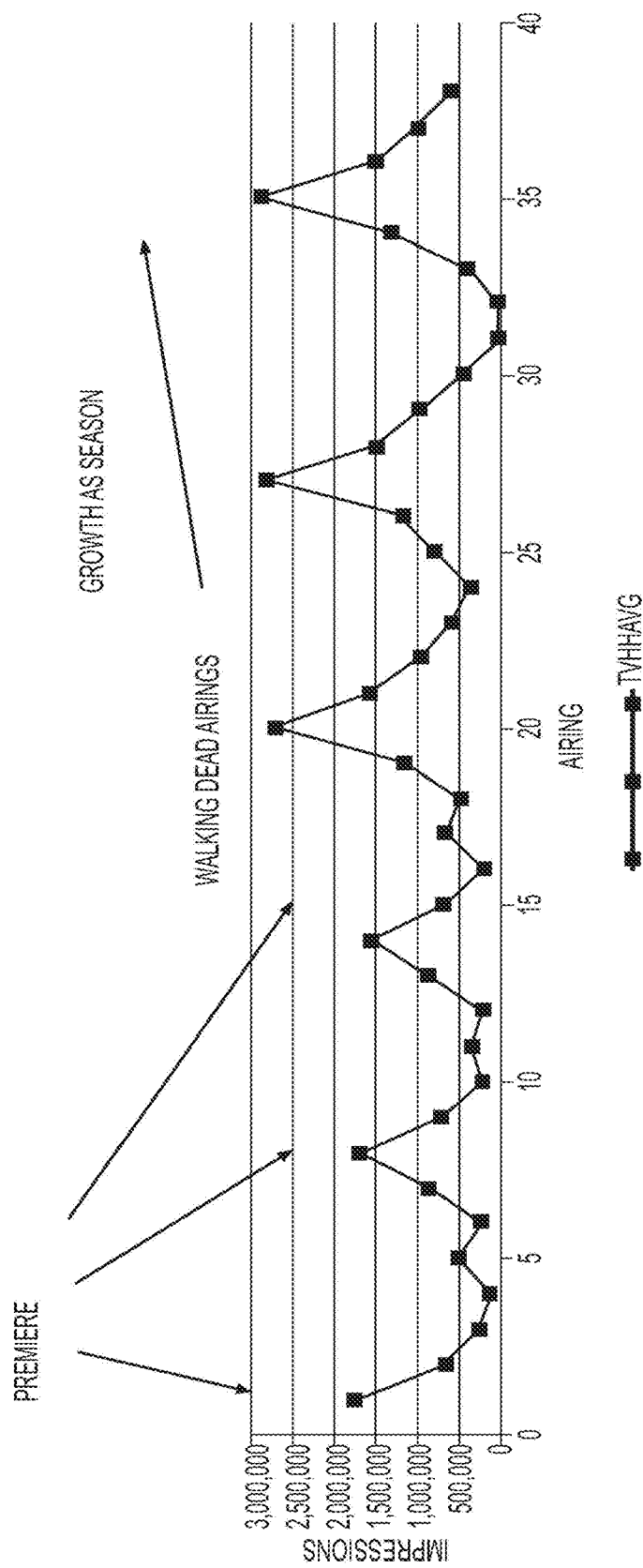
FIGS. 9A-9N depict exemplary charts and graphs of how programs change in popularity, according to exemplary embodiments of the present disclosure.

FIG. 9A depicts how programs often increase in popularity as a season progresses. This is one reason why same-time-last-week is highly predictive of the next airing. If the average for the program over a season is taken, this may not be as good a predictor as same-time-last-week, since the latter has the latest changes in viewership.

Figure 9B:
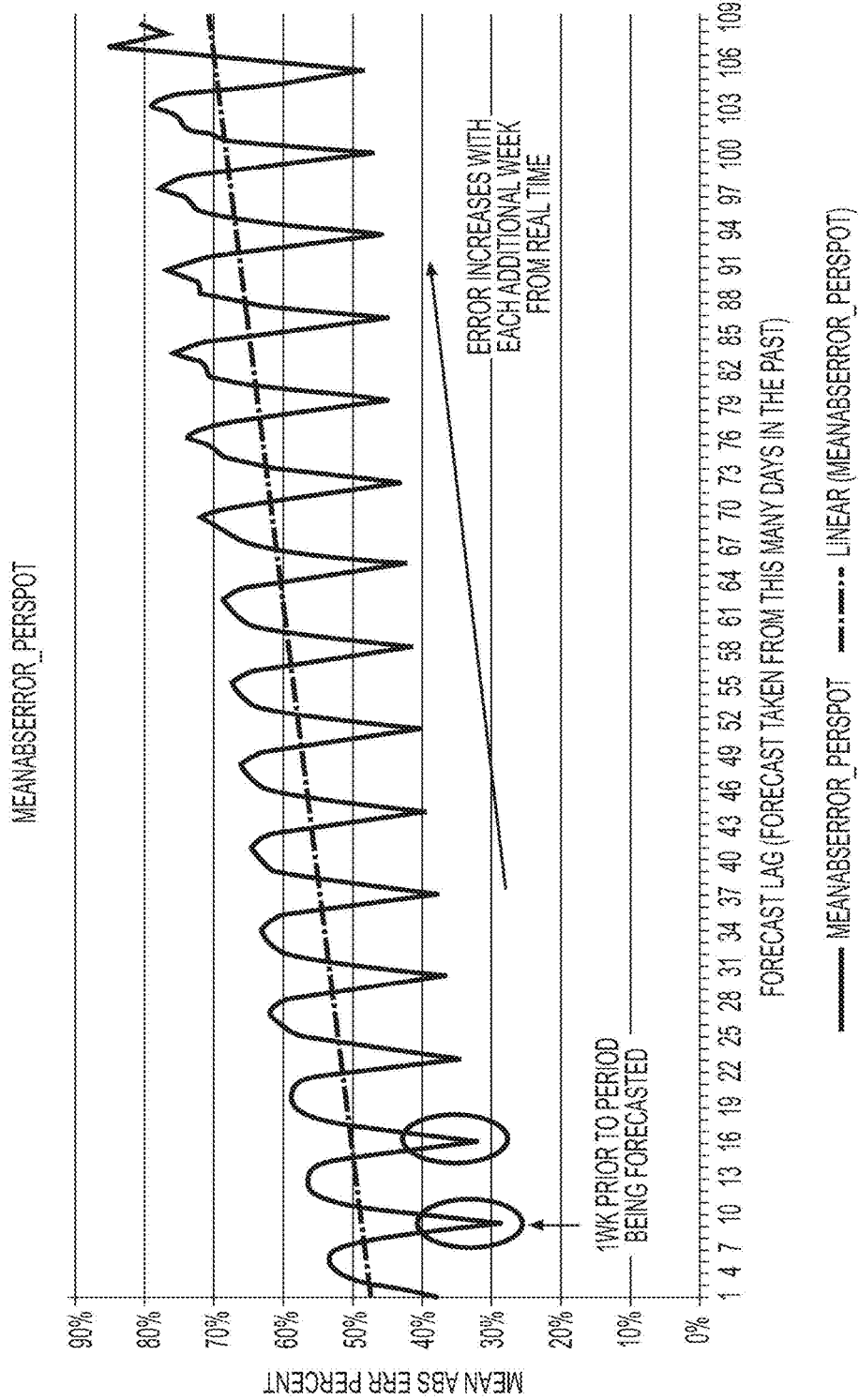

FIG. 9B shows the performance of using previous weeks' episodes for predicting future impressions. Error predicting the next episode is lowest when the episode exactly 7 days prior and at the same hour is used. Error is slightly worse using 14 days prior, and slightly worse again using 21 days prior. The figure shows mean absolute error percentage versus number of days since today. Every 7 days the error between the present station-hour and previous is minimized. This shows that using same time last week is a good strategy for predicting demographic viewership of an upcoming broadcast. These may be called "same-program-same-time-last-x-week" features auto-regressive features since we're using lag terms to predict future impressions. Based on the error analysis below, lag terms that are as close as possible to the time of prediction may be used. For a live, running campaign, it may be desirable to verify that actual data is pulled through with as little latency as possible. When looking at same time last week, 25 weeks prior to the present, it may be that the opposite season is viewed. Error may be highest during this period.

FIG. 9B depicts how the error forecasting the demographics of the upcoming airing are lowest at the same time, same program last week (the sharp troughs in the above graph). The error is also low same-time-same-program-14-days-ago, and 21 days ago. Going further into the past, the error may increase, however. The further away from the time that is being predicted, the more likely it is that some event has occurred in the show which has changed viewership, or that the schedule may have changed and so a different audience is tuning in. The figure above actually shows performance in predicting household impressions, however demographic prediction has similar behavior.

Figure 9C:
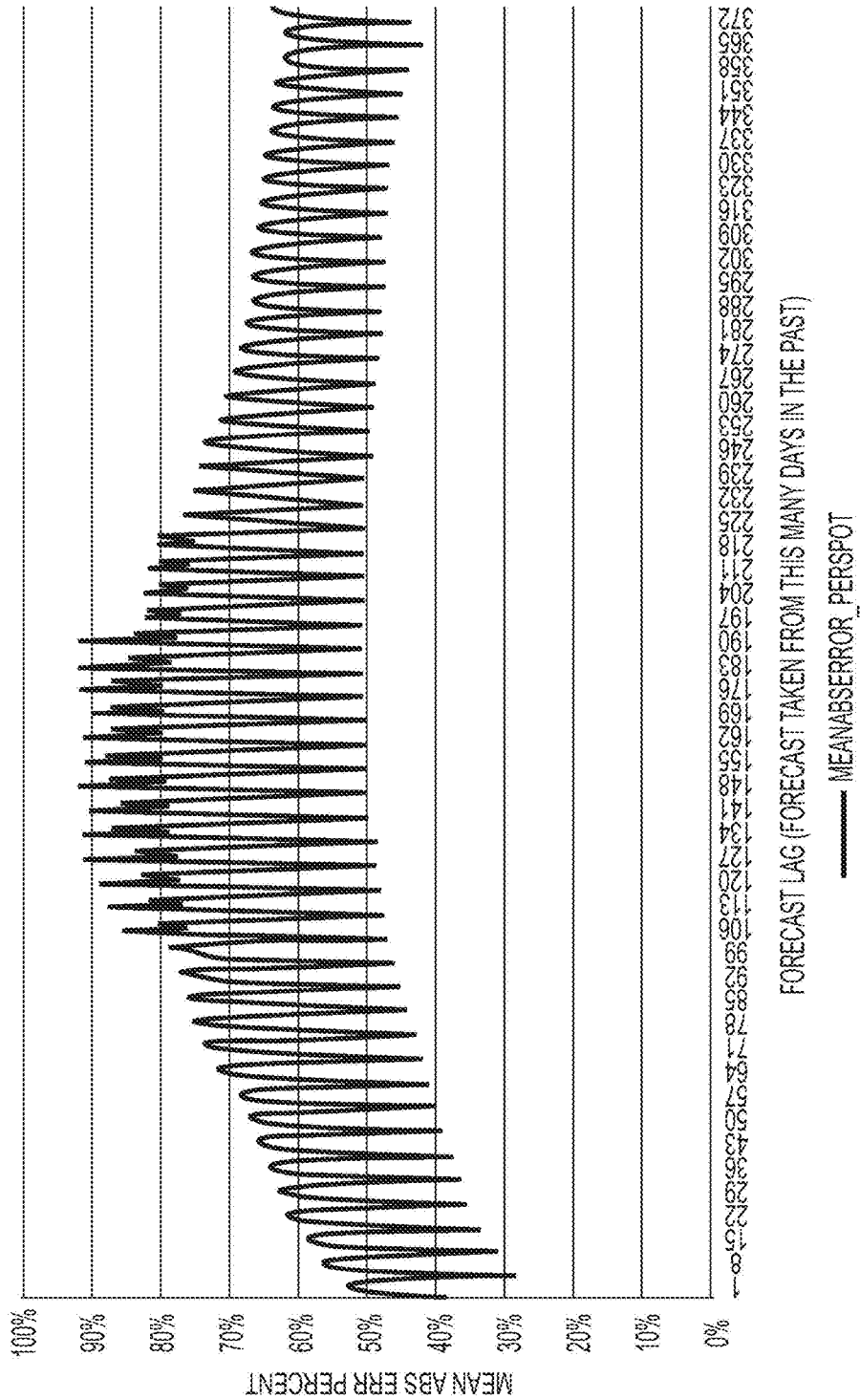

FIG. 9C depicts how the error forecasting the demographics increases with the number of weeks in the past that is being forecasted. The error actually becomes very high about 180 days prior to the present. This reflects the fact that winter and summer programming tends to be quite different (e.g., summer sports are different from winter). A corollary of the above, is the same-time exactly 1 year ago, is also a good feature for predicting the current demographics. The figure above shows accuracy in forecasting impressions, but demographics follow a similar pattern.

Table 8, below, depicts an exemplary Media Asset Pattern Type 98-Station-Program-Hour-Prior 1 week: This shows the impressions generated by the same program, at the same hour 1 week prior to the airing.

TABLE 8

| MediaAssetPatternKey | MediaAsset PatternTypeID | HourofDay | Impressions |
|---|---|---|---|
| BRAV - INSIDE THE ACTORS STUDIO - 9 am | 98 | 9 | 100586 |
| SCI - FIREFLY - 1 pm | 98 | 13 | 200248 |
| SYFY - SCARE TACTICS - 1 pm | 98 | 13 | 237726 |
| VH1C - MUSIC VIDEOS - 2 am | 98 | 2 | 10145 |
| ADSM - COWBOY BEBOP - 3 am | 98 | 3 | 544376 |
| FX - BUFFY THE VAMPIRE SLAYER - 9 am | 98 | 9 | 269022 |
| HLN - SHOWBIZ TONIGHT - 4 am | 98 | 4 | 52920 |
| LOGO - 30 ROCK - 3 pm | 98 | 15 | 9254 |

Media Asset Pattern Example 5: Time-Since-First-Airing

Premiere or First-time-Airings of Episodes for programs such as The Walking Dead tend to attract large viewing audiences. These premieres are often followed by a "same-day encore," and then some repeats during the week. The audiences are much smaller for repeats that were first shown 40 or 100 days ago.

This phenomenon may be used to create a time-since-first-airing media asset pattern. This is a number 0 or higher (or coded as Station-Program-first-day, Station-Program-first-day encore, Station-Program-first-week, Station-Program-more than 1 week) which can be used to predict the audience and viewing audience impressions given a certain time since the first airing. In order to calculate this, the first detected episode number may be used to take the date of the first airing, and then take the fractional number of days since the first detection.

Table 9, below, depicts an exemplary Media Asset Pattern Type for Time-Since-First-Airing: Times are discretized into 0 (premiere), 0.5 (same-day encore), 7 (same week) and 8 (greater than 1 week since the first detected airing).

TABLE 9

| Mediaassetpatternkey | Days since first airing | mediaasset pattern typeid | impressions |
|---|---|---|---|
| CBS - Super Bowl XLVII - 0.5 | 0.5 | 90 | 84939111 |
| FOX - NFL Super Bowl - 8 | 8 | 90 | 76759981 |
| CBS - Super Bowl XLVII - 0 | 0 | 90 | 69207813 |
| FOX - NFL Super Bowl - 0 | 0 | 90 | 66525098 |
| FOX - Super Bowl Postgame - 0 | 0 | 90 | 52947596 |
| CBS - Super Bowl on CBS Kick-Off Show - 0 | 0 | 90 | 48895479 |
| FOX - Glee - 0.5 | 0.5 | 90 | 31689157 |
| FOX - NFL Football Playoffs - 0.5 | 0.5 | 90 | 30361066 |
| CBS - NFL Football Playoffs - 0.5 | 0.5 | 90 | 28335601 |
| CBS - NFL Football Playoffs - 8 | 8 | 90 | 27484440 |

Figure 9D:
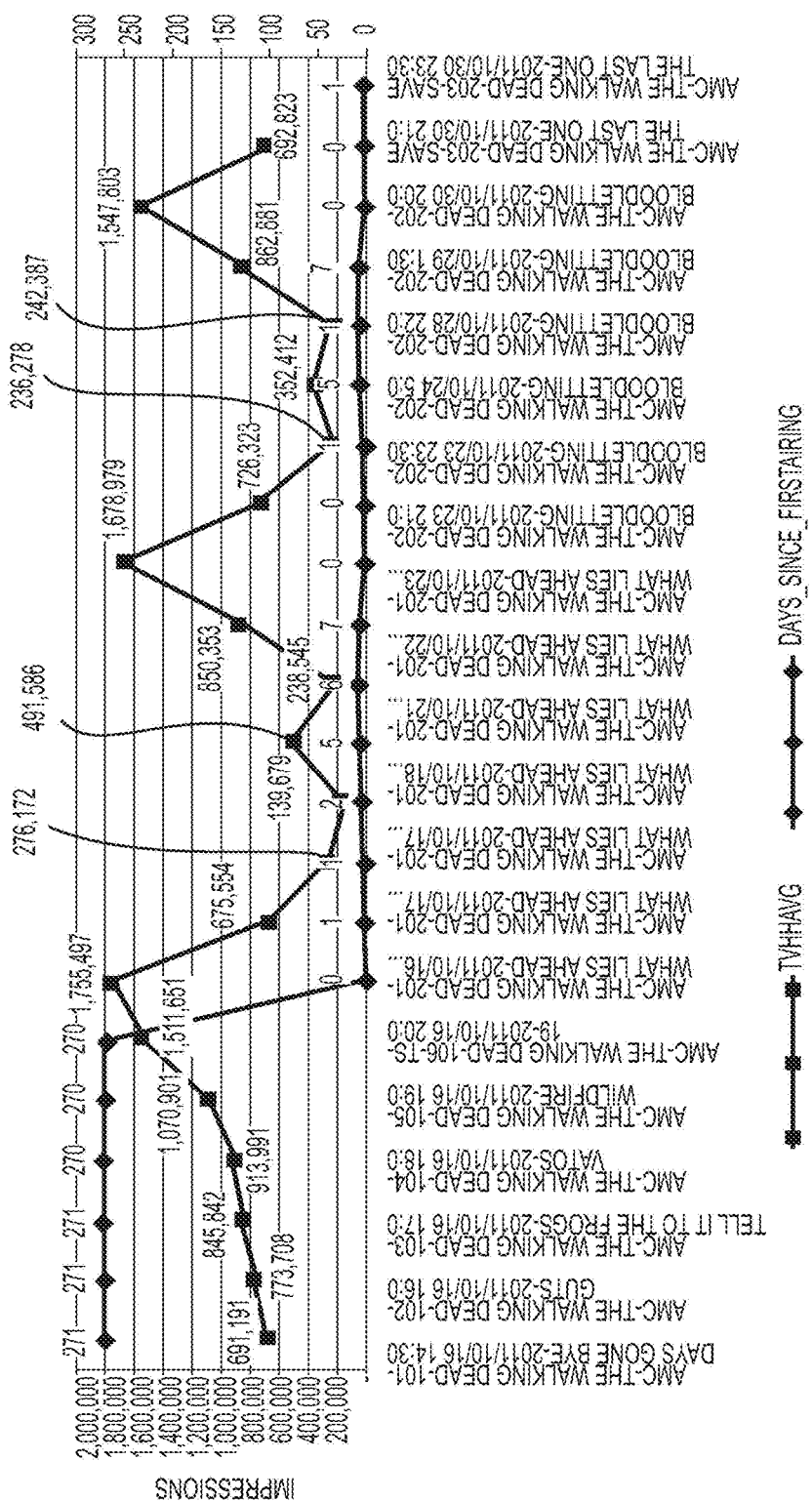

FIG. 9D depicts time-since-first-airing (line that is high and then drops) versus viewing impressions for program (line that has the three peaks). Specifically, FIG. 9D shows the viewing behavior of the Walking Dead in the lead-up to a series premiere (first peak). A Walking Dead marathon from the previous season starts at the far left of the graph, followed by season premiere. Then there is a same-day-encore of the premiere in which the program is shown again right after the premiere. Following that, the premiere is shown again during the week. On the second week, the premiere from last week is shown, and then the premiere for week 2 shows.

The above shows how viewership changes fairly dramatically with the premiere, encore, or repeat. A feature called time-since-last-airing may be used to help to predict the viewership of each program. The time-since-first-airing starts at the far left with a high value indicating that these are re-runs from last year. Then when the premiere is shown, the time-since-last-first-airing drops to 0 and there is a spike on viewing. After that it may be possible to see that time-since-first-airing changes between 0 and 7, and that the associated changes in viewing may be seen.

Media Asset Pattern Example 6: Pod Position

Figure 9E:
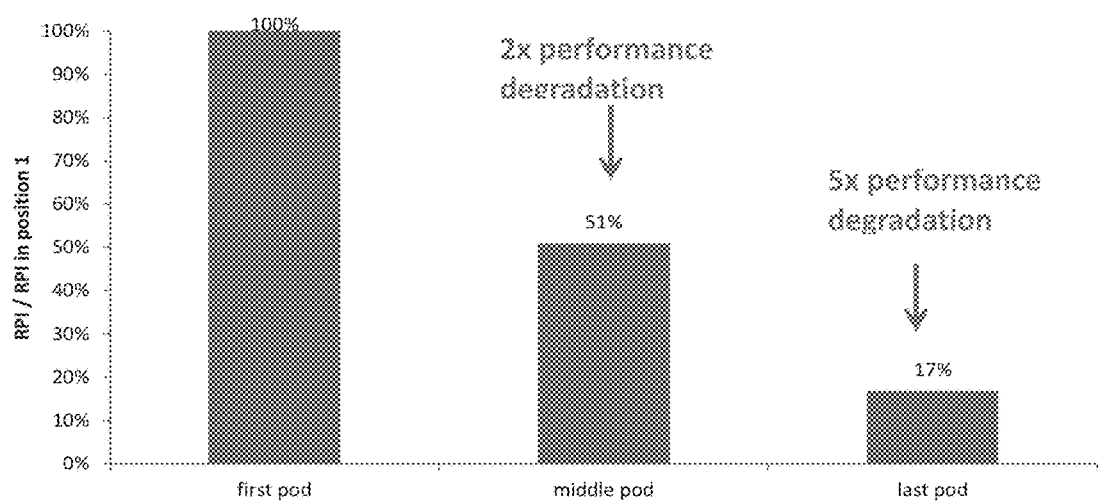
Figure 9F:
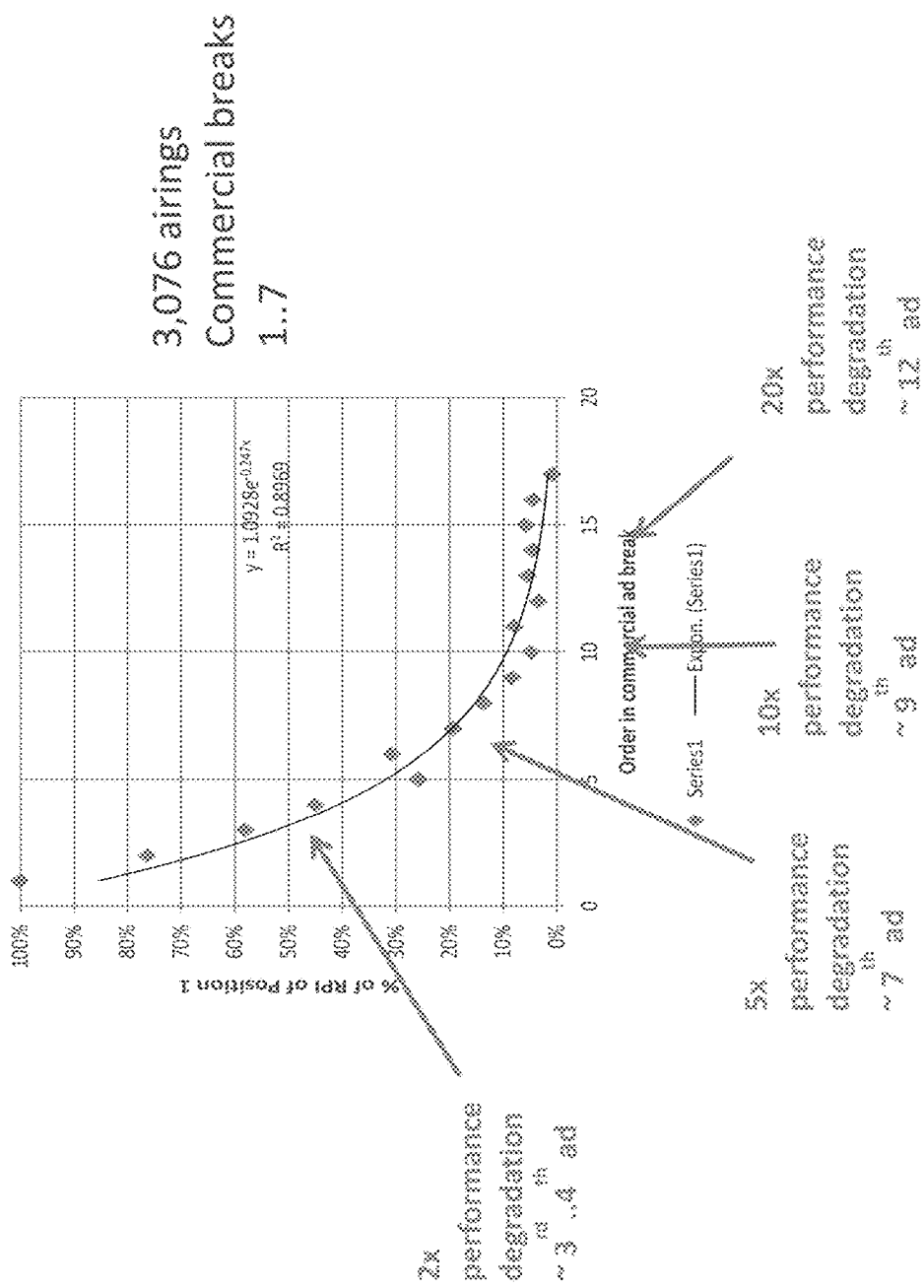
Figure 9G:
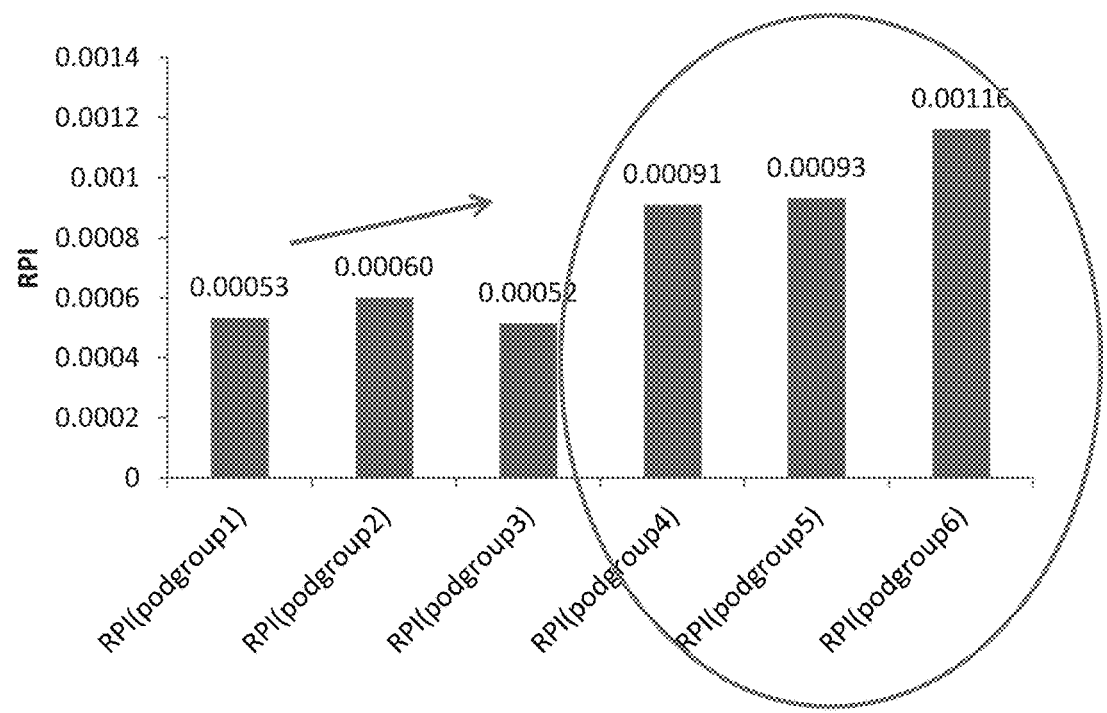

Pod position and commercial break are also important features of the ad insertion, and can dramatically affect the viewership and response per impression from the ad. In general the first pod has the highest viewership, and viewership then decreases throughout the commercial break. FIG. 9E shows response per impression as measured by phone response for first airing, middle and last airing in a commercial break. Specifically, FIG. 9E depicts how the first commercial to air in a break has the highest response pre impression. The last has the lowest. On average the performance degradation for the last commercial break is 5 times lower than for the first commercial in the break. FIG. 9F shows response per impression by order in commercial break. Specifically, FIG. 9F depicts how, with each additional commercial, the response per impression from the ad decreases. FIG. 9G suggests that later commercial breaks in a program perform better also. Specifically, FIG. 9G depicts how commercial breaks deeper into the program have higher response per impression. As described above, it may be possible and desirable to incorporate pod position into a representation of the media when estimating the response per impression.

| % through pod | RPI/RPI(0) |
|---|---|
| 20% | 100% |
| 40% | 87% |
| 60% | 74% |
| 80% | 52% |
| 100% | 22% |

Using the above pod information it is possible to create media asset patterns of the form: Station-Program-PodSequence and to estimate performance of these differentially.

Media Asset Pattern Example 7: Local Market Audiences

TV broadcasts can be performed nationally and locally. Advertisers often execute local TV campaigns when they are trying to get very precise levels of targeting, for example during elections. Often particular geographic markets such as Birmingham Ala. behave differently to overall national population. For example, Montel may over-perform—have more engaged viewers—in the South and under-perform in the North. It may be possible to represent media as Market-Station-Day-Hour or Market-Station-Program and then measure the ad effectiveness or response per impression from these different markets, and use these in an ad targeting system.

Because there are a large number of local markets (210 DMAs), it is desirable to control the amount of data being retained. One embodiment utilizes a feature whereby it calculates the RPI or ad effectiveness metrics for each market, and then if the RPI metric is not significantly different (as measured in absolute difference) from the national RPI metric or ad effectiveness metric, then the local ad effectiveness metric can be deleted (converted to missing), which as described below, may result in the national RPI or ad effectiveness metric being used. The degree of absolute difference is a parameter that can be used to control how much local data is retained.

Table 10, below, depicts an example Market-Station-Program media asset patterns for a range of geographies and the same program. This shows that the estimated ad effectiveness varies by geography.

TABLE 10

| MediaAssetPatternKey | Sourcesegment key | Media Asset Pattern TypeID | Correlation | MAPID |
|---|---|---|---|---|
| SACR - KTFK - MLS Cup Soccer Playoffs | 110356 | 80 | -0.09668 | 40255755 |
| GRSC - WYFF - MLS Cup Soccer Playoffs | 110356 | 80 | 0.356705 | 40127923 |
| NASH - WSMV - MLS Cup Soccer Playoffs | 110356 | 80 | -0.04557 | 40157609 |
| COLO - WCMH - MLS Cup Soccer Playoffs | 110356 | 80 | -0.49754 | 40002762 |
| LOUI - WAVE - MLS Cup Soccer Playoffs | 110356 | 80 | -0.48667 | 40123908 |
| PHL - WCAU - MLS Cup Soccer Playoffs | 110356 | 80 | -0.46398 | 40224514 |
| CLE - WKYC - MLS Cup Soccer Playoffs | 110356 | 80 | -0.63222 | 39963073 |
| NOR - WAVY - MLS Cup Soccer Playoffs | 110356 | 80 | -0.6917 | 40213307 |
| TUL - KJRH - MLS Cup Soccer Playoffs | 110356 | 80 | 0.000412 | 40330064 |
| DAY - WDTN - MLS Cup Soccer Playoffs | 110356 | 80 | -0.37268 | 40046919 |
| GRNC - WXII - MLS Cup Soccer Playoffs | 110356 | 80 | -0.14151 | 40366126 |
| MOBI - WPMI - MLS Cup Soccer Playoffs | 110356 | 80 | -0.03149 | 40074842 |
| OKLA - KFOR - MLS Cup Soccer Playoffs | 110356 | 80 | 0.13376 | 40207308 |
| SACR - KCRA - MLS Cup Soccer Playoffs | 110356 | 80 | -0.64831 | 40279695 |
| SHRE - KTAL -MLS Cup Soccer Playoffs | 110356 | 80 | 0.062029 | 40322737 |
| CHAT - WRCB - MLS Cup Soccer Playoffs | 110356 | 80 | -0.68651 | 39969068 |
| SANA - KNIC - MLS Cup Soccer Playoffs | 110356 | 80 | -0.46716 | 40039296 |
| BIRM - WVTM - MLS Cup Soccer Playoffs | 110356 | 80 | 0.007384 | 39940916 |

Table 11, below, depicts an example Market-Station-Program media asset patterns and their ad effectiveness scores. The market shown is Birmingham, Ala.

TABLE 11

| MediaAssetPatternKey | Sourcesegment key | Media Asset Pattern TypeID | Correlation |
|---|---|---|---|
| BIRM - WVTM - Mister Magoo's Christmas Carol | 110356 | 80 | 0.393448 |
| BIRM - WVTM - MLS Cup Soccer Playoffs | 110356 | 80 | 0.007384 |
| BIRM - WVTM - MLS Major League Soccer | 110356 | 80 | -0.30599 |
| BIRM - WVTM - Mockingbird Lane | 110356 | 80 | -0.11523 |

Media Asset Pattern Example 7: Quarter of Year

Viewership changes throughout the year, in some part in response to programming changes, but in other parts due to different events that occur each year. for example, each December, Hallmark's viewership increases dramatically as they air a variety of family favorite Christmas movies.

Figure 9H:
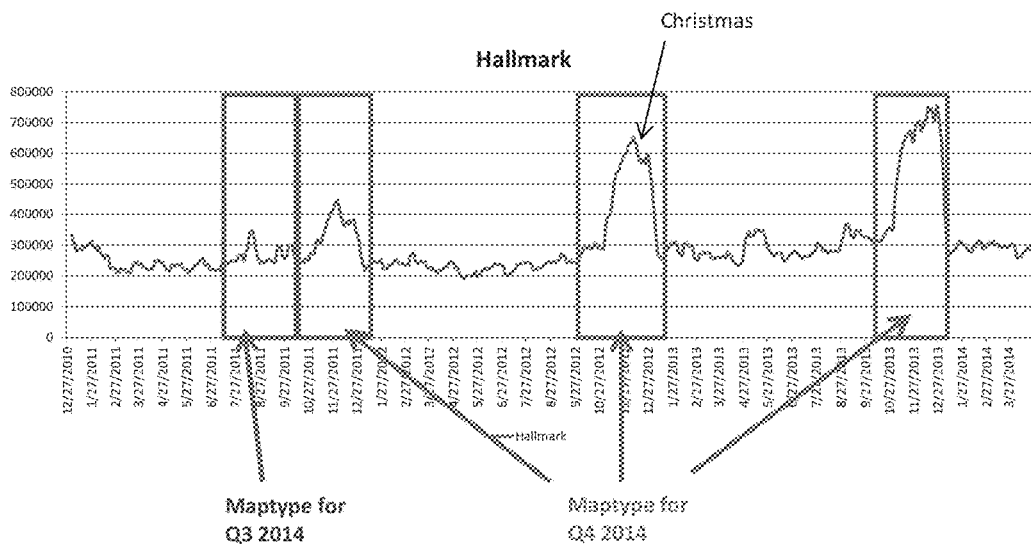

As shown in FIG. 9H, and in the table 12 below, in order to incorporate these changes in viewing, it may be possible to create media asset pattern types such as Station-Program-Quarter, and Station-Day-Hour-WeekNumber.

TABLE 12

| MediaAssetPatternKey | Sourcesegment key | Media Asset Pattern TypeID | Correlation |
|---|---|---|---|
| Hollywood Uncensored - Q1 | 110356 | 76 | 0.448947 |
| Hollywood Uncensored - Q2 | 110356 | 76 | 0.59193 |
| Hollywood Uncensored - Q3 | 110356 | 76 | 0.103446 |
| Hollywood Uncensored - Q4 | 110356 | 76 | 0.380187 |
| Hollywood's 10 Best - Q1 | 110356 | 76 | 0.419322 |
| Hollywood's 10 Best - Q2 | 110356 | 76 | 0.416322 |
| Hollywood's 10 Best - Q3 | 110356 | 76 | 0.550515 |
| Hollywood's Greatest Love Affairs of All Time - Q1 | 110356 | 76 | 0.709967 |
| Hollywood's Greatest Love Affairs of All Time - Q2 | 110356 | 76 | 0.76959 |
| Hollywood's Greatest Love Affairs of All Time - Q3 | 110356 | 76 | 0.667494 |
| Hollywood's Hottest Car Chases - Q1 | 110356 | 76 | −0.19692 |
| Hollywood's Hottest Car Chases - Q2 | 110356 | 76 | −0.46141 |
| Hollywood's Hottest Car Chases - Q4 | 110356 | 76 | −0.2328 |

Media Asset Pattern Example 8: Genre

Media Assets can also be represented by their Genre. Table 13, below, shows genres as classified by Nielsen corporation using their taxonomy, and how programs in those genres were scored for a demographic match to buyers. For example, Devotional is the genre that has the highest correlation with buyers—a result which makes sense as these customers tend to be religious and view a lot of religious programming.

TABLE 13

Media Asset pattern type 3 - Genre

| MediaAssetPatternKey | sourcesegmentkey | MediaAssetPattern TypeID | Correlation | MAPID | Counts |
|---|---|---|---|---|---|
| DEVOTIONAL | 110356 | 3 | 0.747485 | 23100 | 6234 |
| QUIZ-GIVE AWAY | 110356 | 3 | 0.738476 | 25200 | 48425 |
| PRIVATE DETECTIVE | 110356 | 3 | 0.717184 | 25143 | 131313 |
| QUIZ-PANEL | 110356 | 3 | 0.708613 | 25201 | 2841 |
| AUDIENCE PARTICIPATION | 110356 | 3 | 0.672347 | 22253 | 141666 |
| NEWS | 110356 | 3 | 0.667453 | 24746 | 49792 |
| CONVERSATIONS, COLLOQUIES | 110356 | 3 | 0.660163 | 22893 | 33610 |
| WESTERN DRAMA | 110356 | 3 | 0.58834 | 26245 | 476043 |
| PAID PROGRAMMING | 110356 | 3 | 0.574373 | 24951 | 3397 |
| SUSPENSE, MYSTERY | 110356 | 3 | 0.49955 | 25812 | 50258 |

Media Asset Pattern Example 9: Local Market Sales

TV broadcasts occur locally and nationally. It may even be possible to use data about the sales per capita in particular geographic areas to inform the presently disclosed system as to the expected response from these areas when an ad is broadcast in these areas. The media asset pattern type in this case is simply a local market which may or may not include the program information.

Media Asset Pattern Example 10: Programs Containing Keyword

Media Asset Patterns can also be represented by the keywords of program names. An example is shown in table 14, below. When the keywords below are in the program title, impressions are on average higher than expected. It is possible to create Media Asset Patterns for Genre-keyword.

TABLE 14

| Keyword | Impressions/Expected(impressions) |
|---|---|
| playoff | 2.57259536 |
| championship | 1.340646812 |
| cup | 1.339433679 |
| red carpet | 1.733993006 |
| academy award | 2.098937084 |
| grammy | 2.339914967 |
| football draft | 5.4533442 |
| final | 1.331537746 |
| all-star | 1.515066396 |
| live | 1.071003292 |
| super bowl | 3.665313321 |
| countdown | 1.0587158 |
| extreme | 0.918094091 |
| draft | 1.676420518 |

Advertisement Response:

Advertisement response is a generalized measure of the concentration of a desired audience within a particular media asset pattern Mi. This may be calculated using several measures including the number of buyers reached by targeting each media asset, phone response per impression, the concentration of targeted audience, and others. In one embodiment, information about response may come from any subsystems of data feeds of advertiser data system 106.

Advertisement response may be represented as $R_\Omega(\overline{P},M)$, where P is an advertiser's product and M is media. Advertisement response may be a measurement that is positive and monotonic with lift from advertising.

$$R_\Omega(\overline{P},M)=B(M)/I(M)$$

TV Advertisement Response/Ad Effectiveness Measures:

Multiple ad effectiveness measures may be used for helping to estimate response per impression or concentration of target audience per impression. One method may be Target Rating Points ("TRPs") on Age-Gender.

Target Rating Points (TRPs) on Age-Gender:

Age-gender Target Rating Points may be used as a form of targeting. This form of targeting may be based on the number of persons who match the advertiser's target demographics divided by total viewing persons. A formula representing age-gender TRPs may be represented as:

$$r_A(P, m_i) = 100 \cdot \frac{\tau(m_i, P)}{\#Q(m_i)}$$

where $Q(m_i)$ is a set of viewers who are watching TV media instance $m_i$; where this viewing activity was recorded by Nielsen panel; where $qk \in Q(m_i)$; where # is the cardinality of a set; and where $\#r_T$ includes persons that match on all demographics.

For example, a calculation of $r_A(P, m_i)$ as 50% may mean that 50% of the people are a match to the desired demographics. Age-gender TRPs may also be calculated using Nielsen "Market Breaks," such as gender=male|female and/or age=18-24, 25-34, 35-44, 45-54, 55-64, 65+.

Table 15, below, depicts an example of MAPType 59 with Ad Effectiveness of Target Rating Points (TRPs).

TABLE 15

| MediaAssetPatternKey | sourcesegmentkey | Media Asset Pattern TypeID | Correlation | MAPID | TRP |
|---|---|---|---|---|---|
| ABC - The Silence of the Lambs | 110356 | 59 | 0.090847 | 24240093 | 0.231977 |
| ABC - The Simpsons | 110356 | 59 | 0.01147 | 24242989 | 0.333813 |
| ABC - The Singing Bee | 110356 | 59 | 0.182083 | 24240287 | 0.29886 |
| ABC - The Soloist | 110356 | 59 | -0.26161 | 24240305 | 0.253884 |
| ABC - The Stellar Awards | 110356 | 59 | -0.04318 | 24240151 | 0.340155 |
| ABC - The Stepford Wives | 110356 | 59 | 0.273387 | 24245805 | 0.305246 |
| ABC - The Steve Harvey Show | 110356 | 59 | 0.66973 | 24243515 | 0.511859 |
| ABC - The Steve Wilkos Show | 110356 | 59 | 0.44268 | 24242061 | 0.434906 |
| ABC - The Suburbans | 110356 | 59 | 0.714196 | 24239773 | 0.553664 |

Phone Response Per Impression:

When a TV advertisement is run with a 1800 number, it may be possible to match the phone responses on specific 1800 numbers back to the advertisement that was placed. This data may be used to track sales due to the TV advertisement. A specific method may use a series of hour lag terms to predict the number of phone-calls that would be generated on a given hour.

The method of the present disclosure exposes hour and day-lag terms for historical phone response, and then trains a system to predict a probability of phone response from an upcoming media spot. The method of the present disclosure may be represented by the formulas:

$$r_F(P, m_{i,T}) = \sum_j \frac{CALL(m_{j,T})}{I(m_{j,T})}$$

$$r_B(P, m_{i,T}) = \sum_j w * r_T(m_{T,j})$$

where $CALL(m_{j,T})$ are the number of calls from airing $M_{j,T}$.

Table 16, below, depicts an example of: Media Asset Pattern Type 38-Station-Day-Hour with Ad Effectiveness equal to Phone Responses Per Impression for a Life Insurance product, including a selection of scores for CNN.

TABLE 16

| MediaAssetPatternKey | sourcesegmentkey | MediaAssetPatternTypeID | MAPID | Responses | ImpressionsScored | AllocatedResponses | RPM |
|---|---|---|---|---|---|---|---|
| CNN-M-4 pm | 10105 | 38 | 2244019 | 49 | 704008 | 52.50 | 74.58 |
| CNN-Su-2 pm | 10105 | 38 | 2244044 | 18 | 450867 | 26.44 | 58.64 |
| CNN-Th-12 pm | 10105 | 38 | 2244052 | 55 | 628320 | 62.47 | 99.42 |
| CNN-Th-4 pm | 10105 | 38 | 2244058 | 41 | 651779 | 49.84 | 76.46 |

TABLE 16-continued

| MediaAssetPatternKey | sourcesegmentkey | MediaAssetPatternTypeID | MAPID | Responses | ImpressionsScored | AllocatedResponses | RPM |
|---|---|---|---|---|---|---|---|
| CNN-Th-6 pm | 10105 | 38 | 2248057 | 44 | 635173 | 52.83 | 83.18 |
| CNN-Tu-6 pm | 10105 | 38 | 2244075 | 47 | 561477 | 60.93 | 108.51 |
| CNN-W-3 pm | 10105 | 38 | 2252728 | 65 | 790970 | 75.08 | 94.92 |
| CNN-W-5 pm | 10105 | 38 | 15323064 | 78 | 880141 | 91.55 | 104.01 |
| DEST-M-2 pm | 10105 | 38 | 16838702 | 22 | 67779 | 47.93 | 707.09 |
| FNEW-M-6 am | 10105 | 38 | 2244807 | 22 | 576185 | 27.89 | 48.41 |

Table 17, below, depicts an example of a Media Asset Pattern Type 38-Station-Day-Hour with Ad Effectiveness equal to Phone Responses Per Impression for a Life Insurance product. Scores ordered by RPI descending.

TABLE 17

| MediaAssetPatternKey | sourcesegmentkey | MediaAssetPatternTypeID | ModelID | VersionID | Correlation |
|---|---|---|---|---|---|
| INSP-Tu-3 pm | 10105 | 38 | 1 | 1 | NULL |
| INSP-M-10 am | 10105 | 38 | 1 | 1 | NULL |
| INSP-W-12 pm | 10105 | 38 | 1 | 1 | NULL |
| INSP-M-3 pm | 10105 | 38 | 1 | 1 | NULL |
| INSP-W-1 pm | 10105 | 38 | 1 | 1 | NULL |
| INSP-F-3 pm | 10105 | 38 | 1 | 1 | NULL |
| INSP-Th-2 pm | 10105 | 38 | 1 | 1 | NULL |
| DEST-M-2 pm | 10105 | 38 | 1 | 1 | NULL |
| INSP-W-3 pm | 10105 | 38 | 1 | 1 | NULL |
| INSP-Tu-12 pm | 10105 | 38 | 1 | 1 | NULL |
| INSP-F-2 pm | 10105 | 38 | 1 | 1 | NULL |
| INSP-F-10 am | 10105 | 38 | 1 | 1 | NULL |
| INSP-W-2 pm | 10105 | 38 | 1 | 1 | NULL |
| OWN-F-3 pm | 10105 | 38 | 1 | 1 | NULL |
| SYFY-Th-12 pm | 10105 | 38 | 1 | 1 | NULL |
| INSP-Tu-2 pm | 10105 | 38 | 1 | 1 | NULL |

| MediaAssetPatternKey | MAPID | Responses | ImpressionsScored | AllocatedResponses | RPM |
|---|---|---|---|---|---|
| INSP-Tu-3 pm | 16838870 | 44 | 114204 | 47.05 | 411.94 |
| INSP-M-10 am | 16838852 | 11 | 30665 | 12.16 | 396.53 |
| INSP-W-12 pm | 16838876 | 27 | 75963 | 28.16 | 370.66 |
| INSP-M-3 pm | 16838854 | 35 | 101068 | 36.95 | 365.58 |
| INSP-W-1 pm | 16838874 | 29 | 84622 | 30.56 | 361.17 |
| INSP-F-3 pm | 16838847 | 34 | 102853 | 36.32 | 353.08 |

TABLE 17-continued

| | | | | | |
|---|---|---|---|---|---|
| INSP-Th-2 pm | 16838861 | 34 | 104691 | 36.03 | 344.18 |
| DEST-M-2 pm | 16838702 | 22 | 67779 | 47.93 | 707.09 |
| INSP-W-3 pm | 16838878 | 33 | 102452 | 36.12 | 352.54 |
| INSP-Tu-12 pm | 16838868 | 23 | 72138 | 25.93 | 359.42 |
| INSP-F-2 pm | 16838846 | 31 | 102531 | 34.45 | 336.02 |
| INSP-F-10 am | 16838844 | 11 | 36509 | 14.54 | 398.34 |
| INSP-W-2 pm | 16838877 | 29 | 97157 | 30.21 | 310.90 |
| OWN-F-3 pm | 16839819 | 37 | 124507 | 38.75 | 311.23 |
| SYFY-Th-12 pm | 2267509 | 86 | 291972 | 95.34 | 326.54 |
| INSP-Tu-2 pm | 16838869 | 28 | 96224 | 29.74 | 309.09 |

Buyer Ratings:

Buyer targeting may look for media that has a high rate of observed buyers per impression, and targets those programs. An algorithm that may not be trained by itself, such as a self-learning algorithm and/or recursive algorithm, may score a percent of buyers observed in each media, which may be referred to as "buyer ratings." The following expression defines buyer ratings.

$$r_C(P, m_{i,T}) = \sum_j \frac{B(m_j)}{I(m_j)}$$

Table 18, below, depicts an example of a Media Asset Pattern Type 47-Station-Program Buyers per impression in the audience (SourceViewPct).

TABLE 18

| MediaAssetPatternKey | Source segmentkey | MediaAsset PatternTypeID | MAPID | Counts | Source ViewPct |
|---|---|---|---|---|---|
| ABC - Masters Report 2012 | 110356 | 47 | 24391966 | 8 | 0.011834 |
| ABC - Maury | 110356 | 47 | 24390571 | 60 | 0.011121 |
| ABC - MDA Show of Strength | 110356 | 47 | 24392333 | 2 | 0.004651 |
| ABC - MEGASTUNTS: Highwire Over Niagara Falls - Live! | 110356 | 47 | 24392638 | 28 | 0.007943 |
| ABC - Michael Jackson: BAD25 | 110356 | 47 | 24390572 | 21 | 0.012567 |
| ABC - Mirror Mirror | 110356 | 47 | 17083484 | 3 | 0.014085 |
| ABC - Miss Augusta Christmas Fantasy Parade | 110356 | 47 | 24392664 | 2 | 0.019802 |
| ABC - Missing | 110356 | 47 | 17124974 | 76 | 0.00693 |
| ABC - Modern Family | 110356 | 47 | 17082109 | 125 | 0.005773 |

Table 19, below, depicts an example of a Media Asset Pattern Type 47-Station-Program Buyers per impression, sorted in order of highest buyers per impression programs to lowest for Life Insurance Product. A variety of religious programs show up as having high buyers per impression.

TABLE 19

| MediaAssetPatternKey | Source segmentkey | Media Asset Pattern Type ID | MAPID | Count | Source ViewPct |
|---|---|---|---|---|---|
| WBIH - Times Square Church | 110356 | 47 | 24408592 | 13 | 0.039275 |
| WBIH - North Jacksonville Baptist Church | 110356 | 47 | 24403807 | 26 | 0.031325 |

TABLE 19-continued

| MediaAssetPatternKey | Source segmentkey | Media Asset Pattern Type ID | MAPID | Count | Source ViewPct |
|---|---|---|---|---|---|
| WBIH - Day of Discovery | 110356 | 47 | 24406111 | 18 | 0.029412 |
| BET - Redemption of a Dog | 110356 | 47 | 24391388 | 18 | 0.027231 |
| WBIH - Truth That Transforms with Dr. D. James Kennedy | 110356 | 47 | 24406620 | 12 | 0.026906 |
| WBIH - Wretched with Todd Friel | 110356 | 47 | 24406853 | 12 | 0.025641 |
| WBIH-Inside the Wildside | 110356 | 47 | 24403800 | 16 | 0.025276 |
| WBIH - First Presbyterian Church | 110356 | 47 | 24408336 | 14 | 0.024138 |
| WBIH - Gospel | 110356 | 47 | 24402598 | 13 | 0.023508 |

High Dimensional Demographic Matching:

In one embodiment, demographic match across 3,000 variables between an ad product buyer and each media asset pattern may also be used. Similar to age-gender matching, demographic mapping may use a thousand times more variables and a different match calculation due to the high dimensionality. The demographic match between an ad product and media may be defined as follows:

$$r_E(\overline{P}, \overline{M}_i) = \frac{\overline{P}^+ \cdot \overline{M}_i^+}{|\overline{P}^+| \cdot |\overline{M}_i^+|}$$

where P is a vector of demographics representing the average buyer demographic readings, and M is a vector of demographics for the media placement.

Table 20, below, depicts an example of a Media Asset Pattern Type 24-Station-Program with Ad Effectiveness=High Dimensional Demographic Match between Buyers and Set Top Box Viewers of Program. Selection for DIY channel.

TABLE 20

| MediaAssetPatternKey | Source segmentkey | MediaAsset PatternTypeID | Correlation |
|---|---|---|---|
| DIY - Knitty Gritty | 110356 | 24 | −0.0029 |
| DIY - Make a Move | 110356 | 24 | 0.544038 |
| DIY - Man Caves | 110356 | 24 | −0.12583 |
| DIY - Marriage Under Construction | 110356 | 24 | −0.28237 |
| DIY - Massive Moves | 110356 | 24 | 0.628383 |
| DIY - Mega Dens | 110356 | 24 | −0.07638 |
| DIY - Million Dollar Contractor | 110356 | 24 | −0.039 |

Table 21, below, depicts an example of a Media Asset Pattern Type 24-Station-Program with Ad Effectiveness=High Dimensional Demographic Match between Buyers and Set Top Box Viewers of Program. Top several programs by correlation for a Life Insurance product.

TABLE 21

| MediaAssetPatternKey | Source segmentkey | MediaAsset PatternTypeID | Correlation |
|---|---|---|---|
| WE - A Stand Up Mother | 110356 | 24 | 0.896803 |
| TVGN - Angel Eyes | 110356 | 24 | 0.869202 |

TABLE 21-continued

| MediaAssetPatternKey | Source segmentkey | MediaAsset PatternTypeID | Correlation |
|---|---|---|---|
| BBCA - Amazon Super River | 110356 | 24 | 0.849512 |
| NGC - Tsunami: Killer Waves | 110356 | 24 | 0.834906 |
| INSP - Wisdom Keys: The Transforming Power of Change with Mike Murdock | 110356 | 24 | 0.834243 |
| TVGN - Safe Harbour | 110356 | 24 | 0.828137 |

Web Spike Per Impression:

If TV broadcasts are aligned in time and geography with web traffic, the difference in web visits due to each broadcast may be calculated by comparing web activity a few minutes before and after the broadcast. These web spike effects may be highest within about 1 minute to about 5 minutes of an airing. Details on calculation of web spike per impression may be as follows:

$$r_F(P, m_{i,T}) = \sum_j \frac{\Delta W(m_{j,T})}{I(m_{j,T})}$$

where $\Delta W(m_{j,T}) = W(m_{j,T}, t, g) - W(m_{j,T}, t, g)$ is the difference in web activity at time t2 vs t1, from the same geographic area.

Table 22, below, depicts an example of a Media Asset Pattern 69 Station-Day-Hour with Ad Effectiveness measure equal to Web Spike Response per impression. Table below is sorted in order of highest web spike response per impression to lowest for a different advertising product (identified by sourcekey=110401). This is a product that appeals to women 25-34. The top networks showing up for webspike response are Soap (SOAP), Comedy (Com), Discovery Health and Fitness (DFH).

TABLE 22

| MediaAsset PatternKey | Source segmentkey | MediaAsset PatternTypeID | MAPID | WPI |
|---|---|---|---|---|
| SOAP - Su - 3 pm | 110401 | 69 | 17110544 | 0.00322 |

TABLE 22-continued

| MediaAsset PatternKey | Source segmentkey | MediaAsset PatternTypeID | MAPID | WPI |
|---|---|---|---|---|
| COM - Tu - 1 pm | 110401 | 69 | 17110163 | 0.003025 |
| DFH - Tu - 11 am | 110401 | 69 | 17110598 | 0.002895 |
| DFH - W - 2 pm | 110401 | 69 | 17110286 | 0.00273 |
| DFH - M - 7 am | 110401 | 69 | 17110172 | 0.002596 |
| COM - W - 1 pm | 110401 | 69 | 17110586 | 0.002539 |
| DFH - M - 1 pm | 110401 | 69 | 17110279 | 0.002291 |
| COM - Th - 1 pm | 110401 | 69 | 17110381 | 0.002148 |
| COM - Tu - 12 pm | 110401 | 69 | 17110377 | 0.00211 |
| DFH - Th - 3 pm | 110401 | 69 | 17110816 | 0.00206 |
| COM - M - 10 am | 110401 | 69 | 17110374 | 0.002018 |
| DFH - Tu - 1 pm | 110401 | 69 | 17110065 | 0.001955 |

The ad targeting algorithms, as shown below, may be a combination of one or more of: (i) ad effectiveness metric; and (ii) media asset pattern type. For example, stbhead-match-station-day-hour may mean high dimensional match with set top box data using statistics on station-day-hours (e.g., CNN-Tues-8 pm's demographic match between target and viewing audience).

Table 23, bellows, shows the correlation between each ad effectiveness measure and a particular response per impression measure. For example, Media Asset Pattern Type 32-STBHead-Station-Day-Hour has a high correlation with buyers per million (0.8471) and is present 93.9% of the time.

TABLE 23

| Feature | R | % present |
|---|---|---|
| 32-STBHead-Station - Day - Hour | 0.8471 | 0.9391 |
| 40-Telesale-Station - Day - Hour-Local | 0.8245 | 0.4775 |
| 60-STBHead-Station - Program Authority | 0.7585 | 0.2385 |
| 5-MBDemo-Day of Week - Hour of Day | 0.7552 | 1 |
| 39-Telesale-Station-Local | 0.7498 | 0.7451 |
| 65-AgeGender-SpecialEvent-Station - Program Authority | 0.6964 | 0.0081 |
| 118-Reach-Station - Day - Hour | 0.6597 | 0.2688 |
| 45-Sale-Station - Day - Hour | 0.6471 | 0.8938 |
| 31-STBHead-Station - Rotation | 0.6102 | 0.9391 |
| 59-AgeGender-Station - Program Authority | 0.4901 | 0.2037 |
| 28-STBHead-Program | 0.4801 | 0.5162 |
| 124-Reach-Program Authority | 0.4544 | 0.465 |
| 30-STBHead-Hour of Day | 0.4424 | 1 |
| 7-MBDemo-Hour of Day | 0.4121 | 1 |
| 27-STBHead-Station | 0.3886 | 0.9391 |
| 55-AgeGender-Program Authority | 0.3771 | 0.5985 |
| 53-AgeGender-Station - Program | 0.3262 | 0.153 |
| 58-Telesale-Station - Day - Hour | 0.2793 | 0.802 |
| 46-Sale-Station | 0.26 | 0.9087 |
| 51-AgeGender-Station-Day-Hour | 0.2478 | 0.8313 |
| 6-MBDemo-Day of Week | 0.2283 | 1 |
| 24-STBDevice-Program Authority | 0.199 | 0.463 |
| 29-STBHead-Day of Week | 0.1601 | 1 |
| 25-STBDevice-Program | 0.1446 | 0.415 |
| 52-AgeGender-Station | 0.1099 | 0.9009 |
| 57-Telesale-Station | 0.1079 | 0.8702 |
| 33-USCensus-DMA | 0.0162 | 0.8073 |

TABLE 24

Feature performance for predicting future household impressions

| Maptype | Present | Mean abs | mean |
|---|---|---|---|
| I94 - STBHead Actual Airings Minus 7 Days | 35% | 14% | 0% |
| I95 - STBHead Minus 14 Days | 33% | 15% | 0% |
| I96 - STBHead Minus 21 Days | 32% | 18% | 1% |
| I97 - STBHead Minus 28 Days | 31% | 19% | 0% |
| I74 - STBHead Station - Day - Hour - Quarter | 98% | 24% | -5% |
| I77 - STBHead Weekpart - Daypart - Station - Program Authority - High Value | 0% | 26% | 2% |
| I87 - STBHead Current Quarter Station - Day - Hour | 98% | 26% | -4% |
| I32 - STBHead Station - Day - Hour | 96% | 29% | -12% |
| I90 - STBHead First Airings Station - Program Authority | 78% | 29% | -3% |
| I99 - STBHead Actual Airings Prior Station - Program - Hour | 56% | 30% | -8% |
| I86 - STBHead Current Quarter Station - Program Authority | 85% | 31% | 2% |
| I60 - STBHead Station - Program Authority | 76% | 33% | -2% |
| I61 - AgeGender Local Station - Day - Hour | 92% | 34% | -1% |
| I31 - STBHead Station - Rotation | 96% | 34% | -12% |
| I82 - AgeGender2 Station - Day - Hour | 92% | 34% | 2% |
| I51 - AgeGender Station - Day - Hour | 92% | 36% | 1% |
| I98 - AgeGender2 Current Station - Program - Hour | 36% | 37% | -5% |
| I63 - AgeGender Local Station - Program Authority | 72% | 41% | 7% |
| I27 - STBHead Station | 96% | 43% | -7% |
| I59 - AgeGender Station - Program Authority | 69% | 46% | 15% |
| I75 - STBHead Program Authority - Quarter | 90% | 46% | -2% |
| I53 - AgeGender Station - Program | 45% | 49% | 21% |
| I78 - AgeGender Weekpart - Daypart - Station - Program Authority - High Value | 3% | 50% | 24% |
| I52 - AgeGender Station | 94% | 52% | 15% |
| I28 - STBHead Program | 78% | 52% | -2% |
| I66 - STBHead Station - Program Authority - High Value | 0% | 59% | 37% |
| I76 - AgeGender Program Authority - Quarter | 73% | 60% | -9% |
| I65 - AgeGender Station - Program Authority - High Value | 6% | 62% | 39% |
| I55 - AgeGender Program Authority | 77% | 63% | -7% |
| I30 - STBHead Hour of Day | 100% | 71% | -28% |

Properties of TV Ad Targeting Algorithms:

One element affecting an ad effective metric's ability to be used may be their sparsity. The most sparse data may be STB buyer data, which may be known persons who have bought the advertiser's product, and are also detected watching a particular program. The probability of detection of these customers may be small.

One key reason for sparsity may be because each person must be matched in both STB data and advertiser data.

High dimensional demographic matching may not be as impacted by sparsity because it may aggregate all STB data into a demographic vector, and then may match using this vector. By converting to a demographic vector, it may be possible to eliminate the need for "cross-domain" person-to-person linkage.

FIG. 3A depicts an analysis of the three major classes of ad effectiveness metric: (a) demographic match, (b) phone response per impression ("RPI"), and (c) buyers per impression ("BPI") versus the size of media being scored. The y-axis may indicate the correlation coefficient between the predicted phone responses and actual phone responses in the future. The x-axis may indicate the number of impressions generated by the media that is being scored. Each data point may indicate a quartiled set of airings, with their correlation coefficient for predicting future phone response. A linear fit may be added to each set of points to provide an idea of the accuracy trend for that ad effectiveness metric versus impressions.

As shown in FIG. 3A, phone RPI performs very well and is sloped upwards, which may indicate that as an airing has more impressions, prediction improves. For large airings, such as around 50,000 impressions in size, the correlation coefficient may average about 0.6. However, for programs with fewer than 1,100 impressions, RPI prediction performance may degrade.

Demographic matching may have a shallower slope, as shown in FIG. 3A. Its prediction may improve with more impressions, but it may be out-performed on high impression airings by RPI. However, one differentiator of the demographic match method may be that the shallow slope means that it continues to show good prediction performance far down the list of airings, into very low impression airings. This may be an advantage for the demographic match method, and may indicate that the entire TV spectrum may be scored and used with this method.

FIG. 3A also depicts BPI. Because of the high sparsity associated with BPI, this method may be useful on airings over 600,000 impressions in size. However, the slope of BPI may be quite steep. It may be possible that BPI might out-pace RPI, and may be a more predictive variable with enough set top boxes and/or the right advertiser that is generating numerous purchases.

Figure 3B:
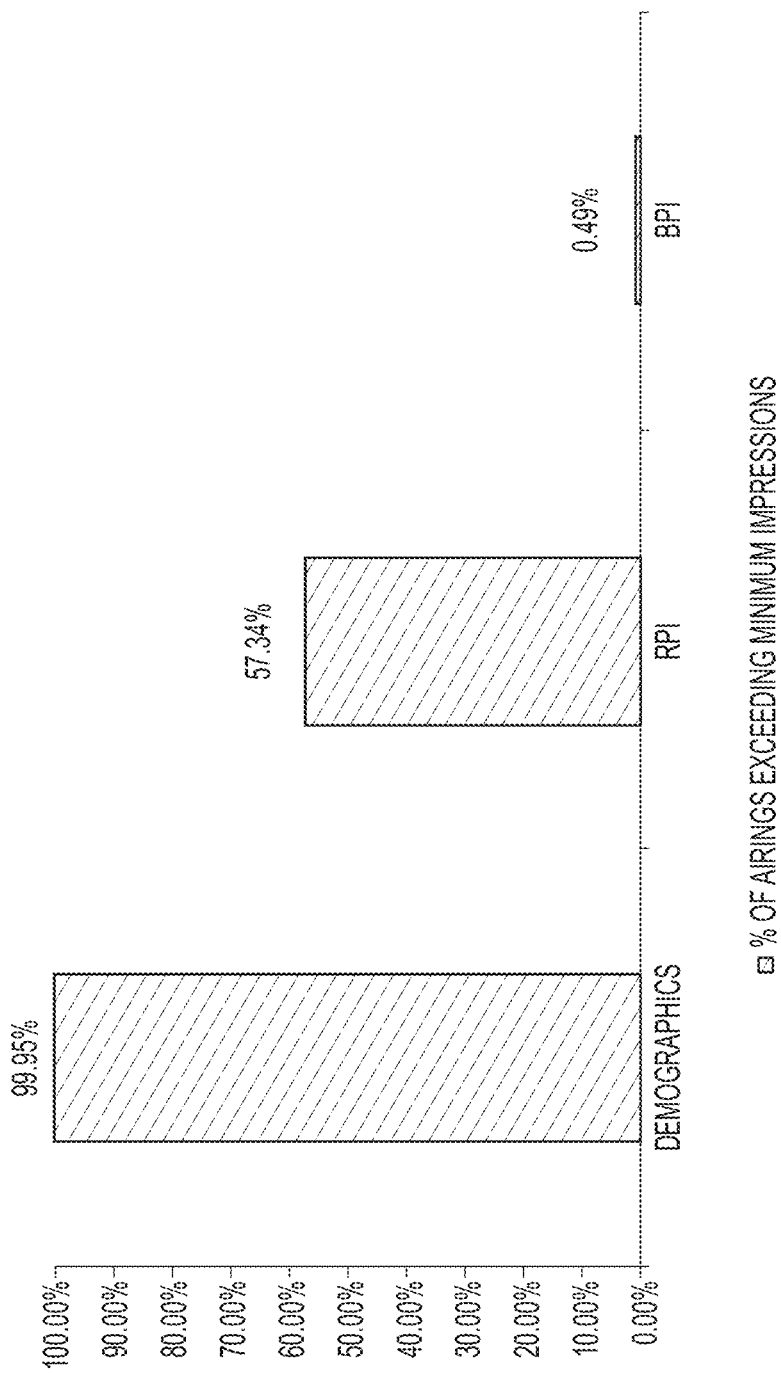
FIG. 3B depicts a bar graph of usability of the three major classes of an ad effectiveness metric including demographic match, RPI, and BPI, according to exemplary embodiments of the present disclosure.

In terms of usable predictions (scoring airings with impressions such that prediction performance is above 0), in one exemplary, non-limiting embodiment, demographic match covered, e.g., 99% of all airings, RPI covered, e.g., 57% of all airings, and BPI covered, e.g., only 0.5% of all airings, as shown in FIG. 3B. Thus, the sparsity analysis may indicate that all three methods may be useful from an operational standpoint. In some embodiments, demographic matching may beat all methods on low impression airings (<6,000 impressions), RPI may be effective on medium impression sizes, and BPI may be incorporated on airings with >600,000 impressions.

Exemplary Robust Algorithm:

One benefit of the present disclosure is that the below described targeting algorithm is able to use all of the above-described data and methods which allows for a "hyper-targeted" TV campaign. In order to build a combined algorithm, various problems introduced by the different metrics and range of each algorithm may be overcome. Further, the combined algorithm may be able to select features that are most predictive, and may be trained.

Model:

In one embodiment, a model consistent with the present disclosure may receive all of the available media asset patterns $m_{i,t}$ and ad effectiveness measures $r_\alpha(m_{i,t})$. The model may also use them to predict the ad response per impression $R_\Omega(M_i)$. This may include a supervised learning problem, as ad effectiveness information may be available for every airing, and thus, the system may be trained to predict the quantity based on historical examples. The model of the present disclosure may include a stacked estimator where each ad effectiveness model $r_\alpha(m_{i,t})$ is an expert, and the assembly is trained to predict ad response $R_\Phi(M_i)$.

$$R_\Omega(M_i) = Z^{-1}(y, \mu_\Omega, \sigma_\Omega)$$
$$y = \sum_t w_t x_t$$
$$x_t = Z(r_t(m_t), \mu_t, \sigma_t)$$

The predictors $x_t$ and ad response target $y=Z(R_\Omega,\mu,\sigma)$ may be standardized, as discussed below. In order to handle so many different variables, the model may be able to standardize the different variable and may select the variables that are most useful for predicting its target to avoid overfitting.

Variable Standardization:

In one embodiment, different ad effectiveness variables, such as telephone response per impression (RPI), buyers per impression (BPI), and demographic match, may be used. Each of these variables may have a different set of units. In order to handle these different scales, variables may be transformed, as follows:

$$x_t=Z(r_t); y=Z(R_\Omega); Z(a)=(a-\mu)/\sigma$$

When training the system to predict standardized target y for each ad effectiveness predictor $x_t$, each predictor may be effectively measuring the relationship between a change of a unit standard deviation in its distribution, to what that translates into in terms of standard deviations of movement in the target variable. This may have several useful properties, such as no constant terms, interpretability, and/or usability.

A constant term may be in effect removed and the co-variance may be measured. The constant term may be "added back" later when the prediction is converted back into target unit. Interpretability may allow standardizing variables on the same scale. When estimating weights, weights in order of magnitude may be read off, and thus, variables that are contributing most to the prediction may be seen. Usability may allow users to enter their own weights if they have some domain knowledge. Because of standardization, w=0.4 intuitively means that 40% of the decision may be based on this variable.

Constraints Due to Ad Theory:

There may be certain constraints that may be imposed on the model due to experimental findings from advertising theory. Ad theory suggests that as the traits of the ad match the product more, response to advertising should increase. Thus, the following propositions for ad effectiveness metrics may be: (1) ad effectiveness $\forall i: x_i y>0$ (since each ad effectiveness metric may be positively correlated with ad response); and (2) given a model predicting ad response $y=\Sigma\ w_t x_t\ \forall t: w_t \geq 0$, the effect of improved ad effectiveness may be zero or positive on ad response.

Minimum Weight Constraints:

In order to be consistent with the above-mentioned propositions, a positivity constraint in weights may be:

$$w_t \geq 0$$

Sum of Weight Constraints:

For reasons of robustness in production, it may be desired to ensure that predictions do not extrapolate higher or lower than a range of values that has been previously observed. For example, a weight of 2 may allow the system to predict outside of the range of the ad response variable. To ensure the sum of weight constraints, all weights may sum to 1. As a result of this additional constraint, a formula may be:

$$1 \geq w_t \geq 0 \wedge \Sigma_{t=1}^T w_t = 1 \quad (2)$$

Low Data Behavior/Variable Participation Thresholds:

Each media asset pattern may cover a certain number of historical airings. For each media asset pattern, m, the sum the number of impressions observed may be I(m). Accordingly, the ad effectiveness measures may be unreliable on small amounts of data. Bayesian priors may be used to "fill-in" performance when there is less information available, modifying the ad effectiveness score as follows:

$$r = e^{-\alpha \cdot I(m)} \cdot r + (1 - e^{-\alpha \cdot I(m)}) \cdot r_{PRIOR}$$

where $\alpha$ is a parameter that governs how many impressions are collected for the posterior estimate to be favored more heavily than the prior.

However, Bayesian priors may be incorrect and may involve creation themselves. Since there may be hundreds of thousands of variables per product (not to mention hundreds of products), a large number of parameters may be set. Thus, an effect of poorly set priors may be significant as they cause variables that may have been good predictors to be spoiled, and the training process to be unable to weight them properly.

The system of the present disclosure may be able to work reliably with minimal human intervention. Thus, the system may be trained using participation thresholds. $I_{MIN}$ may be defined as the minimum impressions allowed on a particular media asset pattern. If a media asset pattern fails to meet this threshold, it may be converted to a missing value, and thus, does not participate further. The prediction formula for handling missing values may be defined as:

$$\text{if } I(\overline{m}_{i,t}) < I_{MIN} \vee \sigma_t = 0 \text{ then } w_t = 0; x_t = MV$$

Missing Value Handling:

In certain embodiments, a particular media asset pattern may be missing and/or otherwise may be unable to report a value. For example, a system may not have enough data on a program to be able to provide a prediction. When this happens, the system may use a more general media asset pattern type, such as the station, to provide a prediction. Missing value handling may allow the system to operate in cases where a variable is not available and/or a variable is zeroed out, and missing value handling may allow other variables that are present to be used to create a prediction.

For production robustness, media asset pattern types may be defined with small weights, so that if there is a failure then the system may default to one of these more general media asset pattern types. For example, if station-day-hour is undefined, then station may be defined but at a very low weight. Thus, a significant weight may not be given to missing values.

Transforming into Target Units:

The standardized predictions may be converted into the original units. This may be performed by inverting the z-score transform $$Z^{-1}[y] = y \sigma_j + \mu_j$$

where j is the ad effectiveness measure that is being reported. The $Z^{-1}$ transform may be similar to performing a programming language cast operation into the appropriate units.

Training Algorithm:

Weight training may use a subspace trust-region method that is designed to operation for values 0 to 1 and sum of weights=1 constraints, as shown below:

$$w_t \min E = \min \sum_i \left[ \left( \frac{1}{\sum_{t=1}^T w_t} \sum_{t=1}^T w_t x_t \right) - y^* \right]^2$$

$$1 \geq w_t \geq 0 \wedge \sum_{t=1}^T w_t = 1$$

If $x_t = MV$ then $w_t = 0$

A forward-backward selection algorithm may be used to select new features to include in the model.

Different Target Value Types:

The Scoring Service can score response per impression (tratio). It can also predict Impressions, Cost Per Impression (predicted price), (phone) Response Per Impression, Web Response per impression, TRP (target rating points) and others. The list of target value types supported by the system are shown in Table x. In each case, the system uses the common set of media asset patterns defined earlier, with the ad effectiveness metric also defined earlier, to predict the target metric of interest.

TABLE 25

Target value types supported by Scoring Service

| TargetValueTypeID | TargetValueType | MinValue | MaxValue |
|---|---|---|---|
| 1 | TRatio | −1 | 1 |
| 2 | RPI | 0 | NULL |
| 3 | SourceViewPct | 0 | 1 |
| 4 | Impressions | 0 | NULL |
| 5 | CPM | 0 | NULL |
| 6 | Cost | 0 | NULL |
| 7 | TRP | 0 | NULL |
| 8 | TRPImpressions | 0 | NULL |
| 9 | TRPTImpressions | 0 | NULL |
| 10 | ReachPct | 0 | 1 |
| 11 | WPI | 0 | 1 |
| 12 | SourceViewMinutesPct | 0 | 1 |

For example, in order to predict Impressions, the system has expected Impressions defined for each media asset pattern type defined earlier. The system then performs a linear combination of its weighted features to predict upcoming impressions.

Exemplary Weight Training for Forecasting Impressions:

An example forecast is below for the case of impressions. Impressions don't need to undergo standardization and so the example is fairly simple. Let's say that we're trying to estimate the impressions for media instance Mi=("Little House on The Prairie", Hallmark, Sun 6 pm, Jun. 9, 2013).

The Media Asset Pattern Types that match this airing are shown in Table 26A and 26B below:
Exemplary Media Asset Patterns and Weights:

TABLE 26A

| Map Type | MediaAssetPatternKey MediaAssetPatternTypeID | Impressions | weight |
|---|---|---|---|
| 1 | HALL | 340,497 | |
| 2 | LITTLE HOUSE ON PRAIRIE | 92,730 | |
| 4 | HALL - Sa-Su - 9a-8p | 481,519 | |
| 5 | Sun - 6-9PM | 164,671 | .25 |
| 7 | 6-9PM | 117,448 | |
| 14 | HALL - Su - 6 pm | 569,995 | |
| 18 | HALL - Su - 6 pm | 194,377 | |
| 27 | HALL | 276,393 | |
| 28 | Little House on the Prairie | 221,556 | |
| 30 | 6-9PM | 281,602 | |
| 31 | HALL - Sa-Su - 9a-8p | 403,137 | |
| 32 | HALL - Su - 6 pm | 490,169 | .25 |
| 37 | HALL | 264,917 | |
| 38 | HALL - Su - 6 pm | 395,824 | |
| 45 | HALL - Su - 6 pm | | |
| 46 | HALL | | |
| 47 | HALL - Little House on the Prairie | | |
| 49 | HALL | | |

TABLE 26B

| Map Type | MediaAssetPatternKeyMediaAssetPatternTypeID | Impressions | weight |
|---|---|---|---|
| 51 | HALL - Su - 6 pm | 747,144 | |
| 52 | HALL | 403,255 | |
| 55 | Little House on the Prairie | 171,506 | |
| 57 | HALL | 232,439 | |
| 58 | HALL - Su - 6 pm | 290,595 | |
| 59 | HALL - Little House on the Prairie | 320,361 | .25 |
| 60 | HALL - Little House on the Prairie | 261,492 | |
| 61 | National - HALL - Su - 6 pm | 725,637 | |
| 63 | National - HALL - Little House on the Prairie | 290,635 | |
| 74 | HALL - Su - 6 pm - Q2 | 447,017 | |
| 75 | Little House on the Prairie - Q2 | 201,296 | |
| 76 | Little House on the Prairie - Q2 | 161,460 | |
| 82 | HALL - Su - 6 pm | 809,827 | |
| 83 | HALL - Little House on the Prairie | 297,056 | |
| 84 | HALL - Little House on the Prairie | | |
| 85 | HALL - Su - 6 pm | | |
| 86 | HALL - Little House on the Prairie - Q22012 | 232,881 | .25 |
| 87 | HALL - Su-6 pm - Q22012 | 344,353 | |
| 89 | HALL - Su - 6 pm - Week 23 | 553,533 | |

In one embodiment, given that there may be weights on Maptypes 86, 59, 32, and 5 with 0.25 weight each, this results in the following:

Forecast Impressions=(164,671*$w1$+490,169*$w2$+320,361*$w3$+232,881*$w4$)/sum($w1 \ldots 4$)= 264,971

Also, assuming that the actual impressions from that airing are ultimately found to be equal to: Actual=292,497, then error can then be calculated as below:

Error=(Forecast−Actual)=27,527

Based on hundreds of thousands of examples of forecasts and actuals, the system may be trained to adjust its weights to minimize forecasting error. It may also be possible to implement variable selection process to iteratively add variables and determine if they improve the fit, and then attempt to remove variables is a similar manner to determine if there is redundance (forward-backward algorithm).

Exemplary Fatigue and Pod Adjustments During Training:

One of the objectives of the present disclosure is to accurately predict a Response Per Impression metric for a future TV broadcast. One challenge is that campaigns are rarely starting for the first time. Often the advertiser has aired their commercial on a range of different networks, and this has caused their commercial to create fatigue on these different networks.

Previous airings cause a variety of challenges for training a model to estimate future Response Per Impression. Historical data on response per impression (eg. phone response) will be distorted because of low fatigue on early airings, and high fatigue on later airings.

For example, the advertiser may have bought "Wheel of Fortune" heavily in the past. When a model is trained to predict Response Per Impression, the historical "Wheel of Fortune" will include data from when "Wheel of Fortune" was first being bought, and so the historical performance may over-estimate the performance that it may be possible to achieve if "Wheel of Fortune" is purchased today.

In order to account for fatigue, it may be desirable to adjust historical airing performance to "reverse out" the impact of fatigue. One example of how to do this is to adjust historical Response Per Impression estimates per below:

RPI_historical=RPI_historical*ln(airingcount+1)

The above fatigue adjustments should be used for ad effectiveness metrics which are related to human response, such as phone response per impression, web response per impression, and the like. Fatigue adjustments aren't needed for ad effectiveness metrics which aren't affected by human response, such as buyers per impression, or age-gender TRP estimates. These latter metrics will be the same whether or not the ad has aired in these spots previously.

Another factor which can make it difficult to predict future RPI performance is variation in historical pod position. Often media buyers negotiate rotations and may be agnostic to particular pod positioning. The pod that the ad airs in has a dramatic impact on response from the ad. The first pod has highest response, and the later the ad appears in the commercial break, the lower is the response. For the $5^{th}$ ad in a commercial break, performance is just 30% of the $1^{st}$ ad. This is a huge performance change, and a major variable which needs to be taken into account. One example for how to take this into consideration is to estimate RPI as a function of pod position, and then to adjust as below:

Table 27, below, shows RPI position adjustments empirically measured in a live TV campaign.

TABLE 27

| % through pod | all | podsize >=3 | Podsize >=5 | Podsize >=7 | Podsize >=9 |
|---|---|---|---|---|---|
| 20% | 100% | 100% | 100% | 100% | 100% |
| 40% | 87% | 87% | 89% | 93% | 75% |
| 60% | 74% | 72% | 54% | 78% | 99% |
| 80% | 52% | 52% | 43% | 63% | 50% |
| 100% | 22% | 19% | 13% | 12% | 10% |

It is then possible to calculate an RPI-position1-equivalent metric by adjusting the historical RPI metrics as follows:

RPI_historical=RPI_historical(1)/RPI_historical(pod)

Exemplary RPI Adjustments During Training:

Response per impression metrics that are divided by impressions can be volatile when there are few impressions. In many cases it is possible to log-transform the RPI metric being estimated to make it robust to these outliers. This often results in far better accuracy than leaving the RPI metric un-normalized.

RPI_historical=ln(RPI_historical)

Exemplary Weights on Specific Media Asset Patterns:

A weight may be applied to an entire class of media asset patterns. For example, CNN, NBC, BRAVO, may all be weighted the same amount, and additional data encapsulated by an ad's effectiveness on CNN, NBC, and BRAVO may vary. An example of this is shown in Table 26, which describes the training process in detail. Table 26 shows an example where CNN-Tues-7 pm, CNN-Tues-8 pm, etc, all receive a weight of 0.5. The RPI score for each of these different times can of course be different, and in the example, CNN-Tues-8 pm has the highest RPM (0.5).

In one embodiment of the present disclosure, knowledge of a specific media pattern (e.g., CNN) that is equal to a value may be important for predicting an ad's effectiveness (see Table 1-3). For example, a media asset pattern of a program may be set to a weight of, e.g., 0.4. However, when the program is "The Academy Awards," the weight may be set to 1.0. In one embodiment, special media asset patterns may be set up to cover a specific media asset pattern, and the other media asset patterns may be set to null. Table 1-3 shows an example of this: CNN-Tues-8 pm receives a weight of 0.5. This indicates that the system should "pay greater attention" to the Station-Day-Hour MAPType when the value is equal to CNN-Tues-8 pm. This is also equivalent to creating a new Media Asset Pattern Type which is equal to the specific MAP string which is being differentially weighted.

Media Asset Pattern Dummy Variable Mining:

Mining to find these special media asset patterns may involve a rule extraction algorithm. For example, the algorithm may search various search spaces, i.e., media asset patterns (station, program, genre, day, and hour). Mining may use the systems in an environment, such as the environment shown in FIG. 1A, to receive and analyze the airings. In mining, the system may identify predicates which have a high support, meaning they have been tested and found to be true on a large number of samples, and have a high confidence, meaning that the probability of a conversion or purchase is high.

The system may generate every possible combination of a media asset pattern. By working from most general media asset patterns first, the system may ensure adequate "support." Further, the system may form children media asset patterns from the general asset patterns. For example, generated media asset patterns may include: (DIY-Mon-9 pm-11 pm-Documentary); (DIY-Mon-9 pm-11 pm); (DIY-Mon); (DIY); (Documentary); (DIY-9 pm-11 pm); (Mon-9 pm-11 pm); (Mon); and (9 pm-11 pm). The system may also remove generated media asset patterns that are redundant, unlikely to be usable, and/or unlikely to be valuable, such as generated media asset patterns (Mon-9 pm-11 pm); (Mon); and (9 pm-11 pm).

There may also be constraints on a search space. Media asset patterns may be set to not allow collapsibility, which may occur if a child media asset pattern (e.g., ID-Tuesday-8 pm) is predictive, and the parent media asset pattern (e.g., ID-Tuesday) is also predictive. Thus, a child media asset pattern may be deleted (or "collapsed"), and the parent media asset pattern may be used. This may minimize a number of media asset patterns that need to be comprehended by human analysts and/or a machine learning algorithm consistent with this disclosure. This may also allow media asset patterns to work at as general a level as possible.

An example implementation may be set as follows: a media asset pattern is significant at $p<0.1$ level; orders from media asset pattern$>=1$; cost per card from media asset pattern$<\$10,000$; and/or above average performance only.

$E[\text{Response}|\text{Media Asset Pattern}]>E[\text{Response}]$.

An example result may be shown as shown in Table 2 below:

Table 28, below, depicts how weights can be applied to Media Asset Pattern Types as a whole, where all MAP strings receive the same weight.

TABLE 28

| Media Asset Pattern | Ad Effectiveness estimate (calculated demographic match between buyer demographics and viewer demographics) | weight |
|---|---|---|
| CNN-Tues-7 pm | 0.2 | 0.5 |
| CNN-Tues-8 pm | 0.5 | 0.5 |
| CNN-Tues-9 pm | 0.2 | 0.5 |
| CNN-Tues-10 pm | 0.2 | 0.5 |
| CNN-Tues-11 pm | 0.2 | 0.5 |

Table 29, below, depicts how weights can be applied to specific Media Asset Patterns. Different MAP strings can receive different weight.

TABLE 29

| Media Asset Pattern | Ad Effectivness estimate (calculated demographic match between buyer demographics and viewer demographics) | Weight |
|---|---|---|
| CNN-Tues-7 pm | 0.2 | 0.5 |
| CNN-Tues-8 pm | 0.5 | 0.9 |
| CNN-Tues-9 pm | 0.2 | 0.5 |
| CNN-Tues-10 pm | 0.2 | 0.5 |
| CNN-Tues-11 pm | 0.2 | 0.5 |

TABLE 30

| Media Asset Pattern | M Media Cost | R Responses | Placements | Resp p-value | Pattern Type | Arity | Potential-O Orders | Potential-R Responses | cost per card (best case) |
|---|---|---|---|---|---|---|---|---|---|
| ENN-Weekend-9pm-11pm-Sun | 3123.75 | 6 | 12 | 0.024496 | SWHD | 4 | 1 | 6 | 1561.875 |
| GC-WeekDay-11pm-3am-Tue | 2184.5 | 5 | 12 | 0.073612 | SWHD | 4 | 1 | 5 | 1092.25 |
| TWC-Weekend-3pm-6pm-Sun | 1020 | 2 | 2 | 0.049254 | SWHD | 4 | 1 | 2 | 340 |
| HGTV | 75264.1 | 54 | 60 | 5.51E−29 | S | 1 | 672 | 9072 | 9408.012 |
| ID | 177458.7 | 285 | 364 | 2.9E−114 | S | 1 | 3024 | 47880 | 8066.307 |
| MLC | 40200.75 | 39 | 162 | 0.062159 | S | 1 | 504 | 6552 | 6700.125 |
| NGC | 201144 | 229 | 994 | 0.024503 | S | 1 | 2352 | 38472 | 9142.909 |
| MLC-WeekDay-11am-3pm | 1721.25 | 6 | 11 | 0.015742 | SWH | 3 | 24 | 144 | 860.625 |
| NGC-WeekDay-11am-3pm | 24059.25 | 51 | 162 | 0.001633 | SWH | 3 | 120 | 1224 | 3007.406 |
| NGC-WeekDay-9pm-11pm | 14318.25 | 40 | 56 | 5.31E−15 | SWH | 3 | 48 | 960 | 2863.65 |
| WBBH-Weekend-5am-7am | 361.2498 | 6 | 1 | 0.05 | SWH | 3 | 24 | 144 | 180.6249 |
| KCOY-Weekend | 8653 | 11 | 38 | 0.088364 | SW | 2 | 96 | 528 | 2163.25 |
| Documentary, General | 81736 | 338 | 282 | 0.05 | G | 1 | 0 | 0 | 2818.483 |
| Documentary, News | 106.25 | 11 | 8 | 0.05 | G | 1 | 0 | 0 | 26.5625 |
| Sports Commentary | 19779.5 | 38 | 98 | 8.98E−05 | G | 1 | 0 | 0 | 6593.167 |

Figure 6A:
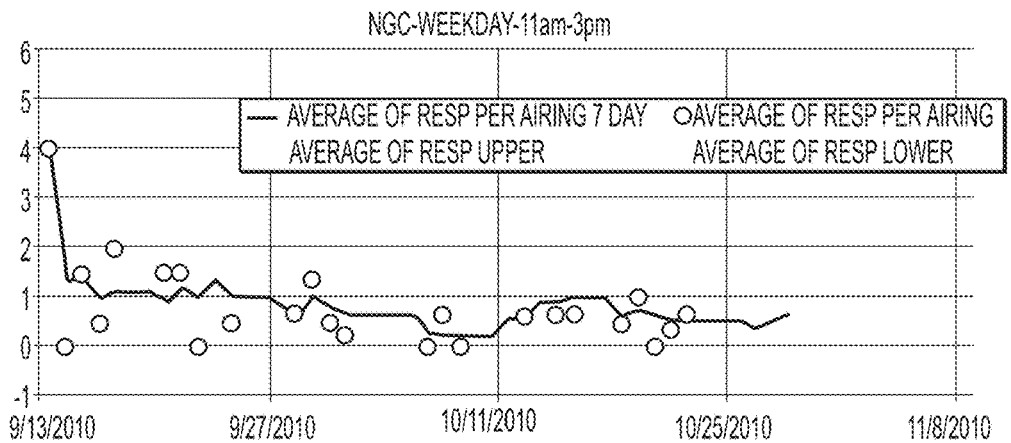
FIG. 6A depicts a graph of generated media asset pattern being tested over time, according to exemplary embodiments of the present disclosure.
Figure 6B:
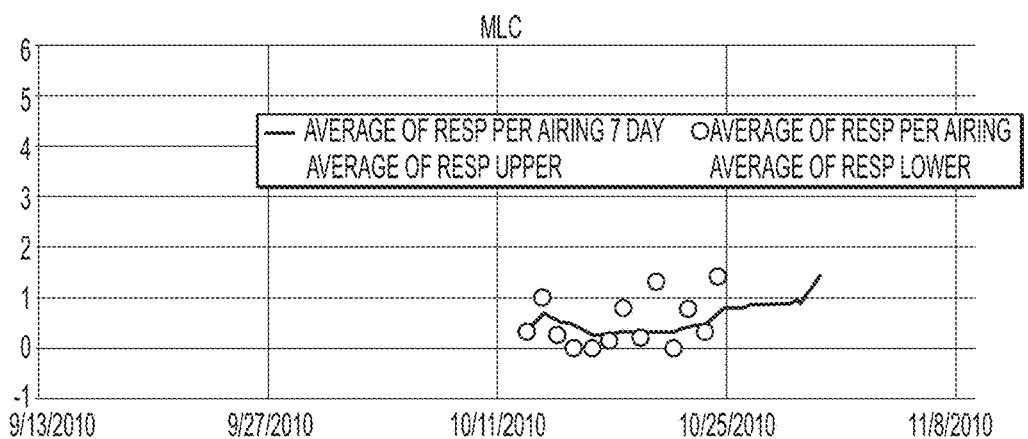
FIG. 6B depicts graph of another generated media asset pattern being tested over time, according to exemplary embodiments of the present disclosure.
Figure 6C:
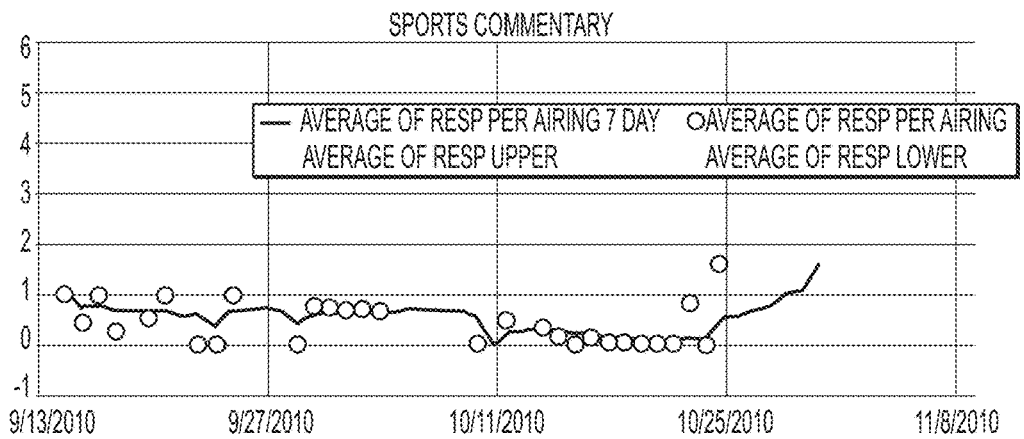
FIG. 6C depicts a graph of yet another generated media asset pattern being tested over time, according to exemplary embodiments of the present disclosure.

As shown in FIGS. 6A, 6B, and 6C, the generated media asset patterns are shown being tested over time. The dots of the graphs indicate dates when the generated media asset pattern was effectively tested in a live TV campaign by having an airing that matched the pattern. Each of these airings may be an opportunity to collect more data on the media asset pattern. After generating the media asset patterns, as shown in FIGS. 6A, 6B, and 6C, media asset patterns may be employed to determine which of the media asset patterns may be set up as a dummy pattern, and which may be included as another media asset pattern type.

Special Branching Structure and High-Order Features:

The model can be improved by adding structure to detect a variety of conditions. In one embodiment these conditions are implemented using a decision tree in which given a certain condition, a weighted model is executed. However these conditions could also be implemented as features themselves, incorporated as interaction terms or the like. Special conditions may include:

1. First-runs: Premieres like Walking Dead often generate 3-4 million impressions in a premiere, but in a second run only 600,000. This is a huge difference in impressions, and drives most of the error. In one embodiment, special branching logic may be used for first-runs now, so that they are recognized and then estimated based on historical first-runs. A branch may be implemented as if time-since-first-airing <1 then <premiere model> where <premiere model> is a weighted model described above and where the features are selected.
2. Local airing: Local airings can obtain value from a variety of local media asset pattern types.

Table 31, below, shows trained weights for local airings, and table below that shows performance predicting local response per impression for two different advertisers.

TABLE 31

| Variable | Input id | w | cadaline | cadaline_test | wexpert | wadaline | present |
|---|---|---|---|---|---|---|---|
| 55-AgeGender Program Authority | 33 | 0.002806 | 0.203434 | 0.228209 | 0.15155 | 0.162887 | 0.645773 |

TABLE 31-continued

| | | | | | | | |
|---|---|---|---|---|---|---|---|
| 21-STBDevice Station-Rotation | 21 | 0.150112 | 0.210645 | 0.244288 | 0.151548 | 0.104872 | 0.674908 |
| 36-STBHead Local DMA-Station-Day-Hour | 28 | 0.525256 | 0.270852 | 0.256366 | 0.144855 | 0.216903 | 0.357569 |
| 74-STBHead Station-Day-Hour-Quarter | 37 | 0.369 | 0.265005 | 0.249109 | 0.124555 | 0.179191 | 0.749886 |
| 83-AgeGender2 Station-Program Authority | 44 | 0.690138 | 0.28115 | 0.358626 | 0.123371 | 0.228219 | 0.36516 |
| 32-STBHead Station-Day-Hour | 27 | 0.688419 | 0.257169 | 0.236305 | 0.109395 | 0.167552 | 0.7501 |
| 82-AgeGender2 Station-Day-Hour | 43 | 0.083145 | 0.084368 | 0.116748 | 0.085555 | 0.050617 | 0.31611 |
| SourceViewPct 85 | 58 | 0.678007 | 0.182726 | 0.21657 | 0.080691 | 0.101695 | 0.76106 |
| 80-STBHead Local DMA-Station-Program Authority | 42 | 0.641174 | 0.193971 | 0.047278 | 0.019383 | 0.09252 | 0.137607 |
| SourceViewPct 47 | 56 | 0.625855 | 0.214057 | 0.200428 | 0.005974 | 0.136449 | 0.370292 |
| 78-AgeGender Weekpart-Daypart-Station-Program Authority-High Value | 41 | 0.855387 | 0.480057 | 0.525905 | 0.002717 | 0.473033 | 0.001042 |
| SourceViewPct 84 | 57 | 0.322128 | 0.157052 | 0.205061 | 0.000404 | 0.098444 | 0.641496 |
| 76-AgeGender Program Authority-Quarter | 39 | 0.509407 | 0.217669 | 0.239749 | 0.000001 | 0.172282 | 0.643527 |
| 59-AgeGender Station-Program Authority | 34 | 0.640022 | 0.180905 | 0.206033 | 0 | 0.151945 | 0.62225 |

| Segment | corrw | corr logw | percent present |
|---|---|---|---|
| local sourcekey 110384 | 0.273461 | 0.188556 | 0.211168 |
| Local sourcekey 110356 | 0.251984 | 0.265557 | 0.036193 |

3. High demographic volatility: Some networks have a great deal of variation from week to week in terms of viewership and perhaps even their schedule of programs. As shown in Table 32, below, FS-1 is a sports network and the particular sport shown in each weekly timeslot changes every week. Basketball viewers and volleyball viewers are very different, and this shows up in the demographics of the viewers. For these "high demographic volatility networks", features which use same-time-last-week, or even historical station-day-hour performance can be highly inaccurate, and it tends to be better to use features based around the Station-Program.

A branch may be created, as follows:

If tratio_network_volatility>0.21 then <high-tratio-volatility-model>

Where <high-tratio-volatility-model> is trained on airings which are on networks that have high tratio volatility. In practice, it may be expected that the features selected for the model above will tend to have more program-specific features.

TABLE 32

| Date | Day | Impressions | Network | Program |
|---|---|---|---|---|
| Aug. 31, 2013 | 3 | 761,342 | Fox Sports 1 | COLL FOOTBALL: PAC 12 L |

TABLE 32-continued

| Date | Day | Impressions | Network | Program |
|---|---|---|---|---|
| Sep. 7, 2013 | 3 | 1,000,501 | Fox Sports 1 | COLL FOOTBALL: PAC 12 L |
| Sep. 14, 2013 | 3 | 543,084 | Fox Sports 1 | COLL FOOTBALL: PAC 12 L |
| Oct. 5, 2013 | 3 | 444,578 | Fox Sports 1 | COLL FOOTBALL: BIG 12 L |
| Oct. 19, 2013 | 3 | 1,499,663 | Fox Sports 1 | COLL FOOTBALL: PAC 12 L |
| Oct. 26, 2013 | 3 | 710,916 | Fox Sports 1 | COLL FOOTBALL: PAC 12 L |
| Nov. 2, 2013 | 3 | 192,953 | Fox Sports 1 | FOX SPORTS LIVE L |
| Nov. 9, 2013 | 3 | 306,723 | Fox Sports 1 | FOX SPORTS LIVE L |
| Nov. 16, 2013 | 3 | 234,935 | Fox Sports 1 | FOX SPORTS LIVE |
| Nov. 23, 2013 | 3 | 193,520 | Fox Sports 1 | COLL FOOTBALL: BIG 12 L |
| Nov. 30, 2013 | 3 | 1,026,377 | Fox Sports 1 | ULTIMATE FIGHTER FINALE L |
| Dec. 7, 2013 | 3 | 149,952 | Fox Sports 1 | FOX SPORTS LIVE L |
| Dec. 14, 2013 | 3 | 137,760 | Fox Sports 1 | FOX SPORTS LIVE L |
| Dec. 21, 2013 | 3 | 122,551 | Fox Sports 1 | FOX SPORTS LIVE L |

As shown in Table 32, above, TV Network FS1 has high variability in viewership for its programs even during the same day of week, hour-of-day, and program name. Variability can also be caused when networks change their schedules (eg. showing volleyball, basketball, football, etc in the same timeslots). When there is high demographic volatility as above, forecasting viewership and response from the upcoming airing will be more accurate when using program-specific features.

Table 33, below, depicts exemplary low demographic volatility networks.

TABLE 33

| callletters | stdevdiff | absdiff_32minustratioactual | meandiff_32minustratioactual |
|---|---|---|---|
| DSNY | 0.059737758 | 0.046014225 | −0.008227945 |
| DXD | 0.062597609 | 0.047358082 | −0.004374518 |
| SONYETA | 0.081600238 | 0.064690547 | −0.014652289 |
| ENCWEST | 0.081625726 | 0.064803192 | 0.014160601 |
| TNNK | 0.08834976 | 0.066093817 | −0.00068341 |
| BOOM | 0.092145548 | 0.069325094 | −0.010345114 |
| NKTN | 0.09298583 | 0.072888674 | −0.015737483 |
| QVC | 0.098509047 | 0.076902623 | 0.022356379 |
| BET | 0.099818146 | 0.078824512 | 0.002835602 |
| GSN | 0.106359947 | 0.079360001 | 0.010407444 |
| NKJR | 0.101681394 | 0.08343749 | −0.00293748 |
| HMC | 0.107588397 | 0.084501056 | 0.010272793 |
| HLN | 0.114161717 | 0.085217182 | 0.019339856 |
| HGTV | 0.114381219 | 0.086356672 | 0.007490231 |
| TWC | 0.115132704 | 0.087603514 | 0.001213892 |
| TCM | 0.112659355 | 0.087656798 | 0.011851204 |
| MTV | 0.117015838 | 0.089119835 | −0.006694463 |
| RFD | 0.118062793 | 0.091784897 | −0.007267901 |

TABLE 34

| High demographic volatility networks | | |
|---|---|---|
| FS2 | 0.381882208 | 0.311891721 | −0.02898613 |
| EPIX | 0.388108476 | 0.318164344 | −0.005403923 |
| STARZCIN | 0.388334105 | 0.319495054 | 0.068866594 |
| HDNETM | 0.392414522 | 0.319642416 | −0.099978969 |
| INDIE | 0.396644462 | 0.329708841 | 0.009744889 |
| BYUTV | 0.408502593 | 0.330631201 | −0.030426538 |
| NUVO | 0.422968523 | 0.338527025 | 0.01763275 |
| AECN | 0.420555876 | 0.346678381 | −0.012042394 |
| STARZCOM | 0.424315761 | 0.350517543 | 0.037716248 |
| AMC | 0.446219442 | 0.352825329 | 0.02867856 |
| MAVTV | 0.430753303 | 0.359980424 | −0.015734196 |
| CNBCW | 0.42843112 | 0.368438834 | 0.118018351 |
| IFC | 0.465177115 | 0.370091136 | 0.040695151 |
| ENCO | 0.447039619 | 0.371379583 | 0.037977942 |
| LOGO | 0.455418266 | 0.378725362 | −0.009302438 |
| UHD | 0.465517888 | 0.394160019 | −0.007067299 |

TABLE 35

Low volatility station-programs

| | | | | | | |
|---|---|---|---|---|---|---|
| ESPN | NBA Face to Face With Hannah Storm | 0.000131 | 0.075843 | 0.075843 | −0.45279 | −0.52863 |
| SHOW | To Live and Die in L.A. | 0.000129 | 0.016037 | −0.01604 | −0.14113 | −0.12509 |
| FX | Knock Off | 0.000103 | 0.030574 | 0.030574 | 0.427313 | 0.39674 |
| SHOWCSE | Even the Rain | 9.95E−05 | 0.089048 | −0.08905 | −0.26051 | −0.17146 |
| GALA | Santo vs. el rey del crimen | 9.83E−05 | 0.059348 | −0.05935 | 0.154556 | 0.213904 |
| SYFY | Messengers 2: The Scarecrow | 9.02E−05 | 0.019637 | −0.01964 | 0.571118 | 0.590755 |
| ESQR | Rocco's Dinner Party | 8.55E−05 | 0.071287 | −0.07129 | −0.49515 | −0.42387 |
| ESQR | ROCCOS DINNER PARTY | 8.55E−05 | 0.071287 | −0.07129 | −0.49515 | −0.42387 |
| TMC | The Advocate | 5.80E−05 | 0.028745 | 0.028745 | 0.210809 | 0.182063 |
| LIFE | To Have and to Hold | 4.73E−05 | 0.006146 | 0.006146 | 0.335054 | 0.328908 |
| 5STARM | Salvation Road | 1.81E−05 | 0.127159 | −0.12716 | −0.03399 | 0.093165 |
| FOXD | HOOTERS ANGELS 2011 | 7.16E−06 | 0.042774 | −0.04277 | 0.242489 | 0.285263 |
| FOXD | HOOTERS SNOW ANGELS | 7.16E−06 | 0.042774 | −0.04277 | 0.242489 | 0.285263 |
| FOXD | Hooters' Snow Angels | 7.16E−06 | 0.042774 | −0.04277 | 0.242489 | 0.285263 |
| FOXD | The Hooters 2011 Snow Angels | 7.16E−06 | 0.042774 | −0.04277 | 0.242489 | 0.285263 |

Below is a sample of SQL code for calculating volatility by network

```
select
-- a.sourcesegmentkey,
--bb.stationmasterid,
c.callletters ,
-- bb.DayNumberOfWeek, bb.hourofday,
stdev(a.correlation − b.correlation) stdevdiff,
avg(abs(a.correlation − b.correlation)) absdiff__32minustratioactual,
avg(a.correlation − b.correlation) meandiff__32minustratioactual ,
avg(a.correlation) tratiom32, avg(b.correlation) tratioactual
--a.correlation tratio32, b.correlation tratioactual
-- *
from
(select * from [tahoma\sql2008r2].demographics.scoring.
modelsourcemapscore
where mediaassetpatterntypeid=32
and not sourcesegmentkey like '%NC--%'
and sourcesegmentkey = '110402'
) a
inner join
(select * from [tahoma\sql2008r2].demographics.scoring.map
  where mediaassetpatterntypeid=32
) bb
  on a.mapid=bb.mapid
  and a.mediaassetpatterntypeid=bb.mediaassetpatterntypeid
inner join
(select * from dw1.demographics.scoring.modelsourcemapscoreactuals
  where not sourcesegmentkey like '%NC--%'
) b
on bb.StationMasterID=b.stationmasterid
-- and cast(cast(a.AirDate as date) as datetime) = b.airdate
and bb.DayNumberOfWeek = datepart(weekday,b.airdate) -- b.dayofweek
and bb.hourofday = b.hourofday
and bb.marketmasterid=b.marketmasterid
and a.sourcesegmentkey = b.sourcesegmentkey
inner join dw1.demographics.dim.station c
on b.stationmasterid=c.stationmasterid
group by
-- a.sourcesegmentkey,
--bb.stationmasterid,
c.callletters
--,bb.DayNumberOfWeek, bb.hourofday
order by
stdev(a.correlation − b.correlation) desc
```

The table below shows trained model for estimating RPI for an airing which has high demographic volatility. The system makes use of Buyers per million features to increase its accuracy. Table 36, below, shows the prediction performance on airings.

TABLE 36

| Variable | Input id | w | cadaline | cadaline_test | wexpert | wadaline | present |
|---|---|---|---|---|---|---|---|
| SourceViewPct84 | 57 | −5.25274 | 0.753682 | 0.765462 | 0.149844 | 0.97362 | 0.641496 |
| SourceViewPct85 | 58 | 0.060485 | 0.69115 | 0.717313 | 0.149839 | 0.968607 | 0.76106 |
| 28-STBHead Program | 25 | −2.88135 | 0.667029 | 0.688489 | 0.149833 | 1.115365 | 0.46505 |
| 75-STBHead Program Authority-Quarter | 38 | 1.316007 | 0.552701 | 0.651104 | 0.123854 | 1.050081 | 0.543583 |
| 76-AgeGender Program Authority-Quarter | 39 | 2.262887 | 0.487257 | 0.52321 | 0.121283 | 0.597223 | 0.643527 |
| 32-STBHead Station-Day-Hour | 27 | 3.010398 | 0.539881 | 0.534069 | 0.094589 | 0.939228 | 0.7501 |
| 51-AgeGender Station-Day-Hour | 29 | −2.81101 | 0.485359 | 0.477517 | 0.041236 | 0.512429 | 0.60378 |
| 55-AgeGender Program Authority | 33 | −1.31578 | 0.50033 | 0.537834 | 0.038298 | 0.622985 | 0.645773 |
| 60-STBHead Station-Program Authority | 35 | 1.09807 | 0.634798 | 0.56089 | 0.032457 | 1.407408 | 0.62217 |
| 18-STBDevice-STB Station-Day-Hour | 19 | 1.092676 | 0.366499 | 0.427077 | 0.030492 | 0.369149 | 0.168827 |
| 53-AgeGender Station-Program | 31 | 1.66064 | 0.49126 | 0.520857 | 0.030395 | 0.475935 | 0.099142 |
| 65-AgeGender Station-Program Authority-High Value | 36 | −1.04116 | 0.266688 | 0.422249 | 0.02721 | 0.32742 | 0.011334 |

TABLE 36-continued

| | | | | | | | |
|---|---|---|---|---|---|---|---|
| 24-STBDevice STB Station-Program Authority | 22 | 0.928707 | 0.464556 | 0.386469 | 0.007012 | 0.357844 | 0.124856 |
| 83-AgeGender2 Station-Program Authority | 44 | 1.639985 | 0.627654 | 0.666194 | 0.003657 | 0.610139 | 0.36516 |
| 96-STBHead Actual Airings Minus 21 Days | 45 | −0.25876 | 0.262946 | −0.03297 | 0.000001 | 0.281401 | 0.079335 |

| Segment | corr w | corr logw | percent present |
|---|---|---|---|
| pred full set | 0.400229 | 0.083105 | 0.794018 |
| national sourcekey 110356 | 0.44727 | 0.430632 | 0.117586 |
| national sourcekey 110384 | 0.120526 | 0.2906 | 0.05616 |
| national sourcekey 110424 | 0.303704 | 0.26144 | 0.016439 |
| volatile tratio | 0.71906 | 0.699078 | 0.025741 |
| stable tratio | 0.274205 | 0.290363 | 0.017348 |
| national | 0.43957 | 0.438388 | 0.190185 |
| high national imps | 0.424759 | 0.468252 | 0.003876 |
| low national imps | 0.333314 | 0.276243 | 0.019727 |
| PMIC Dental Local | 0.160301 | 0.188145 | 0.036193 |

4. Syndication: Syndication on television refers to when re-runs of a program are broadcast on another network, and then distributed to a range of local stations. The local stations may or may not carry the syndicated program, creating a distribution footprint that can be fairly unique. Syndication is often priced more favorably than other national broadcasts. In order to estimate syndicated airings, a variety of syndication-specific branches and features are used. Syndicated programs can be thought of as comprising a hierarchy with "program" being the most general representation of the airing (eg. "Judge Karen's Court"). Syndication-network (eg. "SYN-CBSUNI—Judge Karen's Court") is next in level of granularity. Syndication-network-program-daypart is the most granular. Each of these features can be used when predicting the response per impression from a particular airing.

It may be possible to create a special branch for syndicated airings as follows:

If <syndicated airing> then <syndicationmodel>

Figure 9I:
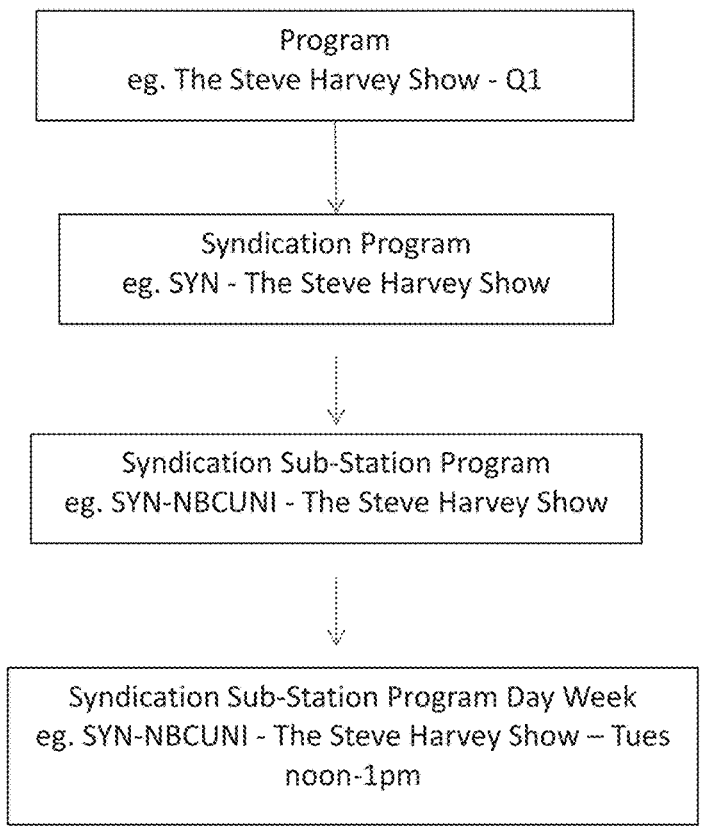

FIG. 9I depicts an exemplary embodiment of a series of programs, syndication programs, syndication sub-station program, and syndication sub-station program day/week.

Tables 37A-37C below depict examples of different features used for predicting syndicated airings: Maptype 83==syndicated-station-program; maptype 83==syndicated program; maptype 76==Program-quarter of year.

TABLE 37A

| MediaAssetPatternKey | sourcesegmentkey | MediaAssetPatternTypeID | Correlation |
|---|---|---|---|
| SYN-20THCTV - American Dad! | 110356 | 83 | −0.61966 |
| SYN-20THCTV - Are We There Yet? | 110356 | 83 | −0.46726 |
| SYN-20THCTV - Bones | 110356 | 83 | 0.568095 |
| SYN-20THCTV - Burn Notice | 110356 | 83 | 0.604625 |
| SYN-20THCTV - Century 20 | 110356 | 83 | −0.05786 |
| SYN-20THCTV - Century 21 | 110356 | 83 | 0.333567 |

TABLE 37B

| MediaAssetPatternKey | sourcesegmentkey | MediaAssetPatternTypeID | Correlation |
|---|---|---|---|
| SYN - 'Til Death | 110356 | 106 | −0.61339 |
| SYN - 30 Rock | 110356 | 106 | −0.62784 |
| SYN - Access Hollywood | 110356 | 106 | 0.3335 |
| SYN - Access Hollywood Live | 110356 | 106 | 0.274231 |
| SYN - According to Jim | 110356 | 106 | −0.73037 |
| SYN - America Now | 110356 | 106 | 0.133193 |

TABLE 37C

| MediaAssetPatternKey | sourcesegmentkey | MediaAssetPatternTypeID | Model ID | Version ID | Correlation |
|---|---|---|---|---|---|
| Judge Mathis - Q1 | 110356 | 76 | 1 | 1 | 0.805666 |
| Judge Mathis - Q2 | 110356 | 76 | 1 | 1 | 0.786072 |
| Judge Mathis - Q3 | 110356 | 76 | 1 | 1 | 0.776222 |
| Judge Mathis - Q4 | 110356 | 76 | 1 | 1 | 0.78142 |

Table 38, below, depicts syndicated features and degree of predictiveness for estimating response per impression where RPI is phone response per impression.

TABLE 38

| Maptype | corr | present % |
|---|---|---|
| 106-AgeGender2 Syndication Overall Station - Program Authority | 0.53 | 44% |
| 75-STBHead Program Authority - Quarter | 0.49 | 24% |
| 83- AgeGender2 Station - Program Authority | 0.48 | 43% |
| 76- AgeGender Program Authority - Quarter | 0.32 | 71% |
| TRP59 | 0.10 | 100% |
| TRP | 0.08 | 100% |
| 54- AgeGender Syndication Program | 0.08 | 100% |
| 51- AgeGender Station - Day - Hour | 0.04 | 100% |
| TRP51 | 0.04 | 100% |
| 105- AgeGender2 Syndication Overall Station - Day - Hour | 0.03 | 29% |
| 25-STBDevice-STB Program Name | (0.17) | 24% |

The table in FIG. 9J depicts trained weights for a syndication branch of model, where "WExpert are the weights."

5. High impression airings:
   Error tends to show a pattern by impression decile—so that there is high percentage error on the smallest airings, low error on medium sized broadcasts, and then an uptick in error on the biggest impression airings. Those big impression airings tend to be "destination programs" like "Price is Right", "Revenge", and so on. Although the uptick in error on these looks small (eg. only 20%) actually these are the airings that are producing most total error in each campaign. Therefore reduction on error here will dramatically increase campaign performance. The model may be broken so as to have branches for large-airing programs above 1 million impressions. For these programs, the variables selected tend to comprise network-program estimates, rather than time of day variables, since the programs carry the audience and not the other way around.
e. Below are variables selected for this model—yellow indicates station-program variables, and blue station-day-hour. Most of the variables (8/10) are station-program.

TABLE 39

| Var | Pres | weight |
|---|---|---|
| I77 - STBHead Weekpart - Daypart - Station - Program Authority - High Value | 2% | 22.124% |
| I74 - STBHead Station - Day - Hour - Quarter | 100% | 20.999% |
| I78 - AgeGender Weekpart - Daypart - Station - Program Authority - High Value | 15% | 16.872% |
| I75 - STBHead Program Authority - Quarter | 100% | 11.155% |
| I99 - STBHead Actual Airings Prior Station - Program - Hour | 89% | 9.382% |
| I98 - AgeGender2 Current Station - Program - Hour | 60% | 8.682% |
| I65 - CompetitiveData Station - Program Authority - High Value | 37% | 6.234% |
| I82 - AgeGender2 Station - Day - Hour | 100% | 2.829% |
| I86 - STBHead Current Quarter Station - Program Authority | 100% | 1.325% |
| I60 - STBHead Station - Program Authority | 89% | 0.304% |
| I66 - STBHead Station - Program Authority - High Value | 3% | 0.044% |
| I51 - AgeGender Station - Day - Hour | 100% | 0.037% |
| I32 - STBHead Station - Day - Hour | 100% | 0.009% |
| I28 - STBHead Program | 78% | 0.003% |
| I87 - STBHead Current Quarter Station - Day - Hour | 100% | 0.003% |

Figure 9K:
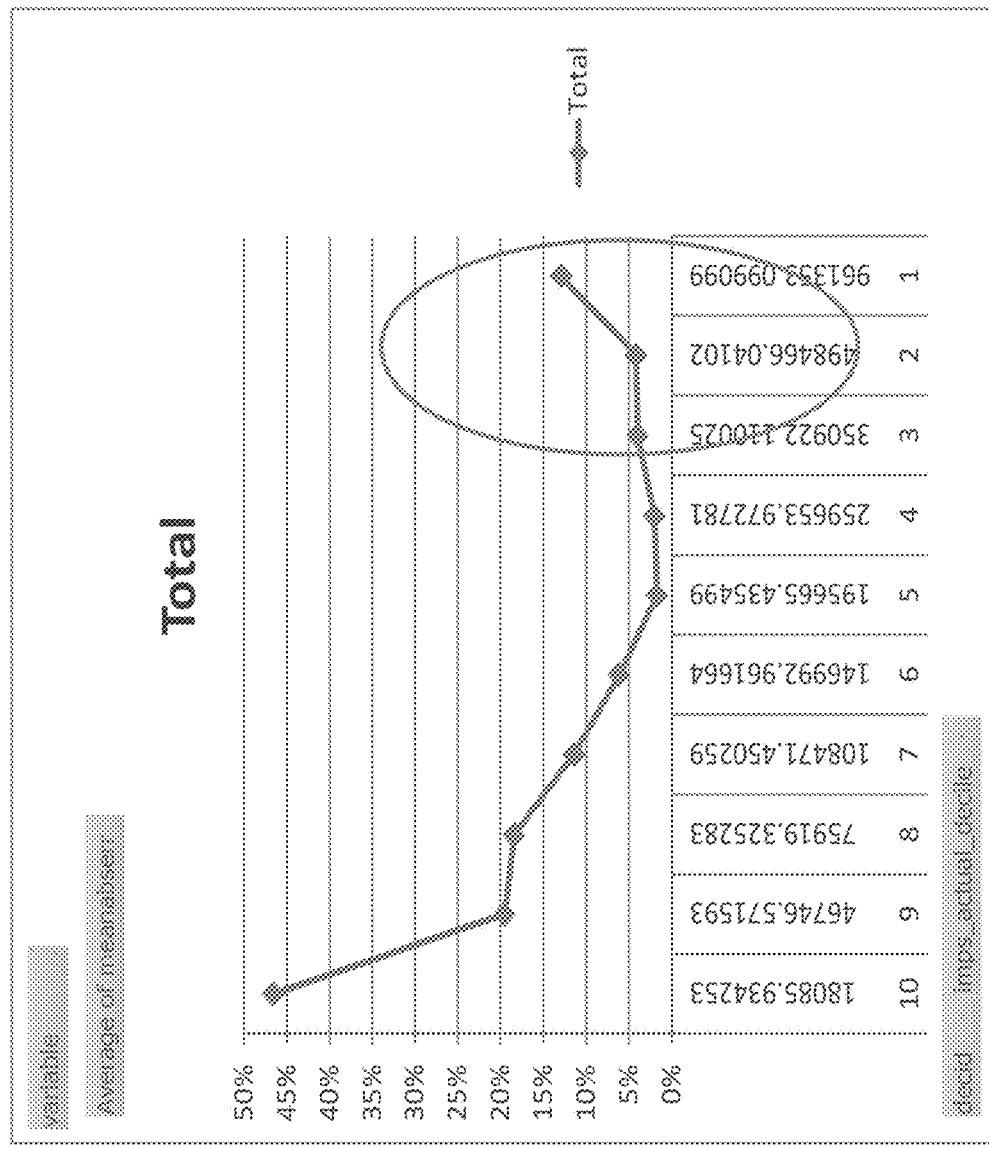

FIGS. 9K-9L depict variable weights and percentages associated with the above table.

Figure 9M:
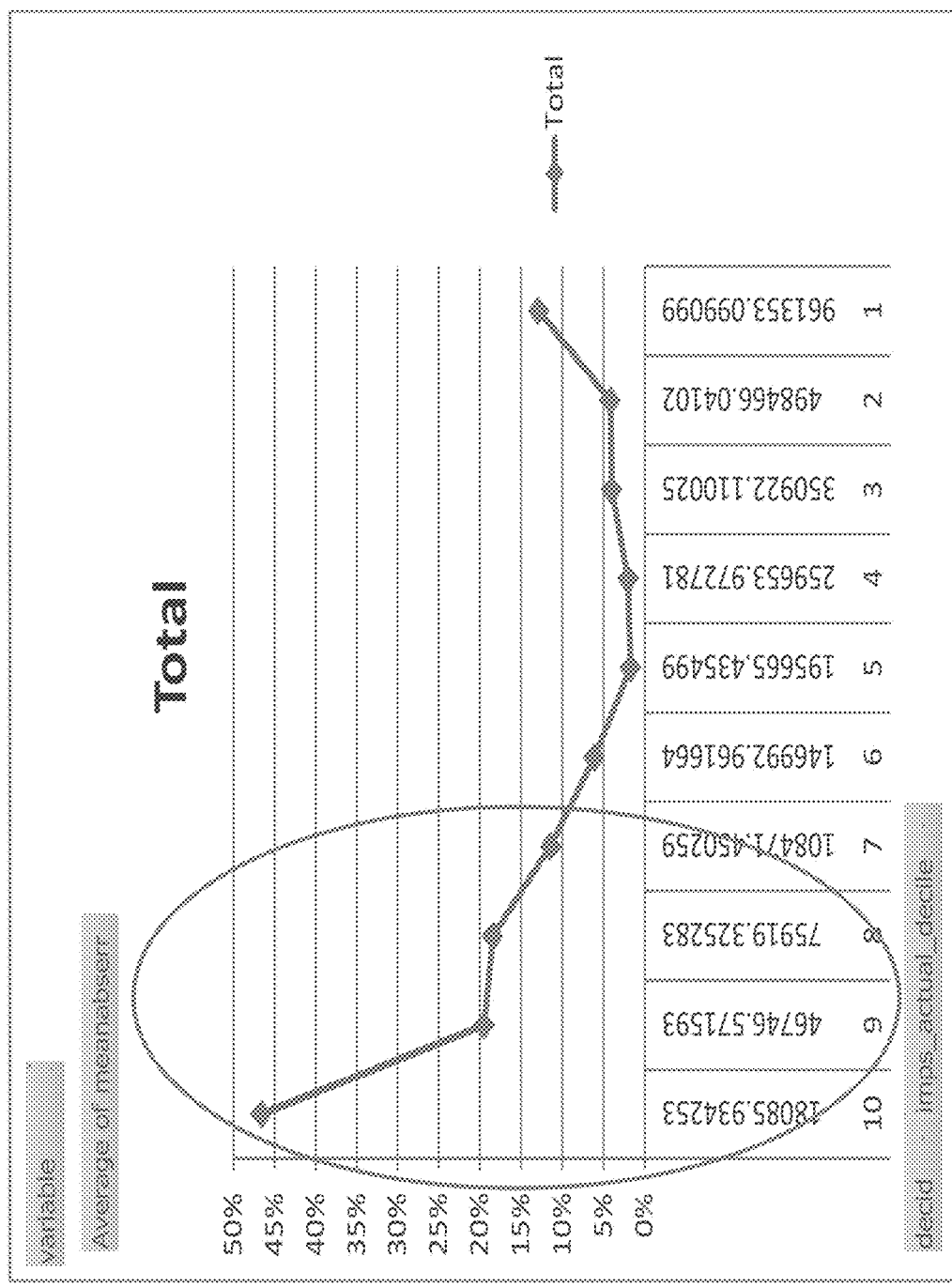

6. Low impression airings
   As described above, the error pattern tends to be high percentage error on small airings, where this is in part due to the intrinsically small size of the airings. Nevertheless, it may still be desirable to reduce error on these airings, since it is conceivable that an advertiser might be executing a campaign using local cable, local broadcast, or small national networks. It may be possible to create another branch to cover these cases. For these small airings, their performance tends to be dependent very much on the time of day and network, rather than the particular program that is playing. For example, in order to estimate Military channel viewership, it turns out the best variables are the time of day—it seems that people watching this network really tend to tune into generic Military programming, rather than audiences looking for specific programming.
   A variable selection routine may be run for all airings with <50,000 impressions. This ends up automatically selecting features that are station-day-hour based, and not selecting station-program features.
   FIGS. 9M-9N depicts the features that are being used. Please note the features in blue indicate that they are Station-day-hour based, and yellow are Station-program based. No color indicates not classified into either category. It is possible to see that 6/7 features are Station-day-hour. Only "high value" programs (present <1% of the time) require the use of Station-program feature, and the weight is relatively low.

TABLE 40

| Var | Present | weight |
|---|---|---|
| I94 - STBHead Actual Airings Minus 7 Days | 24% | 18.1204% |
| I97 - STBHead Actual Airings Minus 28 Days | 23% | 17.4835% |
| I51 - AgeGender Station - Day - Hour | 77% | 16.9061% |
| I87 - STBHead Current Quarter Station - Day - Hour | 89% | 12.7661% |
| I95 - STBHead Actual Airings Minus 14 Days | 23% | 12.3543% |
| I74 - STBHead Station - Day - Hour - Quarter | 89% | 11.0287% |
| I32 - STBHead Station - Day - Hour | 87% | 3.8501% |
| I99 - STBHead Actual Airings Prior Station - Program - Hour | 40% | 2.6417% |
| I82 - AgeGender2 Station - Day - Hour | 79% | 1.7760% |
| I77 - STBHead Weekpart - Daypart - Station - Program Authority - High Value | 0% | 1.3571% |
| I96 - STBHead Actual Airings Minus 21 Days | 23% | 1.3080% |
| I98 - AgeGender2 Current Station - Program - Hour | 31% | 0.4054% |
| I61 - AgeGender Local Station - Day - Hour | 77% | 0.0025% |

FIG. 10 depicts an example of a branched model.

Figure 11:
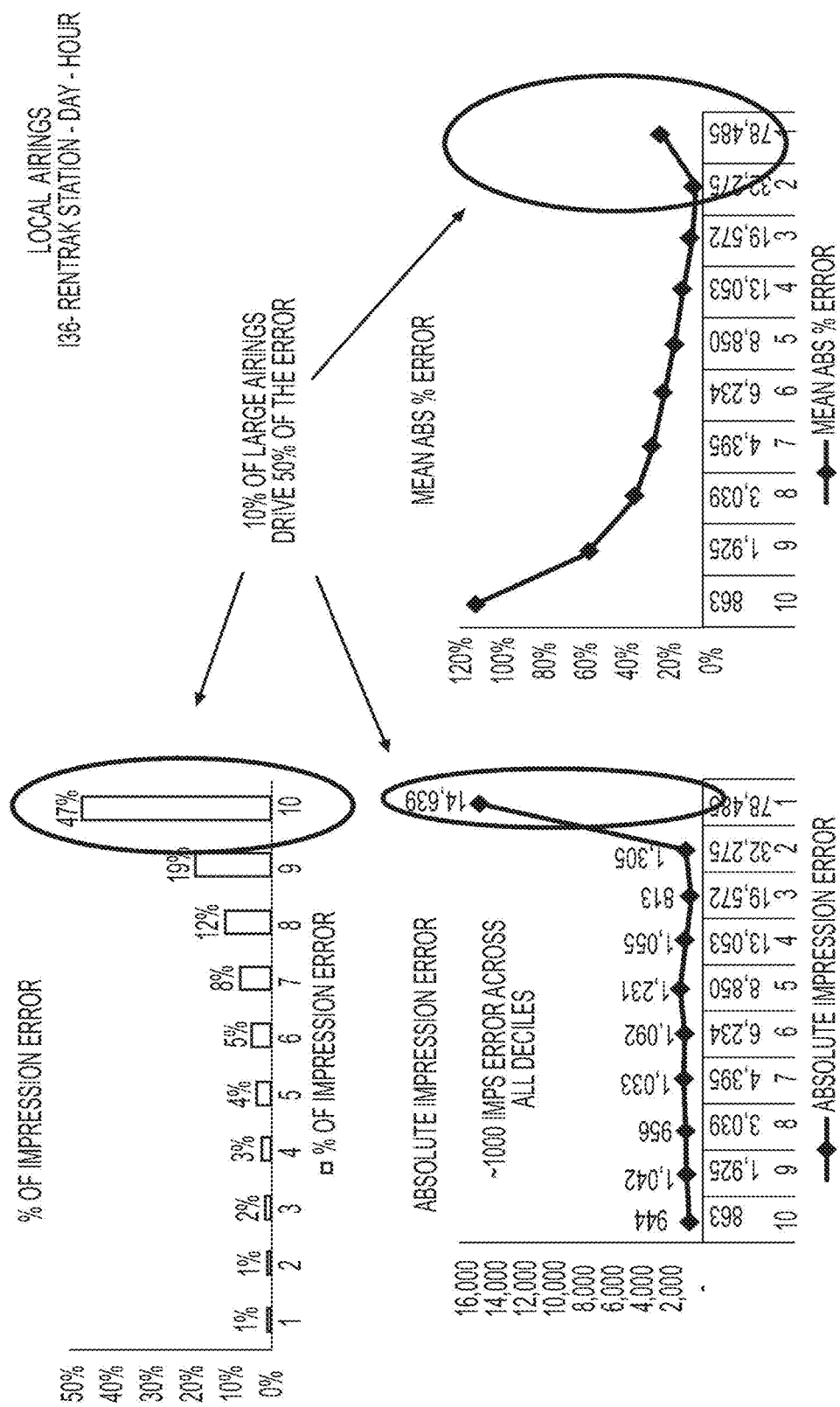
FIG. 11 depicts an error analysis of impressions forecasting, according to exemplary embodiments of the present disclosure.

FIG. 11 depicts an error analysis of impressions forecasting. This shows that the premiere and prime-time programs tend to generate most of the error in the system. Because of this, branches are created to detect prime-time and premiere episodes, and then a model is used which is specialized for operating on those cases. In practice large-impression TV airings tend to result in a model that selects more program-specific attributes.

Figure 12:
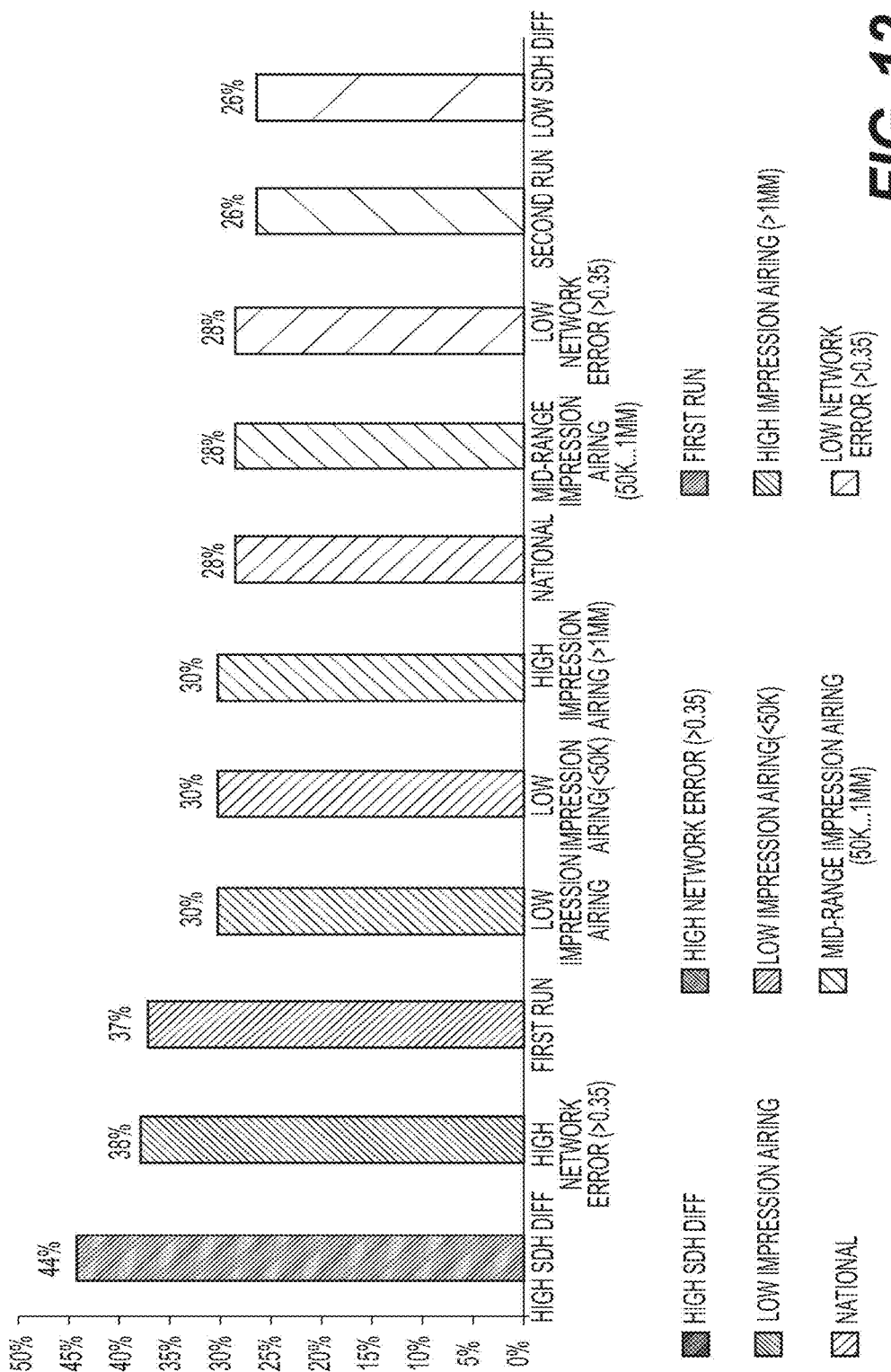
FIG. 12 depicts an exemplary accuracy analysis on various conditions, according to exemplary embodiments of the present disclosure.
Figure 13:
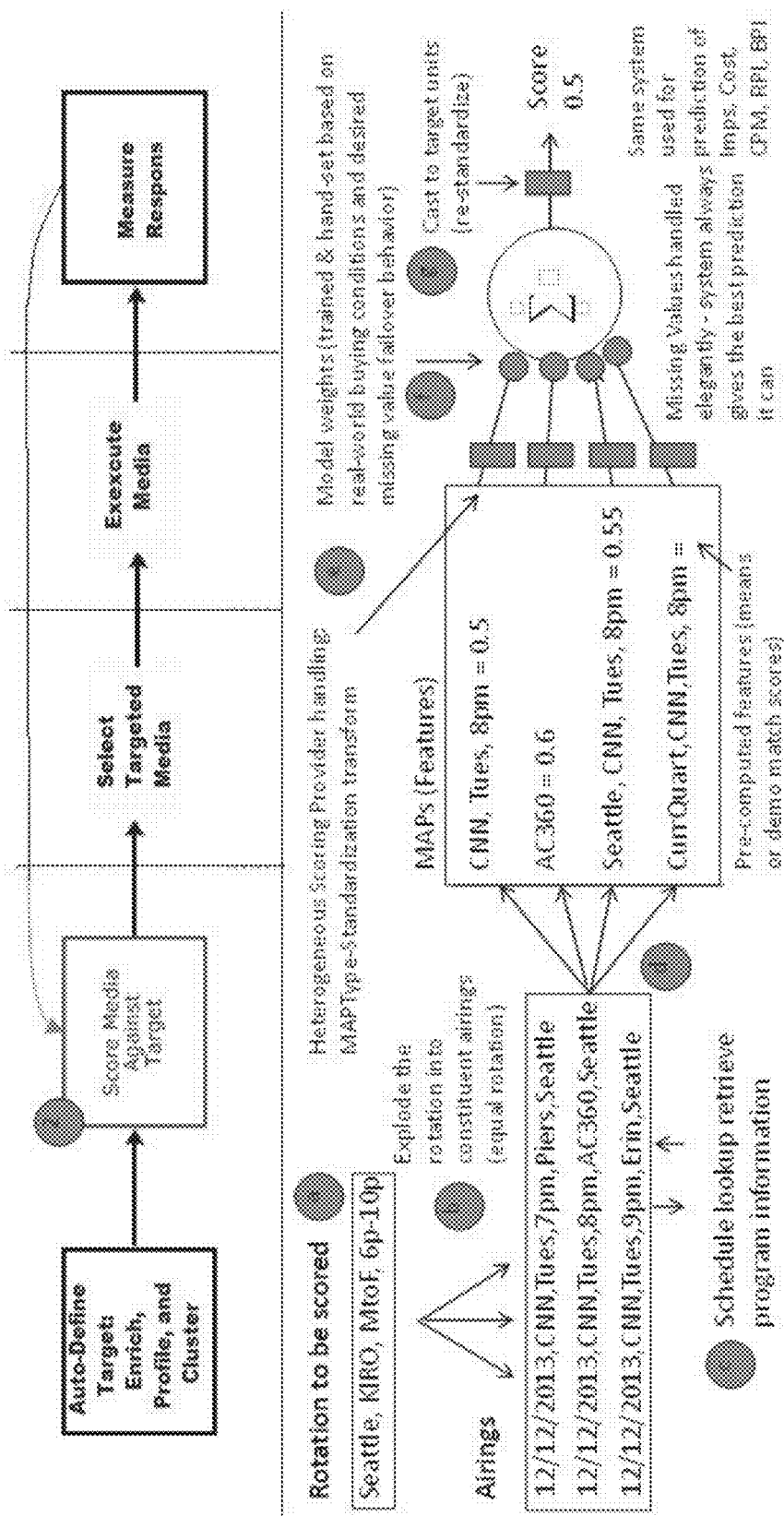
FIG. 13 depicts an exemplary process for automated media scoring, according to exemplary embodiments of the present disclosure.

FIG. 12 depicts an exemplary accuracy analysis on various conditions.

Figure 4A:
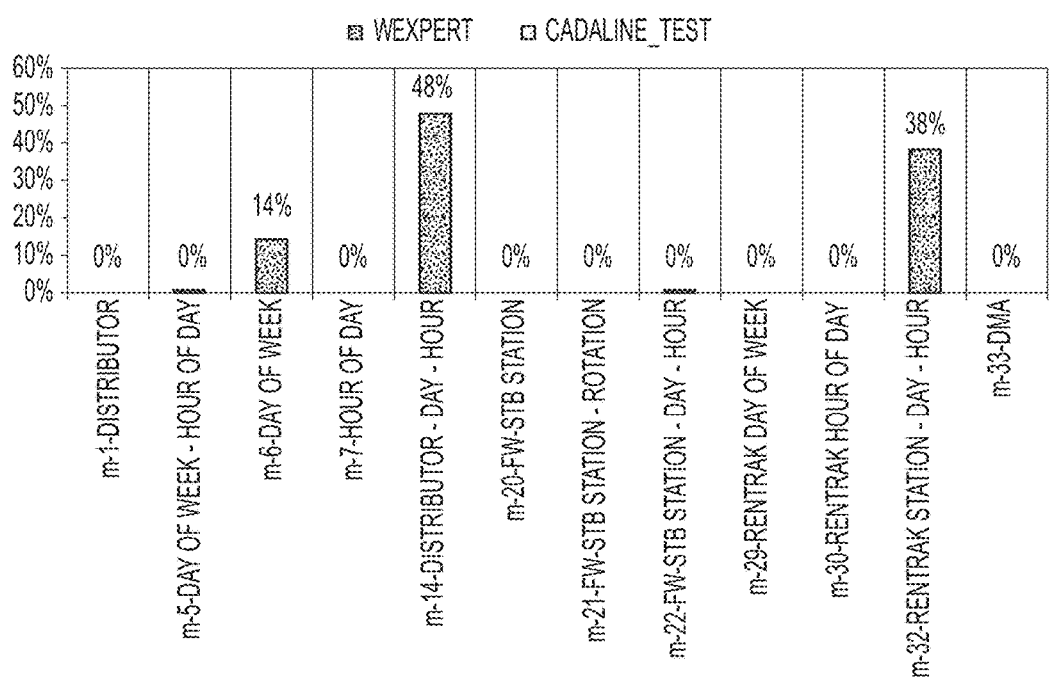
FIG. 4A depicts a bar graph in which all variables for a given ad effectiveness metric may be selected, according to exemplary embodiments of the present disclosure.
Figure 4B:
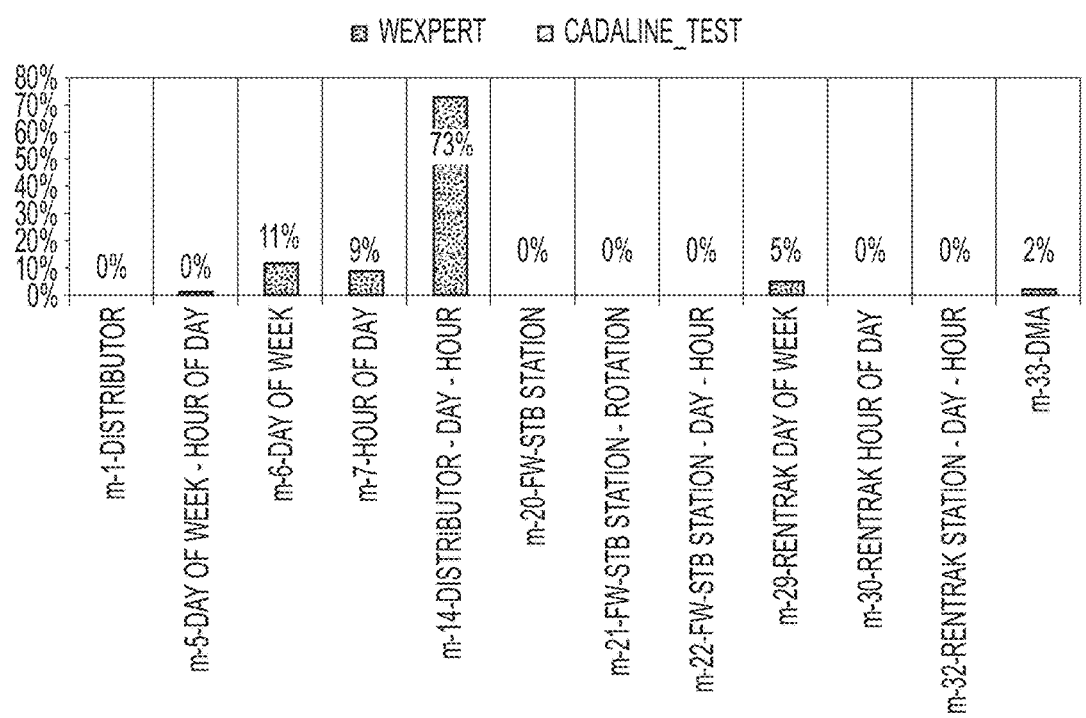
FIG. 4B depicts a bar graph in which missing value variables may be allowed and/or selected, according to exemplary embodiments of the present disclosure.
Figure 4C:
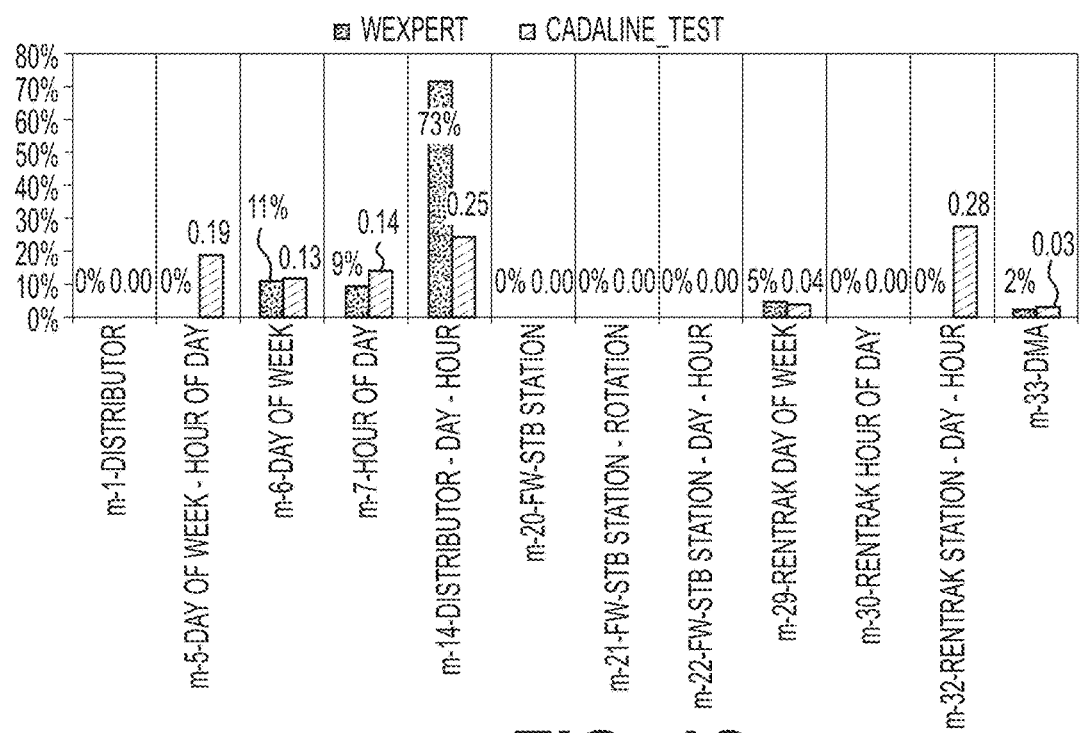
FIG. 4C depicts a bar graph of a comparison of variables (and weights) selected versus the variable correlations, according to exemplary embodiments of the present disclosure.
Figure 5:
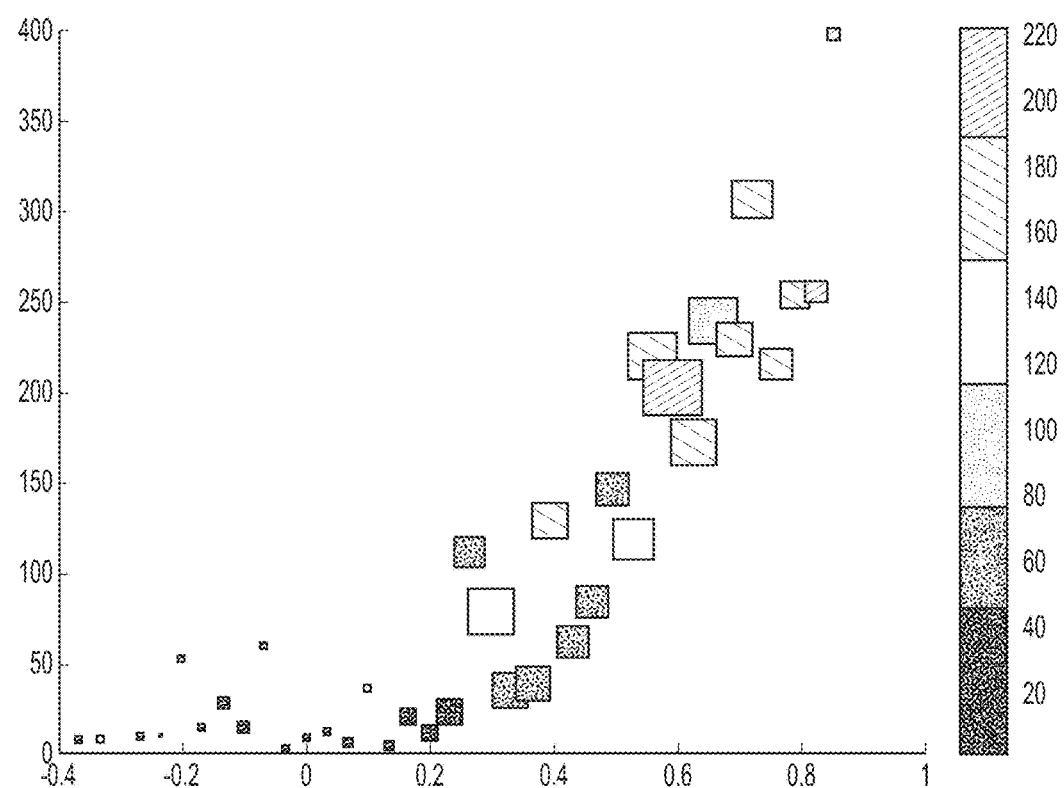
FIG. 5 depicts a graph of predicted ad response versus future responses per million impressions, according to exemplary embodiments of the present disclosure.

Exemplary Variable Selection:
   Variable participation may be limited due to participation thresholds which remove variables, missing value handling, which enables the system to elegantly operate with missing features, and forward-backward selection, which aggressively removes variables that do not make a significant contribution to the model. FIGS. 4A, 4B, and 4C depict different selections of variables. For example, FIG. 4A depicts variables selected in cases in which all variables that are present are used, FIG. 4B depicts variables selected in cases in which missing values are allowed, and FIG. 4C depicts a comparison of the variables selected (and weights) versus the variable correlations. FIG. 5 depicts predicted ad response versus future responses per million impressions.

Exemplary Effects of Fatigue:

Extensive surveys and meta-studies of hundreds of publications have concluded that advertisement response shows diminishing returns when displayed to the same target audience over time. A version of the embodiment will take into account the decrease in performance during repeated exposures of advertising in the same positions, which may be referred to as estimates of "fatigue."

One embodiment estimates fatigue as a function of individual advertisement exposures of persons participating using a panel. In this embodiment the viewers of a program are known and it may be possible to count the number of times the viewer had the TV on while the ad was on. This approach requires the existence of a panel and their viewing activity.

A second embodiment may estimate fatigue by counting airings delivered to the same program or station-time-of-day. This latter approach has an advantage in that it only requires an advertiser to keep a count of the number of airings in each media asset pattern. It does not require a panel or viewing activity in order to provide a fatigue estimate.

Figure 2A:
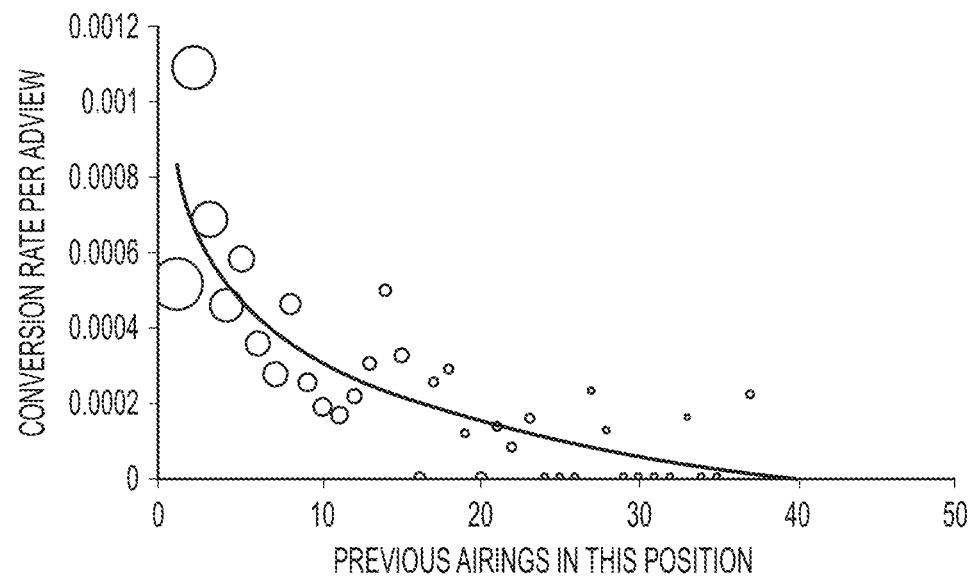
FIG. 2A depicts a graph of person-level conversions per advertisement view for certain products, according to exemplary embodiments of the present disclosure.
Figure 2B:
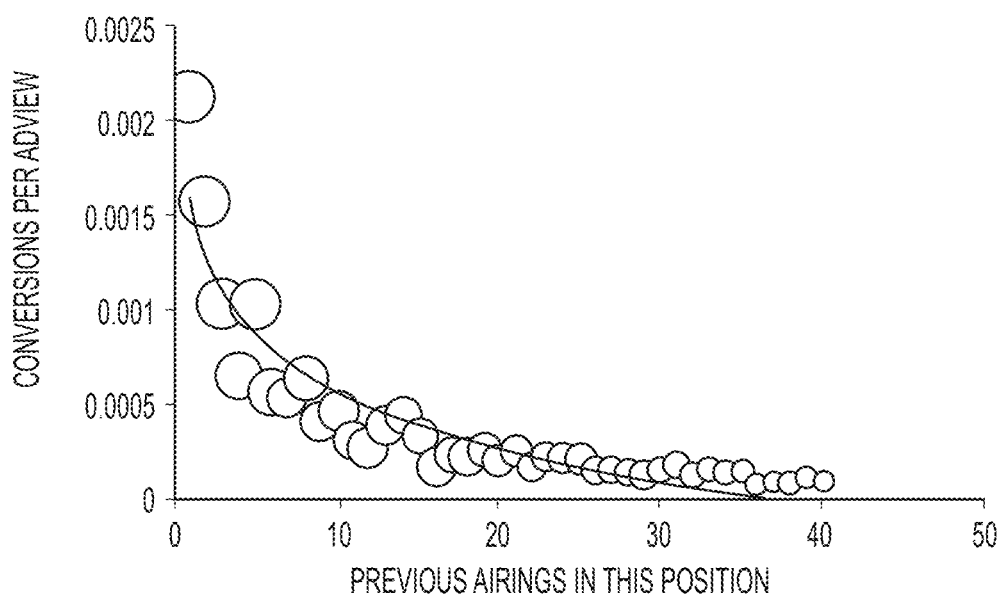
FIG. 2B depicts another graph of person-level conversions per advertisement view for certain products, according to exemplary embodiments of the present disclosure.
Figure 2C:
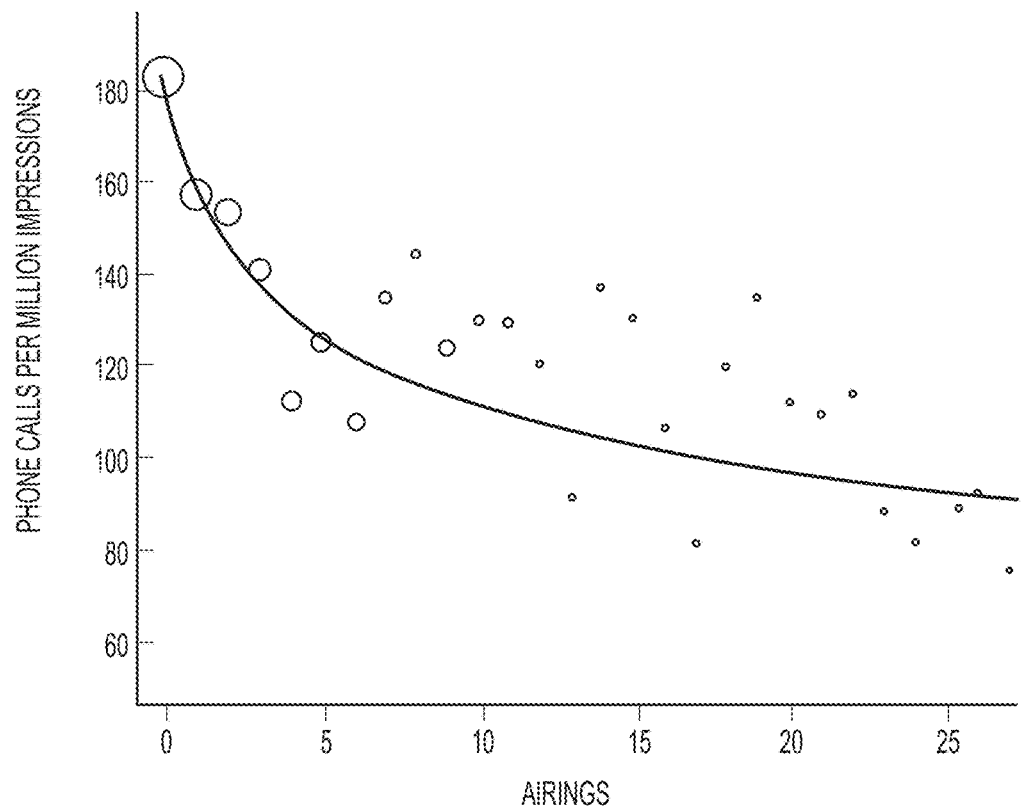
FIG. 2C depicts a graph of phone calls per million impressions in response to an embedded phone number in a TV advertisement observed after placing the advertisement in the same station-day-hour, according to exemplary embodiments of the present disclosure.

Another method is to use the number of historical airings in each media asset pattern and compare it to the phone response from that same media asset pattern. FIGS. 2A, 2B, and 2C depict response per impression for phone responders to television advertisements versus a number of repeat airings in the same station-day-hour. The response per impression decreases as a function of the log of the number of repeat airings.

Another method is to use the number of airings in media asset pattern and compare it to the web response from that media asset pattern. As the airing count increases, the web response should decrease. A Fatigue function can then be estimated and used to estimate the effect of fatigue (or of airing in the same media asset pattern).

Fatigue can also be estimated by examining set top box conversion rate versus number of exposures to an individual person. Set top box conversion rate can be calculated as the number of persons who converted (known buyers as provided by an advertiser) divided by the number of persons in the population. It may then be possible to count the converters/viewers for persons who have had 1 exposure, 2 exposures, 3 exposures and so on. FIGS. 2A and 2B depict, for two different products, person-level conversions per advertisement view. As indicated by FIGS. 2A and 2B, conversion rate declines as a function of the log of airings.

FIG. 2C depicts phone calls per million impressions in response to an embedded phone number in a TV advertisement observed after placing the advertisement in the same station-day-hour 1, 2, 3, . . . , 20+ times. As indicated by FIG. 2C, the number of phone calls may decline relative to a log of the number of previous airings.

Fatigue with Airing Counts and Co-Viewing:

An airing count for media A(m) may be calculated as a count of known airings placed into media slot m. This airing count, however, may fail to take into consideration co-viewing activity. For example, an advertisement may have been run ten times on, e.g., the Military Channel's "Greatest Tank Battles." A media buyer may wish to run the advertisement on the Military Channel's "Top 10 Aircraft," which has had zero airings. The media buyer may have assumed such a run would avoid a decline in the advertisement's performance. However, the media buyer may be underestimating the effective frequency.

For example, Military Channel viewers may be considered highly "insular" in their viewing habits. Thus, by airing the media buyer's advertisement in Greatest Tank Battles ten times, the media buyer may have effectively hit much of the same audience that would be viewing Top 10 Aircraft. Therefore, calculating the frequency of advertisement viewing that incorporates knowledge of co-viewing probabilities may be an important consideration.

Given knowledge of co-viewing probabilities, the probability that viewers will not have observed the advertisement may be calculated. The co-viewing probabilities may be calculated from, for example, set top box data. Thus, an effective airing rate may be represented by the following formula:

$$A^*(m_j) = \max A(m_i) \cdot Pr(m_i, m_j)$$

In order to account for the impact of Fatigue, expected response per impression, $rpi_\Omega$, may be equal to the number of buyers per impression (targeting score) divided by a function of the log of airings (a number of repeat exposures), as indicated by the formula below. Thus, a targeting function may include an effect of repeat exposures.

$$rpi_\Omega(\overline{P}, M) = \frac{R_\Omega(\overline{P}, M_i)}{F(M_i)} = \frac{B(M_i)/I(M_i)}{a * \ln(A(m_j) + 1)}$$

Table 41, below, shows how Fatigue is combined with an RPI function to provide a measure of Fatigue-adjusted performance. In this case, the fatigue function is log(airingcount), and adjusted performance is RPI/log(airingcount). This can be used by media buyers to prioritize buying programs for an upcoming television campaign. This also has the effect of "intelligently" taking into account the programs where a mature TV campaign has been displayed before, and will automatically shift away from those previously purchased programs.

TABLE 41

| call letters | hour-name | am/pm | Airings | Tratio | impressions | cpm | cost | tratio/log (airing count) |
|---|---|---|---|---|---|---|---|---|
| ADSM | 0 | am | 37 | 0.564208 | 1145554 | 5.558632 | 6391.333 | 0.108305 |
| ADSM | 1 | am | 57 | 0.55924 | 923339 | 3.226842 | 2977.753 | 0.095877 |
| ADSM | 2 | am | 88 | 0.564928 | 972358 | 3.41012 | 3349.129 | 0.087458 |
| ADSM | 3 | am | 137 | 0.534411 | 957852 | 3.483876 | 3373.266 | 0.07529 |
| ADSM | 4 | am | 166 | 0.522296 | 716889 | 3.143587 | 2263.309 | 0.070819 |
| ADSM | 5 | am | 179 | 0.442389 | 687426 | 3.136466 | 2155.338 | 0.059113 |

TABLE 41-continued

| call letters | hour - name | am/pm | Airings | Tratio | impressions | cpm | cost | tratio/log (airing count) |
|---|---|---|---|---|---|---|---|---|
| ADSM | 9 | pm | 5 | 0.480302 | 791513 | 5.660395 | 4426.286 | 0.206855 |
| ADSM | 10 | pm | 4 | 0.485575 | 1311788 | 5.656115 | 7436.57 | 0.242787 |
| ADSM | 11 | pm | 12 | 0.483474 | 1815042 | 6.161579 | 11099.01 | 0.134862 |
| BET | 0 | am | 10 | 0.060438 | 296540 | 3.358933 | 1007.307 | 0.018194 |
| BET | 1 | am | 78 | 0.102505 | 219530 | 2.760971 | 610.3875 | 0.016308 |
| BET | 2 | am | 134 | 0.107418 | 201678 | 2.667251 | 537.9659 | 0.015202 |
| BET | 3 | am | 32 | 0.086856 | 142240 | 2.844085 | 403.199 | 0.017371 |
| BET | 3 | pm | 2 | 0.129267 | 181132 | 3.519042 | 637.411 | 0.129267 |
| BET | 4 | pm | 2 | 0.204869 | 222712 | 3.529425 | 786.0287 | 0.204869 |
| BET | 5 | pm | 3 | 0.151973 | 249874 | 3.577142 | 893.7647 | 0.095884 |
| BET | 6 | pm | 2 | 0.217091 | 267509 | 3.97265 | 1062.424 | 0.217091 |
| BET | 7 | pm | 3 | 0.177545 | 297013 | 4.070511 | 1208.747 | 0.112018 |
| BET | 11 | pm | 11 | 0.068216 | 345731 | 4.062014 | 1392.424 | 0.019719 |
| BRAV | 2 | am | 5 | 0.145075 | 168055 | 3.94912 | 663.8968 | 0.062481 |
| BRAV | 3 | am | 8 | 0.144072 | 136435 | 3.727342 | 506.8012 | 0.048024 |
| BRAV | 3 | pm | 1 | 0.090924 | 145610 | 4.157167 | 605.325 | Undefined (1 airing) |
| BRAV | 4 | pm | 3 | 0.122715 | 159740 | 4.049478 | 646.7862 | 0.077424 |
| BRAV | 5 | pm | 3 | 0.134994 | 181434 | 4.093817 | 742.8897 | 0.085172 |
| BRAV | 6 | pm | 3 | 0.117722 | 200048 | 3.843167 | 768.537 | 0.074275 |
| CENT | 0 | am | 36 | 0.245966 | 62115 | 1.662892 | 103.1727 | 0.047576 |
| CENT | 1 | am | 33 | 0.245826 | 59733 | 1.531975 | 91.2917 | 0.048732 |
| CENT | 2 | am | 31 | 0.207932 | 41280 | 1.467235 | 60.5249 | 0.041971 |
| CENT | 3 | am | 31 | 0.229982 | 36776 | 1.440374 | 52.9547 | 0.046422 |
| CENT | 4 | am | 20 | 0.222849 | 30514 | 1.39141 | 42.2301 | 0.051562 |
| CENT | 5 | am | 20 | 0.184917 | 23950 | 1.400903 | 33.4143 | 0.042786 |
| CENT | 11 | pm | 25 | 0.164801 | 65806 | 1.764107 | 115.5742 | 0.035488 |
| CMT | 6 | am | 18 | 0.20047 | 73361 | 2.520763 | 186.593 | 0.048075 |
| CMT | 7 | am | 16 | 0.218006 | 102085 | 2.193221 | 223.7244 | 0.054502 |
| CMT | 8 | am | 8 | 0.227641 | 123642 | 2.115917 | 264.2453 | 0.07588 |
| COM | 0 | am | 20 | 0.410145 | 392617 | 6.513513 | 2550.5 | 0.094899 |
| COM | 1 | am | 14 | 0.331025 | 332366 | 4.131354 | 1370.202 | 0.086944 |
| COM | 2 | am | 145 | 0.376298 | 277418 | 4.007862 | 1108.234 | 0.05241 |
| COM | 3 | am | 156 | 0.363574 | 230472 | 3.979667 | 916.0395 | 0.049904 |
| COM | 4 | am | 136 | 0.364425 | 185923 | 3.930438 | 730.9726 | 0.051418 |
| COM | 5 | am | 20 | 0.229064 | 129064 | 5.5102 | 711.1725 | 0.053 |
| COM | 6 | am | 16 | 0.177085 | 110900 | 5.5102 | 611.0832 | 0.044271 |
| COM | 7 | am | 14 | 0.224238 | 100927 | 5.5102 | 556.1299 | 0.058896 |
| COM | 8 | am | 18 | 0.271266 | 108295 | 5.444142 | 587.769 | 0.065053 |
| COM | 9 | am | 2 | 0.402209 | 198479 | 5.2101 | 1033.623 | 0.402209 |
| COM | 10 | am | 3 | 0.296853 | 193197 | 4.436206 | 876.8231 | 0.187293 |
| COM | 11 | am | 10 | 0.327457 | 188749 | 4.329612 | 836.7699 | 0.098574 |
| COM | 12 | pm | 8 | 0.368493 | 270155 | 4.998707 | 1359.306 | 0.122831 |
| COM | 1 | pm | 12 | 0.348506 | 249638 | 4.738493 | 1205.486 | 0.097213 |
| COM | 2 | pm | 12 | 0.382865 | 248630 | 4.785818 | 1209.36 | 0.106798 |
| COM | 3 | pm | 5 | 0.362077 | 246482 | 4.711765 | 1180.274 | 0.155938 |
| COM | 4 | pm | 10 | 0.377976 | 307463 | 5.119644 | 1580.774 | 0.113782 |
| COM | 5 | pm | 11 | 0.386921 | 335880 | 5.137939 | 1730.79 | 0.111845 |
| COM | 6 | pm | 1 | 0.394461 | 331391 | 5.562533 | 1843.374 | Undefined (1 airing) |
| COM | 7 | pm | 3 | 0.282617 | 350736 | 6.095108 | 2137.75 | 0.178312 |
| COM | 8 | pm | 5 | 0.384966 | 410102 | 6.689685 | 2740.605 | 0.165796 |
| COM | 9 | pm | 3 | 0.415279 | 514233 | 7.1104 | 3649.757 | 0.262012 |
| COM | 10 | pm | 6 | 0.430023 | 571611 | 6.352411 | 3543.82 | 0.166356 |
| COM | 11 | pm | 18 | 0.228992 | 556102 | 5.722678 | 3127.78 | 0.054915 |
| ENN | 0 | am | 24 | 0.463165 | 104615 | 2.565523 | 267.0332 | 0.101018 |
| ENN | 1 | am | 21 | 0.457394 | 84365 | 2.198805 | 183.5872 | 0.104135 |
| ENN | 2 | am | 27 | 0.43184 | 68699 | 2.173538 | 148.8815 | 0.09082 |
| ENN | 3 | am | 104 | 0.442095 | 64265 | 2.172132 | 139.0443 | 0.06598 |
| ENN | 4 | am | 106 | 0.437103 | 63509 | 2.170626 | 137.339 | 0.064968 |
| ENN | 5 | am | 117 | 0.399013 | 60459 | 2.170165 | 130.3098 | 0.058077 |
| ENN | 6 | am | 23 | 0.386637 | 57647 | 2.423775 | 139.5885 | 0.085472 |
| ENN | 7 | am | 21 | 0.413862 | 61580 | 2.479913 | 152.7453 | 0.094224 |
| ENN | 8 | am | 24 | 0.404247 | 62590 | 2.471786 | 155.2974 | 0.088168 |
| ENN | 9 | am | 54 | 0.403584 | 59435 | 2.483862 | 147.8544 | 0.070129 |
| ENN | 10 | am | 87 | 0.335361 | 68374 | 2.679908 | 182.6642 | 0.052051 |
| ENN | 11 | am | 88 | 0.328514 | 70588 | 2.69034 | 189.5588 | 0.050858 |
| ENN | 12 | pm | 57 | 0.343214 | 72278 | 2.652158 | 191.3165 | 0.058841 |
| ENN | 1 | pm | 54 | 0.371394 | 68743 | 2.697822 | 184.9772 | 0.064535 |
| ENN | 2 | pm | 43 | 0.360984 | 69688 | 2.655957 | 184.66 | 0.066525 |
| ENN | 3 | pm | 4 | 0.426069 | 112379 | 2.657375 | 298.5223 | 0.213034 |
| ENN | 4 | pm | 5 | 0.430771 | 135576 | 2.675355 | 362.6836 | 0.185523 |
| ENN | 5 | pm | 4 | 0.429995 | 150685 | 2.650113 | 398.9407 | 0.214998 |
| ENN | 6 | pm | 12 | 0.402658 | 138315 | 2.659052 | 367.2279 | 0.112319 |
| ENN | 7 | pm | 6 | 0.399056 | 156899 | 2.69296 | 422.2595 | 0.154376 |
| ENN | 8 | pm | 8 | 0.391363 | 150196 | 2.917338 | 437.9088 | 0.130454 |

TABLE 41-continued

| call letters | hour-name | am/pm | Airings | Tratio | impressions | cpm | cost | tratio/log (airing count) |
|---|---|---|---|---|---|---|---|---|
| ENN | 9 | pm | 3 | 0.395908 | 141146 | 2.99225 | 420.7986 | 0.24979 |
| ENN | 10 | pm | 3 | 0.402219 | 150783 | 2.909567 | 438.7097 | 0.253772 |
| ENN | 11 | pm | 11 | 0.430644 | 120833 | 2.589411 | 311.1658 | 0.124484 |

Table 42, as shown below, depicts cases where a target score may be calculated by combining an airing count with a targeting ratio, such as "tratio/airing count."

TABLE 42

| call letters | program name | Airings | tratio | impressions | cpm | cost | tratio/airingcount |
|---|---|---|---|---|---|---|---|
| ADSM | YPFIGTH | 1 | 0.555362 | 1056716 | 3.0864 | 3261.448 | 0.555362 |
| ADSM | Delocated | 1 | 0.550869 | 1142827 | 5.58115 | 6378.289 | 0.550869 |
| ADSM | Black Dynamite | 1 | 0.536211 | 825215 | 3.977575 | 3282.355 | 0.536211 |
| ADSM | Swords, Knives, Very Sharp Objects and Cutlery | 1 | 0.533966 | 775532 | 3.129133 | 2426.743 | 0.533966 |
| ADSM | IGPX | 1 | 0.526385 | 562121 | 3.0582 | 1719.078 | 0.526385 |
| TNNK | Kenan & Kel | 1 | 0.523345 | 71010 | 1.48275 | 105.2901 | 0.523345 |
| ADSM | Stroker and Hoop | 1 | 0.516485 | 808075 | 3.503175 | 2830.828 | 0.516485 |
| TNNK | NICKMOM NIGHT OUT | 1 | 0.516058 | 91757 | 1.379367 | 126.5665 | 0.516058 |
| ADSM | Ghost In The Shell | 1 | 0.515655 | 1387 | Undefined (low impressions) | Undefined (low impressions) | 0.515655 |
| ADSM | Fat Guy Stuck in Internet | 1 | 0.505052 | 825215 | 2.861175 | 2361.085 | 0.505052 |
| MTV | American Pie Presents: Beta House | 1 | 0.497064 | 234956 | 4.083667 | 959.482 | 0.497064 |
| ADSM | Saul of the Mole Men | 1 | 0.492845 | 808075 | 2.928625 | 2366.549 | 0.492845 |

FIGS. 7A and 7B depict pseudo code in which queries count historical airings by station-day-hour, and count a number of airings in a program, respectively.

Rotation Scoring:

Television media buyers often buy blocks of time on networks called "rotations." In one embodiment of the present disclosure, these rotations are scored by the system. The rotation can be a media asset pattern instance with wildcards, or any collection of airings.

In one embodiment of the present disclosure, the system takes a "rotation" to be scored, e.g., Seattle-CNN-6 pm-9 pm, and then "explodes" this airing into each possible airing or media instance where the ad could be placed within that rotation, eg. "Seattle-CNN-6 pm-Out Front with ErinB", "Seattle-CNN-7 pm-AC360", "Seattle-8 pm-Piers Morgan." These individual airings or media instances are then scored by the Scoring Service.

In one embodiment, the system assumes equal probability of the ad appearing in any of the underlying media instances.

In another embodiment, the system assumes "worst case" insertion in which it selects the underlying media instance with lowest impressions, highest CPM, lowest tratio or the like.

In another embodiment the system attempts to estimate the placement biases of the network and may distribute the airings based on the media instances with the lowest household impressions.

After scoring the underlying media instances for impressions, response per impression (tratio), buyers per impression and other scores generated by Scoring Service, the system then re-aggregates these media instances to create a final score for the rotation. In one embodiment, the system assumes equal probability and averages the underlying scores. In another embodiment, the system assumes "worst-case" insertion and so selects the media instance with the lowest impressions, highest CPM, lowest tratio or the like, and reports that back as the insertion solution for the rotation. Figure below ("Automated Media Scoring") shows a flow-chart showing how the rotation is exploded, scored, and then each of the underlying scores put back together into a rotation score.

Table 43, below, depicts exemplary Media Asset Pattern Types matched for one airing, in which all providers are not necessarily able to carry cost, imps, etc., and where threshold drops out features if too little data exists.

TABLE 43

| AiringID | MediaAssetPatternTypeID | MediaAssetPatternKey | SourceSegmentKey | TRatio | Cost |
|---|---|---|---|---|---|
| 5.51E+08 | 1 | Affiliate ABC | 110401 | −0.18217 | 256.0009 |
| 5.51E+08 | 4 | ABC - M-Su - 8p-12a | 110401 | 0.481338 | 114455.6 |
| 5.51E+08 | 5 | Sun - 6-9PM | 110401 | −0.13388 | 1723.303 |
| 5.51E+08 | 7 | 6-9PM | 110401 | −0.32743 | 1253.23 |
| 5.51E+08 | 14 | Affiliate ABC - Su - 8 pm | 110401 | −0.23746 | 923.0455 |
| 5.51E+08 | 20 | Affiliate ABC | 110401 | −0.07661 | |
| 5.51E+08 | 21 | Affiliate ABC - M-Su - 8p-12a | 110401 | 0.042776 | |
| 5.51E+08 | 25 | Once Upon a Time | 110401 | 0.124556 | |
| 5.51E+08 | 27 | Affiliate ABC | 110401 | 0.316849 | |
| 5.51E+08 | 28 | Once Upon a Time | 110401 | 0.473722 | |
| 5.51E+08 | 30 | 6-9PM | 110401 | −0.05157 | |
| 5.51E+08 | 31 | ABC - M-Su - 8p-12a | 110401 | 0.496692 | |
| 5.51E+08 | 32 | ABC - Su - 8 pm | 110401 | 0.454103 | |
| 5.51E+08 | 37 | Affiliate ABC | 110401 | | |
| 5.51E+08 | 45 | ABC - Su - 8 pm | 110401 | | |
| 5.51E+08 | 46 | ABC | 110401 | | |
| 5.51E+08 | 47 | ABC - Once Upon a Time | 110401 | | |
| 5.51E+08 | 51 | Affiliate ABC - Su - 8 pm | 110401 | 0.532664 | 90152.72 |
| 5.51E+08 | 52 | Affiliate ABC | 110401 | 0.288911 | 30555.57 |
| 5.51E+08 | 53 | Affiliate ABC - ONCE UPON A TIME | 110401 | 0.750027 | 91973.99 |
| 5.51E+08 | 55 | Once Upon a Time | 110401 | 0.77264 | 579.818 |
| 5.51E+08 | 57 | ABC | 110401 | | |
| 5.51E+08 | 58 | ABC - Su - 8 pm | 110401 | | |
| 5.51E+08 | 59 | ABC - Once Upon a Time | 110401 | 0.716187 | 77804.28 |
| 5.51E+08 | 60 | ABC - Once Upon a Time | 110401 | 0.38292 | |
| 5.51E+08 | 65 | ABC - Once Upon a Time | 110401 | 0.716187 | 84081.14 |
| 5.51E+08 | 74 | ABC - Su - 8 pm - Q1 | 110401 | 0.119195 | |
| 5.51E+08 | 75 | Once Upon a Time - Q1 | 110401 | 0.46353 | |
| 5.51E+08 | 76 | Once Upon a Time - Q1 | 110401 | 0.746346 | 457.458 |
| 5.51E+08 | 78 | Weekend - Prime - ABC - Once Upon a Time | 110401 | 0.891909 | 80280.79 |
| 5.51E+08 | 81 | ABC - Once Upon a Time | 110401 | 0.371263 | |
| 5.51E+08 | 82 | Affiliate ABC - Su - 8 pm | 110401 | 0.159728 | 86607.6 |
| 5.51E+08 | 83 | Affiliate ABC - Once Upon a Time | 110401 | 0.229127 | 73853.27 |
| 5.51E+08 | 84 | ABC - Once Upon a Time | 110401 | | |
| 5.51E+08 | 85 | ABC - Su - 8 pm | 110401 | | |
| 5.51E+08 | 86 | ABC - Once Upon a Time Q12013 | 110401 | 0.446768 | |
| 5.51E+08 | 87 | ABC - Su - 8 pm - Q12013 | 110401 | −0.38981 | |

| AiringID | Impressions | Station Master ID | Market Master ID | MAPID | SourceView Pct | Threshold | CPM |
|---|---|---|---|---|---|---|---|
| 5.51E+08 | 25650 | 8 | 169 | 43986 | | | 9.9805 |
| 5.51E+08 | 5253207 | 8 | 169 | 31 | | | 21.7878 |
| 5.51E+08 | 164671 | 8 | 169 | 25793 | | | 10.4651 |
| 5.51E+08 | 117448 | 8 | 169 | 22047 | | | 10.6705 |
| 5.51E+08 | 50996 | 8 | 169 | 44087 | | | 18.1004 |
| 5.51E+08 | 88361606 | 8 | 169 | 53041 | | 318794 | |
| 5.51E+08 | 26512168 | 8 | 169 | 53095 | | 284698 | |
| 5.51E+08 | 387761 | 8 | 169 | 73472 | | 74484 | |
| 5.51E+08 | 3674320 | 8 | 169 | 2277882 | | 2.19E+11 | |
| 5.51E+08 | 4246937 | 8 | 169 | 16363861 | | 7.39E+08 | |
| 5.51E+08 | 281602 | 8 | 169 | 88135 | | 4.89E+11 | |
| 5.51E+08 | 5566739 | 8 | 169 | 15112871 | | 5.53E+10 | |
| 5.51E+08 | 6098754 | 8 | 169 | 2276936 | | 2.15E+09 | |
| 5.51E+08 | 3448279 | 8 | 169 | 14087011 | | | |
| 5.51E+08 | | 8 | 169 | 15067083 | 0.022112 | 10119 | |
| 5.51E+08 | | 8 | 169 | 15087374 | 0.018926 | 930227 | |
| 5.51E+08 | | 8 | 169 | 17079498 | 0.010732 | 1907 | |
| 5.51E+08 | 5572002 | 8 | 169 | 15258889 | | | 16.1796 |
| 5.51E+08 | 3050742 | 8 | 169 | 15294285 | | | 10.0158 |
| 5.51E+08 | 7139718 | 8 | 169 | 16834703 | | | 12.882 |
| 5.51E+08 | 69058 | 8 | 169 | 16822042 | | | 8.396 |
| 5.51E+08 | 12746 | 8 | 169 | 15347783 | | | |
| 5.51E+08 | 11616 | 8 | 169 | 15347265 | | | |
| 5.51E+08 | 5826263 | 8 | 169 | 16315316 | | | 13.3541 |
| 5.51E+08 | 4389879 | 8 | 169 | 16065334 | | | |
| 5.51E+08 | 6261621 | 8 | 169 | 16085946 | | | 13.428 |
| 5.51E+08 | 6657065 | 8 | 169 | 23966510 | | 8.25E+08 | |
| 5.51E+08 | 3910833 | 8 | 169 | 24137635 | | | |
| 5.51E+08 | 63879 | 8 | 169 | 24216555 | | | 7.1613 |
| 5.51E+08 | 5944897 | 8 | 169 | 24298243 | | | 13.5041 |

TABLE 43-continued

| | | | | | | | |
|---|---|---|---|---|---|---|---|
| 5.51E+08 | 420098 | 8 | 169 | 24430573 | | 16803933 | |
| 5.51E+08 | 2.38E+10 | 8 | 169 | 24462105 | | | 15.2042 |
| 5.51E+08 | 1.84E+10 | 8 | 169 | 24476315 | | | 12.9693 |
| 5.51E+08 | | 8 | 169 | 24481814 | 0.002729 | | |
| 5.51E+08 | | 8 | 169 | 24499779 | 0.002328 | | |
| 5.51E+08 | 3812924 | 8 | 169 | 24819778 | | 2.59E+08 | |
| 5.51E+08 | 5558337 | 8 | 169 | 24923543 | | 2.89E+08 | |

TABLE 44

Pre-computed Media Asset Patterns and scores - Maptype 69

| sourcesegmentkey | MediaAssetPatternKey | mediaassetpatterntypeid | wpi |
|---|---|---|---|
| 110401 | SOAP - Su - 3 pm | 69 | 0.00322 |
| 110401 | COM - Tu - 1 pm | 69 | 0.003025 |
| 110401 | DFH - Tu - 11 am | 69 | 0.002895 |
| 110401 | DFH - W - 2 pm | 69 | 0.00273 |
| 110401 | DFH - M - 7 am | 69 | 0.002596 |
| 110401 | COM - W - 1 pm | 69 | 0.002539 |
| 110401 | DFH - M - 1 pm | 69 | 0.002291 |
| 110401 | COM - Th - 1 pm | 69 | 0.002148 |
| 110401 | COM - Tu - 12 pm | 69 | 0.00211 |
| 110401 | DFH - Th - 3 pm | 69 | 0.00206 |

TABLE 45

Pre-computed Media Asset Patterns and scores - Maptype 60

| Source segmentkey | MediaAsset PatternKey | Mediaasset pattern type ID | correlation |
|---|---|---|---|
| 110401-NC--3 | STYL - Chances Are | 60 | 0.826812 |
| 110401-NC--3 | WE - Notting Hill | 60 | 0.822194 |
| 110401-NC--3 | STYL - Christian Siriano: Having a Moment | 60 | 0.813051 |
| 110401-NC--3 | BRAV - Pretty Woman | 60 | 0.812836 |
| 110401-NC--3 | BRAV - Proof of Life | 60 | 0.808653 |
| 110401-NC--3 | STYL - Fashion Police: Academy Awards | 60 | 0.808165 |
| 110401-NC--3 | STYL - Project Runway | 60 | 0.806292 |
| 110401-NC--3 | E! - Sabrina | 60 | 0.805671 |
| 110401-NC--3 | LIFE - After the Runway | 60 | 0.804079 |
| 110401-NC--3 | E! - Countdown to the Red Carpet: The Golden Globe Awards | 60 | 0.803744 |

TABLE 46

Pre-computed Media Asset Patterns and scores - Maptype 32

| Source segmentkey | MediaAsset PatternKey | mediaassetpatterntypeid | correlation |
|---|---|---|---|
| 110401 | E! - Sa - 6 am | 32 | 0.771822 |
| 110401 | STYL - W - 2 am | 32 | 0.770532 |
| 110401 | E! - W - 4 am | 32 | 0.76947 |
| 110401 | E! - Tu - 12 am | 32 | 0.769332 |
| 110401 | E! - Su - 6 am | 32 | 0.769055 |
| 110401 | BRAV - F - 7 am | 32 | 0.768813 |
| 110401 | E! - Tu - 8 pm | 32 | 0.767945 |
| 110401 | STYL - W - 3 am | 32 | 0.76748 |
| 110401 | E! - W - 2 am | 32 | 0.76741 |
| 110401 | STYL - Su - 1 am | 32 | 0.7674 |

Table 47, below, depicts Scoring Service Output records (examples). The records below show some examples of television airings and scored response per impression (tratio), CPM, Impressions and so on.

TABLE 47

| Job ID | ProductID | Product Name | SourceSegmentKey ("Target") | SourceSegmentDesc | Airing Universal ID | Create Date |
|---|---|---|---|---|---|---|
| 33 | 10107 | Art. Com | 110401 | Art. Com | 234266 | Aug. 7, 2013 11:20 |
| 33 | 10107 | Art. Com | 110401 | Art. Com | 247336 | Aug. 7, 2013 11:20 |
| 33 | 10107 | Art. Com | 110401 | Art. Com | 245484 | Aug. 7, 2013 11:20 |
| 33 | 10107 | Art. Com | 110401 | Art. Com | 248284 | Aug. 7, 2013 11:20 |
| 33 | 10107 | Art. Com | 110401-NC--1 | Art. Com Cluster 1 | 248313 | Aug. 7, 2013 11:20 |
| 33 | 10107 | Art. Com | 110401 | Art. Com | 216881 | Aug. 7, 2013 11:20 |
| 33 | 10107 | Art. Com | 110401 | Art. Com | 216897 | Aug. 7, 2013 11:20 |

Table 48, below, depicts dimensions (e.g., Network ID, Program ID, Day of Week, etc.), as well as that dual feed airing may have multiple airing events (i.e., different airing dates.)

TABLE 48

| MarketID | NetworkID | ProgramID | DayOf Week | Hour OfDay | AirDate_Local | AirDate_UTC | Callletters |
|---|---|---|---|---|---|---|---|
| 169 | 16 | 334 | 4 | 23 | 4/24/13 11:42 PM | Apr. 24, 2013 6:42 PM | BBCA |
| 169 | 11 | 359 | 3 | 17 | 5/21/13 5:02 PM | May 21, 2013 12:02 PM | AMC |
| 169 | 894 | 427 | 7 | 22 | 5/18/13 10:17 PM | May 18, 2013 5:17 PM | WE |
| 169 | 11 | 512 | 5 | 12 | 5/23/13 12:28 PM | May 23, 2013 7:28 AM | AMC |
| 169 | 11 | 512 | 5 | 13 | 5/23/13 1:06 PM | May 23, 2013 8:06 AM | AMC |
| 169 | 20 | 587 | 3 | 8 | 3/19/13 8:45 AM | Mar. 19, 2013 3:45 AM | BRAV |
| 169 | 20 | 587 | 3 | 9 | 3/19/13 9:33 AM | Mar. 19, 2013 4:33 AM | BRAV |

TABLE 49A

| Program Name | Media Market | tRatio | Impressions | Cost | CPM |
|---|---|---|---|---|---|
| Resident Evil | NATIONAL | 0.13501 | 66862 | 171.7975 | 2.569433 |
| The Scorpion King | NATIONAL | −0.23812 | 423659 | 1022.501 | 2.4135 |
| Titanic | NATIONAL | 0.028158 | 199198 | 792.9408 | 3.980667 |
| As Good as it Gets | NATIONAL | −0.07006 | 252962 | 616.1395 | 2.4357 |
| As Good as it Gets | NATIONAL | −0.06727 | 285029 | 689.1526 | 2.417833 |
| Inside the Actors Studio | NATIONAL | 0.326143 | 115778 | 395.7726 | 3.418375 |
| Inside the Actors Studio | NATIONAL | 0.341543 | 126991 | 425.9437 | 3.354125 |

TABLE 49B

| Program Name | BPI | RPI | WPI | Match Error Code | SDH Airings By Date | Program Airings By Date |
|---|---|---|---|---|---|---|
| Resident Evil | 0.013668 | 0.021814 | 1 | 1 | 0 | |
| The Scorpion King | 0.0015 | 0.021814 | 1 | 2 | 0 | |
| Titanic | 0.002871 | 0.021814 | 0 | 1 | 0 | |
| As Good as it Gets | 0.00097 | 0.021814 | 1 | 5 | 2 | |
| As Good as it Gets | 0.00101 | 0.021814 | 1 | 5 | 3 | |
| Inside the Actors Studio | 0.013363 | 0.021814 | 0 | 3 | 1 | |
| Inside the Actors Studio | 0.013331 | 0.021814 | 0 | 1 | 2 | |

FIG. 14 depicts an example of a sample scored output text file.

FIG. 15 depicts another example of a sample scored output text file, including sample scored output (JSON). Imps, Price, C1TR, C2TR, C3TR, TR refer to "Impressions predicted", "CPM predicted", "Cluster 1 tratio", "Cluster 2 tratio", "Cluster 3 tratio", "tratio overall". The system is designed to score multiple targets at once for response per impression—hence the above showing the 3 clusters plus overall score.

FIG. 16 depicts another example JSON output from the scoring service showing a media instance being scored.

Table 50, below, depicts an example cardinality of different media asset pattern types that may be used by the system. In one embodiment there are approximately 18,642,000 pre-computed media asset patterns being used to estimate the response per impression, impressions, CPM and other aspects of a television airing.

TABLE 50

| mediaassetpatterntypeid | Number of instances |
|---|---|
| 1 | 2,336 |
| 2 | 5,599 |
| 3 | 39 |
| 4 | 16,352 |
| 5 | 56 |
| 6 | 7 |
| 7 | 8 |
| 8 | 213 |
| 9 | 59 |
| 10 | 59 |
| 11 | 211 |
| 12 | 812 |
| 13 | 812 |
| 14 | 20,664 |
| 15 | 214 |
| 18 | 52,467 |
| 20 | 241 |
| 21 | 1,711 |
| 22 | 21,840 |
| 24 | 15,219 |
| 25 | 30,164 |
| 27 | 229 |
| 28 | 49,667 |
| 29 | 7 |
| 30 | 8 |
| 31 | 1,603 |
| 32 | 38,472 |
| 33 | 210 |
| 34 | 42,299 |
| 35 | 46,549 |
| 36 | 4,021,971 |
| 37 | 146 |
| 38 | 13,205 |
| 39 | 1,406 |
| 40 | 40,006 |
| 42 | 3,774,960 |
| 45 | 21,359 |
| 46 | 128 |
| 47 | 15,903 |

TABLE 50-continued

| mediaassetpatterntypeid | Number of instances |
|---|---|
| 49 | 933 |
| 50 | 31,900 |
| 51 | 18,332 |
| 52 | 120 |
| 53 | 34,586 |
| 54 | 231 |
| 55 | 13,152 |
| 57 | 288 |
| 58 | 15,877 |
| 59 | 28,018 |
| 60 | 91,958 |
| 61 | 160,403 |

TABLE 50-continued

| mediaassetpatterntypeid | Number of instances |
|---|---|
| 62 | 959 |
| 63 | 225,348 |
| 65 | 1,000 |
| 66 | 999 |
| 68 | 633 |
| 69 | 1,706 |
| 70 | 46 |
| 71 | 802 |
| 72 | 7,361 |
| 73 | 3,760 |
| 74 | 155,478 |
| 75 | 143,722 |
| 76 | 35,851 |
| 77 | 5,000 |
| 78 | 4,992 |
| 80 | 73,223 |
| 81 | 21,968 |
| 82 | 18,231 |
| 83 | 17,065 |
| 84 | 19,506 |
| 85 | 35,815 |
| 86 | 273,070 |
| 87 | 385,134 |
| 89 | 8,107,070 |
| 90 | 234,800 |
| 91 | 139,347 |
| 93 | 14,758 |
| 98 | 81,908 |

TABLE 50-continued

| mediaassetpatterntypeid | Number of instances |
|---|---|
| 105 | 106 |
| 106 | 156 |

Table 51, below, depicts an example of trained weights (wexpert) applied to each media asset pattern type. These weights are evaluated multiplied by normalized ad effectiveness scores and combined to estimate the response per impression target. Cadaline is a one-variable linear model. Cadaline_test is the model applied on a hold-out set. % is the percentage of airings where this media asset pattern type is present (non-missing). The weights below are from weightid=20.

TABLE 51

| Variable | w | cadaline | cadaline test | wexpert | wadaline | % |
|---|---|---|---|---|---|---|
| m-1-Distributor | 0.17 | 0.00 | −0.53 | 0 | 0 | 92% |
| m-2-Program | 0.78 | 0.16 | 0.18 | 0 | 1.43 | 4% |
| m-4-Distrib. - Rot. | 0.21 | 0 | −0.38 | 0 | 0 | 67% |
| m-5-Day - Hour | 0.25 | 0.12 | 0.30 | 0.09 | 0.14 | 100% |
| m-6-Day of Week | 0.40 | 0.07 | 0.17 | 0 | 0.06 | 100% |
| m-7-Hour of Day | 0.48 | 0.12 | 0.27 | 0 | 0.10 | 100% |
| m-14-SDH | 0.51 | 0.16 | 0.27 | 0.33 | 0.30 | 64% |
| m-20 -STB Station | 0.62 | 0 | −0.02 | 0 | 0 | 100% |
| m-21 -STB Station - Rot. | 0.63 | 0 | 0.12 | 0 | 0 | 100% |
| m-22 -STB SDH | 0.99 | 0 | 0.23 | 0 | 0 | 100% |
| m-25 -STB Program | 0.36 | 0 | −0.31 | 0 | 0 | 31% |
| m-27-STBHead Station | 0.28 | 0.23 | −0.07 | 0 | 0.26 | 39% |
| m-28- STBHead Program | 0.68 | 0.04 | −0.08 | 0 | 0.49 | 9% |
| m-29- STBHead Day | 0.51 | 0 | 0.04 | 0 | 0 | 100% |
| m-30- STBHead Hour of Day | 0.28 | 0 | −0.12 | 0 | 0 | 100% |
| m-31- STBHead S - Rot. | 0.58 | 0.30 | 0.25 | 0.12 | 0.37 | 39% |
| m-32- STBHead SDH | 0.82 | 0.24 | 0.23 | 0 | 0.21 | 39% |
| m-37-Telesales Nat S | 0.94 | 0.49 | 0.43 | 0 | 0.19 | 39% |
| m-38- Telesales Nat SDH | 0.44 | 0.06 | −0.04 | 0 | 0.06 | 22% |
| m-39- Telesales Loc S | 0.42 | 0.31 | 0.30 | 0.38 | 1.03 | 96% |
| m-40- Telesales Loc SDH | 1.00 | 0.35 | 0.32 | 0 | 1.46 | 61% |
| SVPct45- STBDevice SDH | 0.61 | 0.15 | 0.19 | 0.00 | 0.02 | 100% |
| SVPct46- STBDevice S | 0.94 | 0.17 | 0.20 | 0.08 | 0.03 | 100% |

Table 52, below, depicts yet another set of weights from an earlier model (weightid=3).

TABLE 52

| Media Asset Pattern Type | cadaline_test | wexpert |
|---|---|---|
| m-1-Distributor | −0.27321 | 0 |
| m-5-Day of Week - Hour of Day | 0.218107 | 0.002726 |
| m-6-Day of Week | 0.176983 | 0.113136 |
| m-7-Hour of Day | 0.153618 | 0.091361 |
| m-14-Distributor - Day - Hour | −0.02842 | 0.725416 |
| m-20-STBDevice-STB Station | −0.03184 | 0 |
| m-21-STBDevice -STB Station - Rotation | −0.01012 | 0 |
| m-22-STBDevice -STB Station - Day - Hour | 0.009289 | 0 |
| m-29-STBHead Day of Week | 0.040314 | 0.045517 |
| m-30- STBHead Hour of Day | −0.06275 | 0 |
| m-32- STBHead Station - Day - Hour | 0.142697 | 0.000718 |
| m-33-DMA | −0.30986 | 0.021126 |

Figure 17:
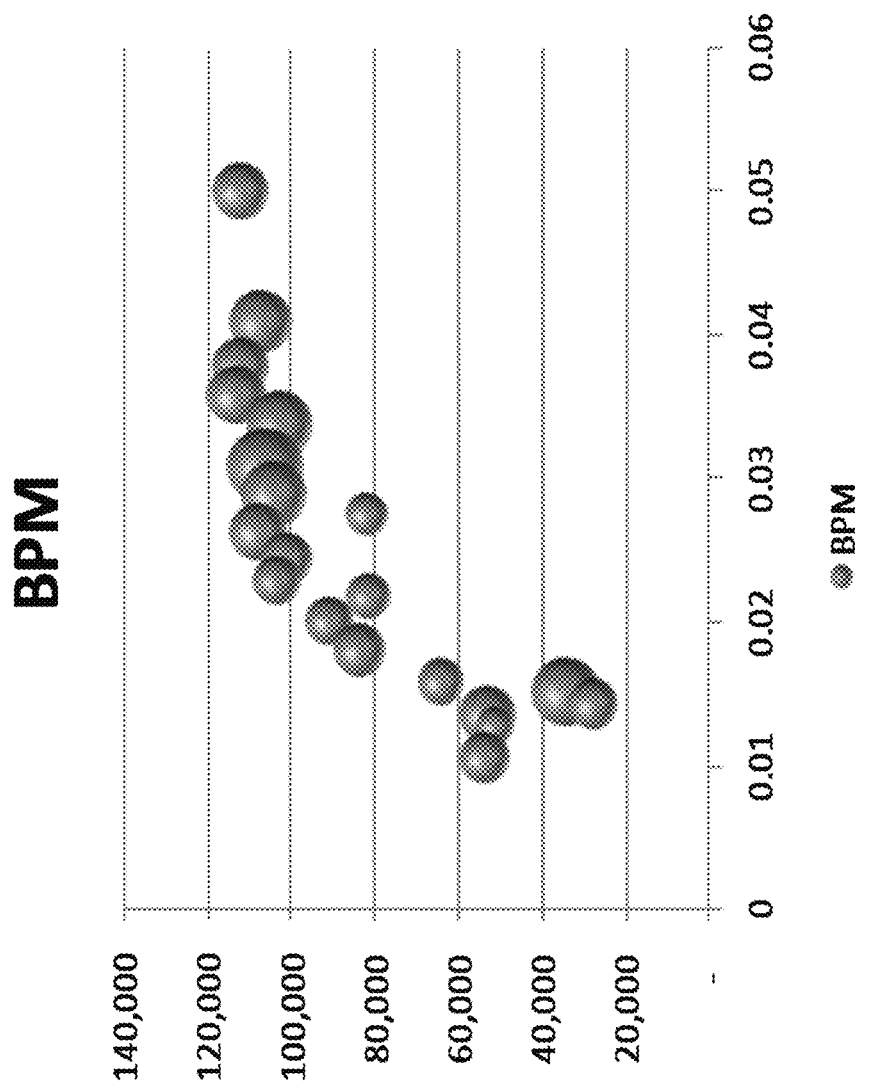
FIG. 17 depicts an exemplary graph of standardized score (x-axis) versus buyers per million impressions (y-axis), according to exemplary embodiments of the present disclosure.

FIG. 17 depicts an exemplary graph of standardized score (x-axis) versus buyers per million impressions (y-axis) for an advertiser whose response per impression function was buyers per million impressions.

Figure 18:
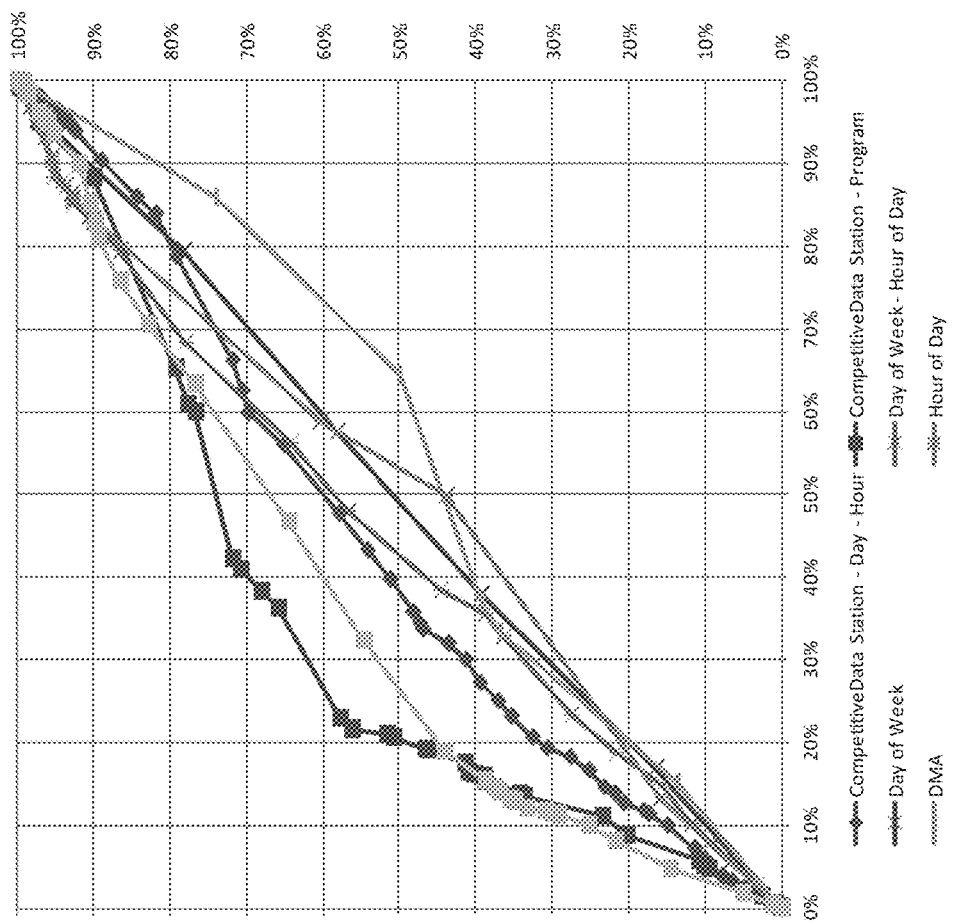
FIG. 18 depicts an exemplary graph of a comparison of Media Asset Patterns, according to exemplary embodiments of the present disclosure.

FIG. 18 depicts an exemplary graph of a comparison of Media Asset Patterns, showing that the program is more predictive than SDH when only considering non-missing values.

Figure 19:
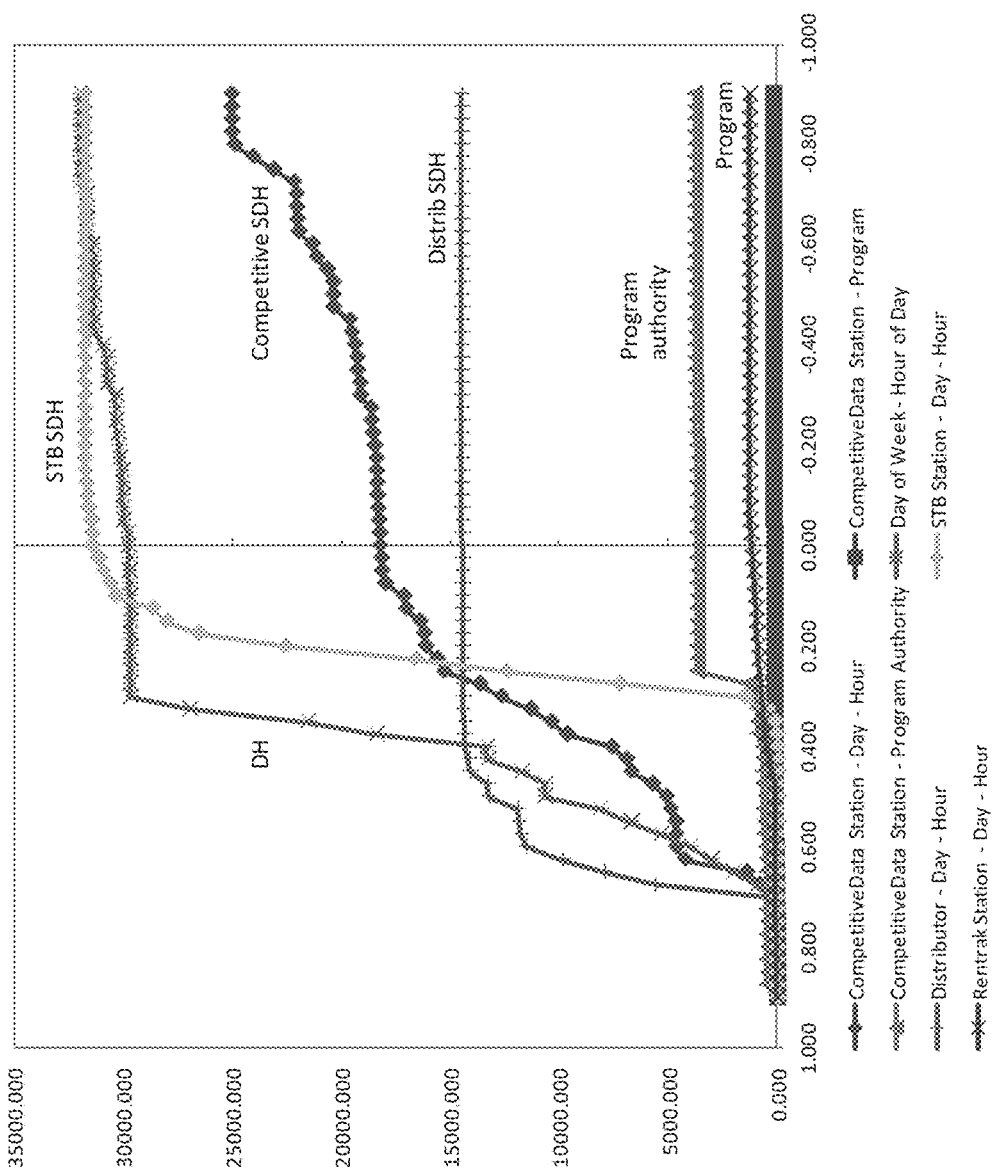
FIG. 19 depicts an exemplary graph depicting that the program is often poorly populated.

FIG. 19 depicts an exemplary graph depicting that the program is often poorly populated, and that program authority increases the match rate.

Figure 20:
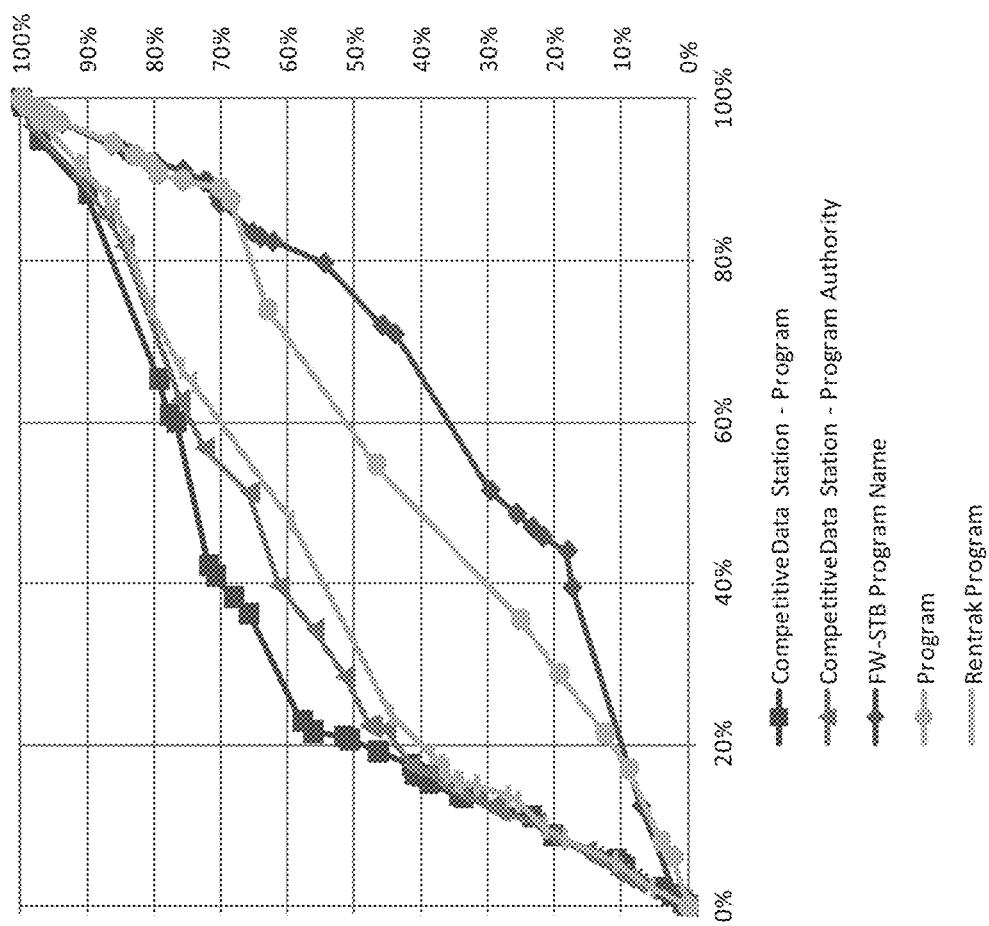
FIGS. 20 and 21 depict an exemplary graph showing that program authority is not as predictive as the program.
Figure 21:
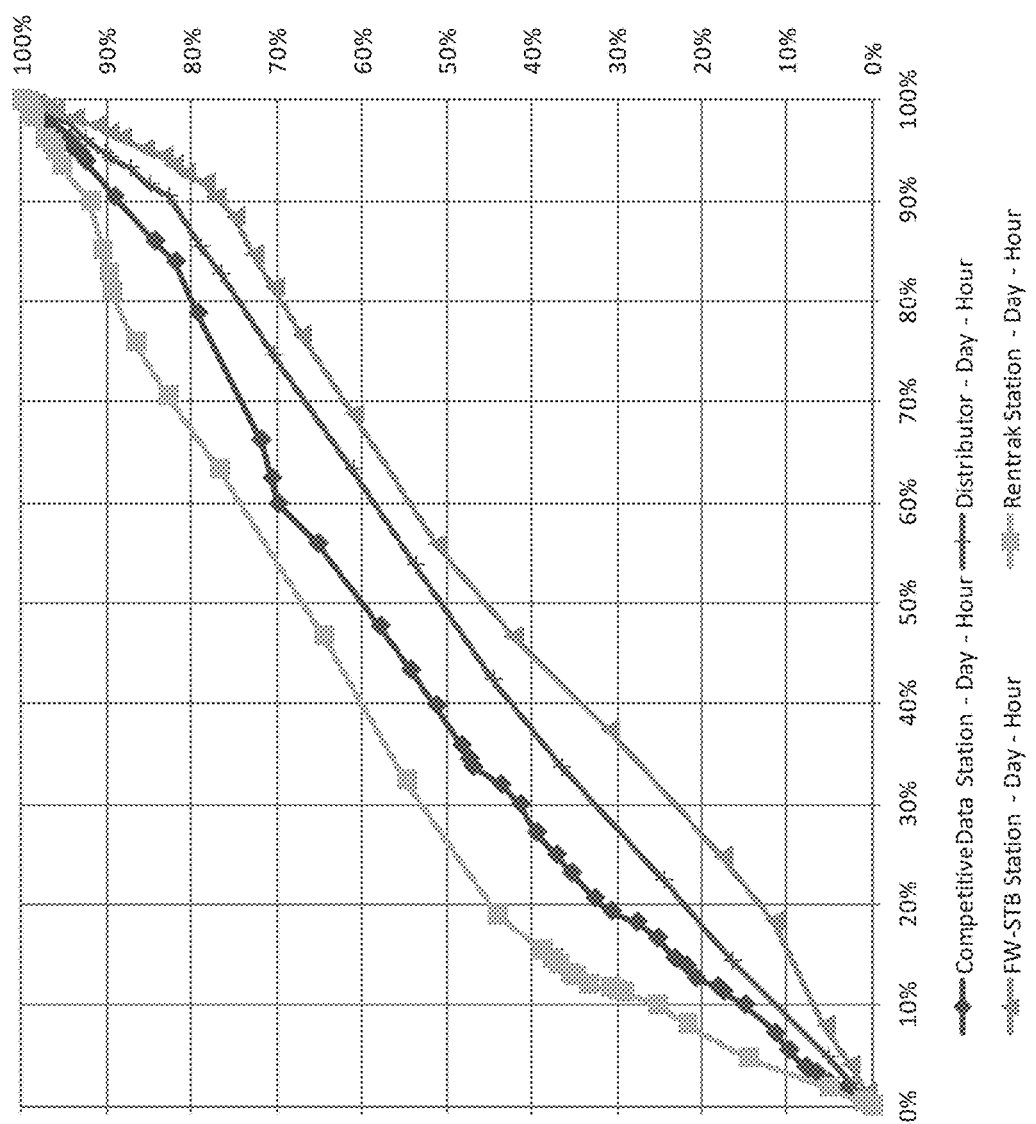

FIGS. 20 and 21 depict an exemplary graph showing that program authority is not as predictive as the program, however the increase in match rate offsets the small drop in accuracy.

Figure 8:
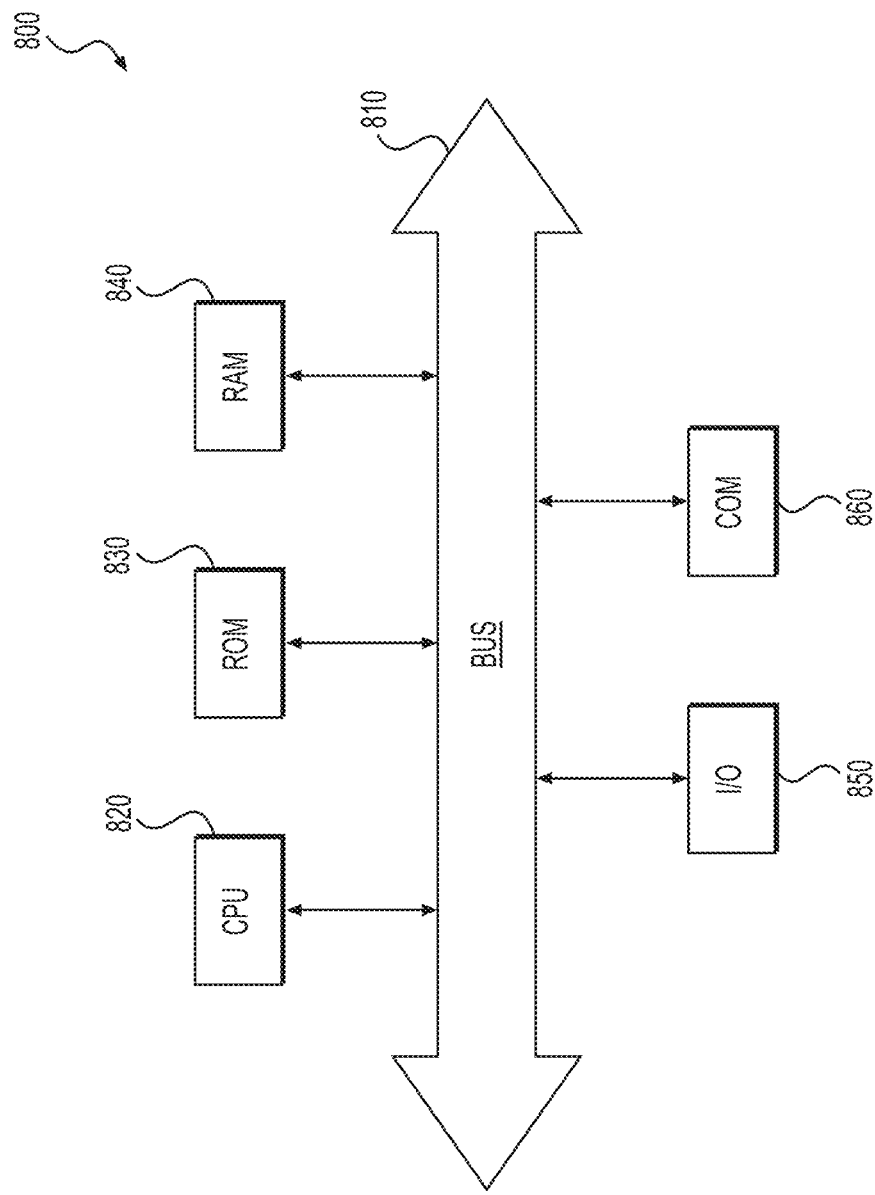
FIG. 8 is a simplified functional block diagram of a computer that may be configured as a device or server for executing the methods, according to exemplary embodiments of the present disclosure.

FIG. 8 is a simplified functional block diagram of a computer that may be configured as client devices, APs, ISPs, and/or servers for executing the methods, according to exemplary an embodiment of the present disclosure. Specifically, in one embodiment, any of the modules, servers, systems, and/or platforms may be an assembly of hardware 800 including, for example, a data communication interface 860 for packet data communication. The platform may also include a central processing unit ("CPU") 820, in the form of one or more processors, for executing program instructions. The platform typically includes an internal communication bus 810, program storage, and data storage for various data files to be processed and/or communicated by the platform such as ROM 830 and RAM 840, although the system 800 often receives programming and data via network communications 870. The server 800 also may include input and output ports 850 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed sharing application, methods, devices, and systems are described with exemplary reference to mobile applications and to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of protocol stack.

With the above described disclosure, it may be possible to target TV ads to maximize well-defined ad response metrics at scale. As described herein, TV targeting may be defined as a well-defined supervised learning problem. Accordingly, the types of ad effectiveness methods that are available may vary, and may each be combined to offset weaknesses in each method. By combining these techniques improvements in TV ad targeting may be realized using present TV systems.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of examples of the present disclosure is not intended to be exhaustive or to limit the present disclosure to the precise form disclosed above. While specific examples for the present disclosure are described above for illustrative purposes, various equivalent modifications are possible within the scope of the present disclosure, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the present disclosure provided herein can be applied to other systems, not necessarily the system described above. The elements and acts of the various examples described above can be combined to provide further implementations of the present disclosure. Some alternative implementations of the present disclosure may include not only additional elements to those implementations noted above, but also may include fewer elements.

These and other changes can be made to the present disclosure in light of the above detailed description. While the above description describes certain examples of the present disclosure, and describes the best mode contemplated, no matter how detailed the above appears in text, the present disclosure can be practiced in many ways. Details of the system may vary considerably in its specific implementation, while still being encompassed by the present disclosure disclosed herein. As noted above, particular terminology used when describing certain features or aspects of the present disclosure should not be taken to imply that the terminology is being redefined herein to be restricted to any specific characteristics, features, or aspects of the present disclosure with which that terminology is associated. In general, the terms used in the following claims should not be construed to limit the present disclosure to the specific examples disclosed in the specification, unless the above detailed description section explicitly defines such terms. Accordingly, the actual scope of the present disclosure encompasses not only the disclosed examples, but also all equivalent ways of practicing or implementing the present disclosure.

What is claimed is:

1. A computer-implemented method comprising:
defining, by a server, for one or more advertisement effectiveness measures for one or more possible media placements among a plurality of possible media placements, a default value, and a minimum participation threshold;
adjusting, by a model to predict advertisement effectiveness for a pairing of an advertisement and a media placement among the plurality of possible media placements, a value of a first advertisement effectiveness measure for the pairing to a default value of the first advertisement effectiveness measure if a number of impressions for the pairing is below a minimum participation threshold for the first advertisement effectiveness measure,
wherein the model includes one or more model parameters that are automatically generated by minimizing an error in predicting historical advertisement effectiveness measures;
predicting the advertisement effectiveness for the pairing based on the advertisement effectiveness measures; and
placing the advertisement within a specific media placement among the plurality of possible media placements based on the predicted advertisement effectiveness.

2. The method of claim 1, wherein the one or more advertisement effectiveness measures include one or more of phone responses, demographic similarity, set top box buyers, and web responses.

3. The method of claim 1, wherein the model is generated based on the first advertisement effectiveness measure and a number of previously placed airings of the advertisement in the media instance, the number of previously placed airings being estimated based on a number of historical airings and co-viewing probabilities from set top box data.

4. The method of claim 1, wherein a weight for each media placement is based on one or more of a count of persons, and other data sufficiency statistics.

5. The method of claim 1, wherein the model disregards a second advertisement effectiveness measure for a second particular pairing of an advertisement and a media asset if a number of impressions for the second particular pairing of the advertisement and the media asset is below the minimum participation threshold for the second advertisement effectiveness measure.

6. The method of claim 1, further comprising:
applying the model to a plurality of media assets for a particular advertisement to assist in selection of one or more of the plurality of media assets for airing the advertisement.

7. The method of claim 1, wherein one of the possible media placements is identified as media placement with at least a predetermined number of observed viewers over an expected number of viewers for a predetermined time and a predetermined network.

8. The method of claim 1, further comprising:
creating, by the server, a media placement of same-time-last-week; and
calculating, by the server, an advertisement effectiveness measure for the media placement.

9. The method of claim 1, wherein the media placements include one or more of station, program, station-program, station-day-hour, station-day-hour-program-market.

10. The method of claim 1, wherein each advertisement effectiveness measure for media asset pattern predictor is standardized so that media placements are directly comparable with each other.

11. The method of claim 10, wherein the standardized values are combined along with historical airing count to predict a standardized advertisement effectiveness.

12. The method of claim 11, wherein the predicted standardized advertisement effectiveness is converted into native units including buyers per million and phone responses per million.

13. A system for generating a model to predict advertisement effectiveness, the system comprising:
a data storage device that stores instructions for generating a model to predict advertisement effectiveness; and
a processor configured to execute the instructions to perform a method including:
defining, by a server, for one or more advertisement effectiveness measures for one or more possible media placements among a plurality of possible media placements, a default value and a minimum participation threshold,
adjusting, by a model to predict advertisement effectiveness for a pairing of an advertisement and a media placement among the plurality of possible media placements, a value of a first advertisement effectiveness measure for the pairing to a default value of the first advertisement effectiveness measure if a number of impressions for the pairing is below a minimum participation threshold for the first advertisement effectiveness measure;
predicting the advertisement effectiveness for the pairing based on the advertisement effectiveness measures; and
placing the advertisement within a specific media placement among the plurality of possible media placements based on the predicted advertisement effectiveness,
wherein the model includes one or more model parameters that are automatically generated by minimizing an error in predicting historical advertisement effectiveness measures.

14. The system of claim 13, wherein the one or more advertisement effectiveness measures include one or more of phone responses, demographic similarity, set top box buyers, and web responses.

15. The system of claim 13, wherein the model is generated based on the first advertisement effectiveness measure and a number of previously placed airings of the advertisement in the media instance, the number of previously placed airings being estimated based on a number of historical airings and co-viewing probabilities from set top box data.

16. The system of claim 13, wherein a weight for each media placement is based on one or more of a count of persons, and other data sufficiency statistics.

17. The system of claim 13, wherein the model disregards a second advertisement effectiveness measure for a second particular pairing of an advertisement and a media asset if a number of impressions for the second particular pairing of the advertisement and the media asset is below the minimum participation threshold for the second advertisement effectiveness measure.

18. A non-transitory machine-readable medium storing instructions that, when executed by a computing system, causes the computing system to perform a method comprising:
- defining, by a server, for one or more advertisement effectiveness measures for one or more possible media placements among a plurality of possible media placements, a default value and a minimum participation threshold,
- adjusting, by a model to predict advertisement effectiveness for a pairing of an advertisement and a media placement among the plurality of possible media placements, a value of a first advertisement effectiveness measure for the pairing to a default value of the first advertisement effectiveness measure if a number of impressions for the pairing is below a minimum participation threshold for the first advertisement effectiveness measure;
- predicting the advertisement effectiveness for the pairing based on the advertisement effectiveness measures; and
- placing the advertisement within a specific media placement among the plurality of possible media placements based on the predicted advertisement effectiveness,
- wherein the model includes one or more model parameters that are automatically generated by minimizing an error in predicting historical advertisement effectiveness measures.

* * * * *